United States Patent
O'Hare et al.

(10) Patent No.: US 11,053,269 B2
(45) Date of Patent: Jul. 6, 2021

(54) UNSYMMETRICAL METALLOCENE CATALYSTS AND USES THEREOF

(71) Applicant: SCG CHEMICALS CO., LTD., Bangkok (TH)

(72) Inventors: Dermot O'Hare, Oxford (GB); Jean-Charles Buffet, Oxford (GB); Jessica Lamb, Oxford (GB); Tossapol Khamnaen, Bangkok (TH); Manutsavin Charernsuk, Bangkok (TH); Thawesak Parawan, Bangkok (TH); Sumate Charoenchaidet, Bangkok (TH)

(73) Assignee: SCG CHEMICALS CO., LTD., Bangsue Bangkok (TH)

( * ) Notice: Subject to any disclaimer, the term of this patent is extended or adjusted under 35 U.S.C. 154(b) by 64 days.

(21) Appl. No.: 16/099,855

(22) PCT Filed: May 10, 2017

(86) PCT No.: PCT/GB2017/051305
§ 371 (c)(1),
(2) Date: Nov. 8, 2018

(87) PCT Pub. No.: WO2017/194943
PCT Pub. Date: Nov. 16, 2017

(65) Prior Publication Data
US 2019/0112325 A1 Apr. 18, 2019

(30) Foreign Application Priority Data
May 12, 2016 (GB) .................................... 1608384

(51) Int. Cl.
*C08F 4/64* (2006.01)
*C08F 4/76* (2006.01)
(Continued)

(52) U.S. Cl.
CPC .......... *C07F 17/00* (2013.01); *C08F 4/65927* (2013.01); *C08F 10/02* (2013.01); *C08F 4/65912* (2013.01); *C08F 4/65916* (2013.01)

(58) Field of Classification Search
CPC ........ C07F 17/00; C07F 7/00; C08F 4/65927; C08F 4/65912; C08F 2/38
See application file for complete search history.

(56) References Cited

U.S. PATENT DOCUMENTS 5,670,587 A * 9/1997 Takeuchi ................ C08F 12/04
502/113
5,672,668 A 9/1997 Winter et al.
(Continued)

FOREIGN PATENT DOCUMENTS

CA 2133181 3/1995
CA 2133389 4/1995
(Continued)

OTHER PUBLICATIONS

Licht, E. H. et al., "Synthesis and characterization of bis(cyclopentadienyl)zirconium dichloride complexes with ω-fluorenylalkyl or silyl substituents and their application in catalytic ethylene polymerization," Journal of Molecular Catalysis A Chemica, 2000, 164, 9-23.
(Continued)

*Primary Examiner* — Rip A Lee
(74) *Attorney, Agent, or Firm* — Barnes & Thornburg, LLP

(57) ABSTRACT

Unsymmetrical metallocene compounds based on cyclopentadienyl ligands are disclosed, as well as catalytic compositions comprising the compounds supported on solid support materials. The compounds and compositions are useful as catalysts in the polymerisation of olefins. In particular, the compounds and compositions are useful catalysts in the preparation of low molecular weight polyethylene (e.g.

(Continued)

polyethylene wax) and copolymers formed from the polymerisation of ethylene and other α-olefins.

20 Claims, 38 Drawing Sheets

(51) Int. Cl.
*C08F 4/52* (2006.01)
*C07F 17/00* (2006.01)
*C08F 4/6592* (2006.01)
*C08F 10/02* (2006.01)
*C08F 4/659* (2006.01)

(56) References Cited

U.S. PATENT DOCUMENTS

| | | | |
|---|---|---|---|
| 5,696,045 A | 12/1997 | Winter et al. | |
| 5,892,081 A | 4/1999 | Suling et al. | |
| 5,939,346 A | 8/1999 | Marks et al. | |
| 5,962,714 A | 10/1999 | McCullough | |
| 6,197,985 B1 | 3/2001 | Kobata et al. | |
| 6,268,444 B1 | 7/2001 | Klosin et al. | |
| 6,469,188 B1 | 10/2002 | Miller et al. | |
| 6,509,405 B1 | 1/2003 | Kobayashi et al. | |
| 6,552,210 B1 | 4/2003 | Goeres et al. | |
| 6,583,238 B1 | 6/2003 | Gores et al. | |
| 6,664,208 B1 | 12/2003 | Fujita et al. | |
| 6,696,379 B1 | 2/2004 | Carnahan et al. | |
| 6,833,045 B1 | 12/2004 | Tokita et al. | |
| 8,404,880 B2 | 3/2013 | Kaji et al. | |
| 8,980,781 B2* | 3/2015 | O'Hare | C07F 17/00 502/152 |
| 9,273,159 B2 | 3/2016 | Ding et al. | |
| 9,340,630 B2 | 5/2016 | Kaji et al. | |
| 9,676,879 B2 | 6/2017 | Tsurugi et al. | |
| 9,884,925 B2* | 2/2018 | O'Hare | C08F 10/02 |
| 10,065,172 B2 | 9/2018 | O'Hare et al. | |
| 10,221,259 B2 | 3/2019 | O'Hare et al. | |
| 2002/0039962 A1 | 4/2002 | Schaverien et al. | |
| 2003/0176275 A1 | 9/2003 | Volker et al. | |
| 2005/0182266 A1 | 8/2005 | Schulte et al. | |
| 2005/0197471 A1 | 9/2005 | Fujita et al. | |
| 2006/0223960 A1 | 10/2006 | Jaber et al. | |
| 2007/0105712 A1 | 5/2007 | Panitzky et al. | |
| 2007/0185251 A1 | 8/2007 | Kobayashi et al. | |
| 2007/0232483 A1 | 10/2007 | Yang et al. | |
| 2008/0021115 A1 | 1/2008 | Ikematsu et al. | |
| 2008/0249255 A1 | 10/2008 | Asandei | |
| 2009/0137755 A1 | 5/2009 | Yamada et al. | |
| 2009/0275711 A1 | 11/2009 | Winslow et al. | |
| 2011/0136994 A1 | 6/2011 | Ochi et al. | |
| 2011/0282017 A1 | 11/2011 | Kaji et al. | |
| 2012/0070573 A1 | 3/2012 | Kobayashi et al. | |
| 2012/0271016 A1 | 10/2012 | O'Hare et al. | |
| 2013/0059990 A1 | 3/2013 | Kaji et al. | |
| 2013/0158307 A1 | 6/2013 | Wu et al. | |
| 2015/0057418 A1 | 2/2015 | Kaji et al. | |
| 2015/0119539 A1 | 4/2015 | McCullough | |
| 2015/0376306 A1 | 12/2015 | Tsurugi et al. | |
| 2017/0029537 A1 | 2/2017 | O'Hare et al. | |
| 2017/0121359 A1* | 5/2017 | O'Hare | C07C 1/24 |
| 2017/0306064 A1* | 10/2017 | O'Hare | C08F 110/02 |
| 2017/0313793 A1* | 11/2017 | O'Hare | C07F 17/00 |
| 2017/0320972 A1* | 11/2017 | O'Hare | C08F 110/02 |
| 2018/0022839 A1 | 1/2018 | O'Hare et al. | |
| 2018/0264444 A1 | 9/2018 | O'Hare et al. | |

FOREIGN PATENT DOCUMENTS

| | | |
|---|---|---|
| CN | 101341176 | 1/2009 |
| CN | 101815727 | 8/2010 |
| CN | 102294209 | 12/2011 |
| CN | 102294209 A | 12/2011 |
| CN | 102666561 | 9/2012 |
| CN | 103525363 | 1/2014 |
| EP | 0367597 A1 | 5/1990 |
| EP | 0645401 | 9/1994 |
| EP | 0646604 | 4/1995 |
| EP | 0707016 | 4/1996 |
| EP | 1055673 | 11/2000 |
| EP | 0704461 | 3/2001 |
| EP | 2570437 | 3/2013 |
| EP | 2706040 | 3/2014 |
| JP | H01156348 A | 6/1989 |
| JP | H01201308 A | 8/1989 |
| JP | H03502209 A | 5/1991 |
| JP | H05125223 A | 5/1993 |
| JP | 107082309 A | 3/1995 |
| JP | 3795072 | 7/2006 |
| JP | 2008050278 A | 3/2008 |
| JP | 2010-43152 | 2/2010 |
| JP | 2010-202791 | 9/2010 |
| JP | 2010534762 A | 11/2010 |
| JP | 2014118550 | 6/2014 |
| WO | WO 91/09881 | 7/1991 |
| WO | WO 1995/014024 | 5/1995 |
| WO | WO 1997/015583 | 5/1997 |
| WO | WO 1998/006728 | 2/1998 |
| WO | 9822388 | 5/1998 |
| WO | WO1998043989 | 10/1998 |
| WO | WO1998046616 | 10/1998 |
| WO | WO 1998/049211 | 11/1998 |
| WO | 1999/007716 | 2/1999 |
| WO | WO2000026266 | 5/2000 |
| WO | WO2001/090205 | 11/2001 |
| WO | WO 2003/033545 | 4/2003 |
| WO | WO2003/037941 | 5/2003 |
| WO | WO 2006/117285 | 11/2006 |
| WO | 2008/110774 | 9/2008 |
| WO | 2009017953 A2 | 2/2009 |
| WO | WO 2009/077115 | 6/2009 |
| WO | WO 2010/055652 | 5/2010 |
| WO | WO 2011/051705 | 5/2011 |
| WO | WO 2012/048091 | 4/2012 |
| WO | 2012097146 | 7/2012 |
| WO | WO 2013/146337 | 10/2013 |
| WO | WO 2014/051529 | 4/2014 |
| WO | 2014/051530 | 5/2015 |
| WO | WO 2015/159073 | 10/2015 |
| WO | WO 2015/155214 | 2/2016 |
| WO | WO 2016/075485 | 5/2016 |
| WO | WO 2016/075486 | 5/2016 |
| WO | WO 2016/075488 | 5/2016 |
| WO | WO 2016/110699 | 9/2016 |
| WO | WO 2016/110698 | 10/2016 |
| WO | 2017060689 | 4/2017 |
| WO | 2017060690 | 4/2017 |
| WO | 2017060691 | 4/2017 |

OTHER PUBLICATIONS

International Search Report and Written Opinion prepared for PCT/GB2015/053456, dated Feb. 29, 2016, 13 pages.
UK Search Report prepared for GB1420213.9, dated Sep. 1, 2015, 4 pages.
International Search Report and Written Opinion prepared for PCT/GB2015/053457, dated Feb. 5, 2016, 12 pages.
Gauthier, W. J. et al., "Elastomeric poly(propylene): Influence of catalyst structure and polymerization conditions on polymer structure and properties," Macromolecules, 1995, 28, 3771-3778.
UK Search Report prepared for GB1420214.7, dated Sep. 1, 2015, 4 pages.
International Search Report and Written Opinion prepared for PCT/GB2015/053459, dated Feb. 11, 2016, 12 pages.
Ransom, P. et al., "Synthesis, Characterization, and Polymerization Studies of Ethylenebis(hexamethylindenyl) Complexes of Zirconium and Hafnium," Organometallics, 2011, 30, 800-814.
UK Search Report prepared for GB1420215.4, dated Sep. 1, 2015, 4 pages.
Silveira, et al., "Metallocenes in ethylene polymerization studied by cyclic and differential pulse voltammetry," Appl. Catal. A: General, 2008, 344, 98-106.

(56) References Cited

OTHER PUBLICATIONS

PCT Search Report/Written Opinion prepared for PCT/GB2010/0051791, dated Feb. 7, 2011.
GB Search Report prepared for GB0918736.0, dated Mar. 22, 2010.
PCT Search Report/Written Opinion prepared for PCT/GB2015/051137, completed Jul. 16, 2015.
Alias, F. M. et al., "Synthesis, Characterisation and Structure of a Strained Ring-Tilted Bis(indenyl) iron Complex," Journal of Organometallic Chemistry, 1997, 528, 47-58.
PCT Search Report/Written Opinion prepared for PCT/GB2016/050025, dated Jul. 5, 2016.
GB Search Report prepared for GB1500111.8, dated Jul. 13, 2015.
Chen, C. et al, "Tuneable ultra high specific surface area Mg/Al-CO3 layered double hydroxides," Dalton Transactions: The International Journal for Inorganic, Organometallic and Bioinorganic Chemistry, 2015, 44, 16392-16398.
Buffet, J. et al, "Metallocene supported core @LDH catalysts for slurry phase ethylene polymerization," Chem. Communications, 2016, 52, 4076-4079.
Teng, X. et al., "Platinum-Maghemite Core-Shell Nanoparticles Using a Sequential Synthesis," Nano Letters, 2003, 3, 261-264.
Cao et al., "DNA-Modified Core-Shell Ag/Au Nanoparticles", J. Am. Chem Soc., 2001, 123, pp. 7961-7962.
Shao, M. et al., "Core-Shell Layered Double Hydroxide Microspheres with Tunable Interior Architecture for Supercapacitors," Chem. Mater., 2012, 24, 1192-1197.
PCT Search Report/Written Opinion prepared for PCT/GB2016/050024, dated Apr. 26, 2016.
GB Search Report prepared for GB1500115.9, dated Jun. 23, 2015.
Angpanitcharoen, P. et al., "Supported bis(peralkylindenyl)metallocene catalysts for slurry phase ethylene polymerization," Polyhedron, 2016, 116, 216-222.
Arnold, T. et al., "Synthesis, characterisation, and polymerisation studies of hexamethylindenyl zirconocenes and hafnocenes," Journal of Organometallic Chemistry, 2015, 792, 55-65.
Arnold, T. et al., "Polymethylaluminoxane supported zirconocene catalysts for polymerisation of ethylene," Journal of Organometallic Chemistry, 2016, 822, 85-90.
Buffet, J.C. et al., "Synthesis and characterization of permethylindenyl zirconium complexes and their use in ethylene polymerisation," RSC Adv., 2015, 5, 87456-87464.
Buffet, J.C. et al., "Popcorn shaped polyethylene using polymethylaluminoxane solid catalysts," Poster, presented Sep. 4, 2017. (CODGM).
Buffet, J.C. et al., "Popcorn shaped polyethylene using polymethylaluminoxane solid catalysts," Poster, presented Apr. 10, 2017. (ISACS).
Lamb, J., "Synthesis of Asymmetric Zirconocenes for Ethylene Polymerisation Catalysis," presentation for Dalton Younger Members Event, Sep. 7, 2017.
Chen, C. et al., "Core-shell $SiO_2$@LDHs with tuneable size, composition and morphology," Chem. Commun., 2015, 51, 3462-3465.
Chen, C. et al., "Core-shell zeolite @aqueous miscible organic-layered double hydroxides," Chem. Sci., 2016, 7, 1457-1461.
Buffet, J.C., "Core shell@LDH solid catalysts for polymerisation," presentation, Jul. 18, 2016, 16 pages.
Buffet, J.C. et al., "Core shell@LDH supported catalysts for polymerisation," presentation, May 29, 2017, 16 pages.
Janiak, C. et al., "Polymeric Aluminoxanes: A Possible Cocatalytic Support Material for Ziegler-Natta-Type Metallocene Catalysts," Journal of Polymer Science: Part A: Polymer Chemistry, 1993,31, 2959-2968.
Buffet, Jean-Charles et al., "Zirconocene alkoxides and aryloxides for the polymerization of L- and rac-lactide," Journal of Organometallic Chemistry 801 (2016) 87-95. Published online Oct. 23, 2015.
Ren, Wenshan et al., "Synthesis, structure, and catalytic activity of benzyl thorium metallocenes," Inorganic Chemistry Communications 30 (2013) 26-28. Published online Jan. 31, 2013.
Ning, Yalan et al., "Neutral Metallocene Ester Enolate and Non-Metallocene Alkoxy Complexes of Zirconium for Catalytic Ring-Opening Polymerization of Cyclic Esters," Organometallics 2008, 27, 5632-5640.
Buffet, Jean-Charles et al., "Group 4 metal initiators for the controlled stereoselective polymerization of lactide monomers," *Chem. Commun.*, 2011, 47, 4796-4798.
Hayakawa, Michiya et al., "Living ring-opening polymerization of lactones using cationic zirconocene complex catalysts,"*Macromol. Chem. Phys.* 198, 1305-1317 (1997).
Hayakawa, Michiya et al., "Living ring-opening polymerization of cyclic carbonate using cationic zirconocene complex as catalyst," *Macromol. Rapid Commun.* 17, 865-870 (1996).
Turner, Zoe R. et al., "Chiral Group 4 Cyclopentadienyl Complexes and Their Use in Polymerization of Lactide Monomers," *Organometallics* 2014, 33, 3891-3903.
UK Search Report prepared for Application No. GB1607989.9, dated Nov. 9, 2016, 5 pages.
PCT International Search Report and Written Opinion prepared for PCT/GB2017/051257, dated Jul. 17, 2017, 12 pages.
UK Search Report prepared for Application No. GB1607989.9, dated Mar. 29, 2017, 2 pages.
PCT Search Report and Written Opinion prepared for PCT/GB2017/051726, completed Sep. 7, 2017.
United Kingdom Search Report and Written Opinion prepared for GB1610464.8, completed Dec. 19, 2016.
Klosin et al., "Development of Group IV Molecular Catalysts for High temperature Ethylene-a-Olefin Copolymerization Reactions" Acc. Chem. Res. 2015, 48, 2004-2016.
Takeuchi et al., "Transition metal compounds, olefin polymerization catalysts, and processes for producing olefin polymers using the catalysts", XP002772081, retrieved from STN, Database accession No. 1995:960184.
PCT Search Report and Written Opinion prepared for PCT/GB2017/051725, completed Jul. 21, 2017.
United Kingdom Search Report and Written Opinion prepared for GB 1610457.2, completed Mar. 23, 2017.
Villasenor et al., "Neutral Dimethylzirconocene Complexes as Initiators for the Ring-Opening Polymerization of ε-Caprolactone," Eur. J. Inorg. Chem., 2013, 1184-1196, published online Dec. 13, 2012.
Jitonnom et al., "Effects of Silicon-Bridge and p-Ligands on the Electronic Structures and Related Properties of Dimethyl Zirconocene Polymerization Catalysts: A Comparative Theoretical Study," Chiang Mai J. Sci, 2014, 41 (5.2), 1220-1229.
Van der Meulen et al., "Catalytic Ring-Opening Polymerization of Renewable Macrolactones to High Molecular Weight Polyethylene-like Polymers," Macromolecules, 2011, 44, 4301-4305.
Chen, "A facile synthesis of monodispersed hierarchical layered double hydroxide on silica spheres for efficient removal of pharmaceuticals from water," Journal of Materials Chemistry A, 2013, 1, 3877-3880.
Chadwick, Mark F. et al., "Zirconium and Hafnium Permethylpentalene Compounds," Organometallics, 2016, 35 (12), pp. 2092-2100. Published online Jun. 9, 2016.
Fraser, Duncan A. X. et al., "Titanium and Zirconium Permethylpentalene Complexes, Pn*MCpRX, as Ethylene Polymerization Catalysts," Organometallics, 2016, 35 (16), pp. 2664-2674. Published online Aug. 1, 2016.
Buffet, Jean-Charles et al., "Ethylene polymerization using solid catalysts based on layered double hydroxides," Polym. Chem., 2015, 6, 2493. First published Feb. 12, 2015.
Cooper, Robert T., "Synthesis and Characterization of Group 4 Permethylpentalene Dichloride Complexes," Organometallics, 2013, 32 (7), pp. 2228-2233. Published online Mar. 19, 2013.
Chadwick, Mark F. et al., "Early Transition Metal Permethylpentalene Complexes for the Polymerization of Ethylene," Organometallics, 2014, 33 (14), pp. 3775-3785. Published online Jul. 7, 2014.
Fraser, Duncan A. et al., "Titanium and Zirconium η8-Permethylpentalene Complexes as Ethylene Polymerisation Catalysts," Poster, presented Sep. 3, 2015.

(56) References Cited

OTHER PUBLICATIONS

Fraser, Duncan A. X. et al., "Ti and Zr n8-Permethylpentalene Complexes as Ethylene Polymerisation Catalysts," Poster, presented Jul. 17, 2016.
Turner, Zoë R. et al., "Permethylpentalene group 4 alkoxide for lactide polymerisation," Poster, presented Mar. 30, 2017.
Fraser, Duncan A. X. et al., "Pn*ZrCpRX: Evidence for a New Mechanism of Ethylene Polymerisation," Poster, presented Jul. 9, 2017.
International Search Report and Written Opinion for PCT/GB2016/053086 dated Dec. 19, 2016.
UK Search Report for 1517650.6 dated Apr. 19, 2016.
Severn et al., "Methylaluminoxane (MAO), Silica and a Complex: The 'Holy Trinity' of Supported Single-site Catalyst: Tailor-Made Polymers: via Immobilization of Alpha-Olefin Polymerization Catalysts," 2008, Wiley, pp. 95-138.
International Search Report and Written Opinion for PCT/GB2016/053085 dated Dec. 13, 2016.
UK Search Report for GB1517648.0 dated Apr. 19, 2016.
PCT Search Report and Written Opinion prepared for PCT/GB2017/051305, completed Jul. 5, 2017.
The United Kingdom Search Report and Written Opinion prepared for GB1608384.2, completed Feb. 17, 2017.
Janiak, C. "Metallocene Catalysts for Olefin Polymerization," Chapter 9 of Metallocenes: Synthesis Reactivity Applications Published by WILEY-VCH Verlag GmbH, Published Aug. 27, 1998, pp. 547-623.
Meunier, P. and Pirio, N., "Zirconium & Hafnium: Organometallic Chemistry," Encyclopedia of Inorganic Chemistry, 2006, pp. 1-38.
Tudor, Jonathan et al., "Synthesis and Structure of [Fe(η5-C9Me6)(η5-05H4)SiMe2]: A Mixed-Ring [1] Ferrocenophane," Organometallics, 1999, 18, 2281-2284.

* cited by examiner

UNSYMMETRICAL METALLOCENE CATALYSTS AND USES THEREOF

CROSS-REFERENCE TO RELATED APPLICATIONS

This application is a national stage entry under 35 USC § 371 of PCT International Application Number PCT/GB2017/051305, filed May 10, 2017, which claims priority to United Kingdom Patent Application Number 16083841.2, filed May 12, 2016, the entire disclosures of which are expressly incorporated by reference herein.

INTRODUCTION

The present invention relates to unsymmetrical metallocene catalysts, their methods of preparation, and their use in catalysing the polymerisation of olefins.

BACKGROUND OF THE INVENTION

It is well known that ethylene (and α-olefins in general) can be readily polymerized at low or medium pressures in the presence of certain transition metal catalysts. These catalysts are generally known as Zeigler-Natta type catalysts.

A particular group of these Ziegler-Natta type catalysts, which catalyse the polymerisation of ethylene (and α-olefins in general), comprise an aluminoxane activator and a metallocene transition metal catalyst. Metallocenes comprise a metal bound between two $\eta^5$-cyclopentadienyl type ligands. Generally the $\eta^5$-cyclopentadienyl type ligands are selected from $\eta^5$-cyclopentadienyl, $\eta^5$-indenyl and $\eta^5$-fluorenyl.

It is also well known that these $\eta^5$-cyclopentadienyl type ligands can be modified in a myriad of ways. One particular modification involves the introduction of a linking group between the two cyclopentadienyl rings to form ansa-metallocenes.

Numerous ansa-metallocenes of transition metals are known in the art. However, there remains a need for improved ansa-metallocene catalysts for use in polyolefin polymerisation reactions. In particular, there remains a need for new metallocene catalysts with high polymerisation activities/efficiencies.

There is also a need for catalysts that can produce polyethylenes with particular characteristics. For example, catalysts capable of producing linear high density polyethylene (LHDPE) with a relatively narrow dispersion in polymer chain length are desirable. In addition, there is a need for catalysts capable of producing lower molecular weight polyethylene, including polyethylene wax. Moreover, there is a need for catalysts that can produce polyethylene copolymers having good co-monomer incorporation and good intermolecular uniformity of polymer properties.

WO2011/051705 discloses ansa-metallocene catalysts based on two $\eta^5$-indenyl ligands linked via an ethylene group.

WO2015/159073 discloses ansa-metallocene catalysts based on two $\eta^5$-indenyl ligands linked via a silylene group.

In spite of the advances made by the aforementioned technologies, there remains a need for ansa-metallocene catalysts having improved polymerisation activity. Moreover, due to the high value that industry places on such materials, there is also a need for ansa-metallocene catalysts capable of catalyzing the preparation of lower molecular weight polyethylene, including polyethylene wax. It is even further desirable that such catalysts can be easily synthesised.

The present invention was devised with the foregoing in mind.

SUMMARY OF THE INVENTION

According to a first aspect of the present invention there is provided a compound according to formula (I) defined herein.

According to a second aspect of the present invention there is provided a composition comprising a compound of formula (I) defined herein and a support material.

According to a third aspect of the present invention there is provided a use of a compound of formula (I) defined herein or a composition defined herein in the polymerisation of one or more olefins.

According to a fourth aspect of the present invention there is provided a polymerisation process comprising the step of:
  a) polymerising one or more olefins in the presence of:
    i. a composition as defined herein.

According to a fifth aspect of the present invention there is provided a polymerisation process comprising the step of:
  a) polymerising ethylene in the presence of:
    i. a composition comprising solid MAO and a compound according to formula (II) defined herein; and
    ii. hydrogen;
wherein the mole ratio of hydrogen to ethylene in step a) ranges from 0.0365:1 to 0.3:1.

DETAILED DESCRIPTION OF THE INVENTION

Definitions

The term "(m-nC)" or "(m-nC) group" used alone or as a prefix, refers to any group having m to n carbon atoms The term "alkyl" as used herein includes reference to a straight or branched chain alkyl moieties, typically having 1, 2, 3, 4, 5 or 6 carbon atoms. This term includes reference to groups such as methyl, ethyl, propyl (n-propyl or isopropyl), butyl (n-butyl, sec-butyl or tert-butyl), pentyl (including neopentyl), hexyl and the like. In particular, an alkyl may have 1, 2, 3 or 4 carbon atoms.

The term "aryl" as used herein includes reference to an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like.

The term "aryl(m-nC)alkyl" means an aryl group covalently attached to a (m-nC)alkylene group. Examples of aryl-(m-nC)alkyl groups include benzyl, phenylethyl, and the like.

The term "halogen" or "halo" as used herein includes reference to F, Cl, Br or I. In a particular, halogen may be F or Cl, of which Cl is more common.

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible. For example, amino or hydroxy groups with free hydrogen may be unstable if bound to carbon atoms with unsaturated (e.g. olefinic) bonds. Additionally, it will of course be understood that the substituents described herein may themselves be substituted by any substituent, subject to the aforementioned restriction to appropriate substitutions as recognised by the skilled person.

Compounds of the Invention

As described hereinbefore, the present invention provides a compound of formula (I) shows below:

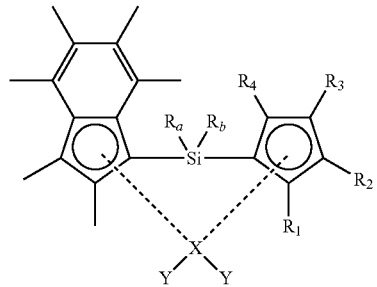

(I)

wherein $R_1$, $R_2$, $R_3$ and $R_4$ are each independently selected from hydrogen and (1-4C)alkyl;

$R_a$ and $R_b$ are each independently (1-4C)alkyl;

X is zirconium or hafnium; and each Y is independently selected from halo, phenyl, aryl(1-2C)alkyl, or $(CH_2)_z Si(CH_3)_3$, any of which is optionally substituted with one or more (1-3C)alkyl or halo;

wherein z is 1, 2 or 3;

with the proviso that at least one of $R_1$, $R_2$, $R_3$ and $R_4$ is not hydrogen.

It will be appreciated that the structural formula (I) presented above is intended to show the substituent groups in a clear manner. A more representative illustration of the spatial arrangement of the groups is shown in the alternative representation below:

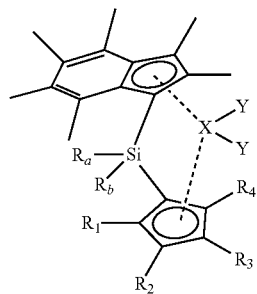

It will also be appreciated that when substituents $R_1$ and $R_2$ are not identical to substituents $R_3$ and $R_4$ respectively, the compounds of the present invention may be present as meso or rac isomers, and the present invention includes both such isomeric forms. It will also be appreciated that a number of other positional isomers are envisaged by formula (I), such as those present when the cyclopentadienyl ring is substituted with 1, 2 or 3 (1-4C)alkyl groups (e.g. methyl).

A person skilled in the art will appreciate that a mixture of isomers of the compound of the present invention may be used for catalysis applications, or the isomers may be separated and used individually (using techniques well known in the art, such as, for example, fractional crystallization).

If the structure of a compound of formula (I) is such that rac and meso isomers do exist, the compound may be present in the rac form only, or in the meso form only.

When compared with currently-available symmetrical cyclopentadienyl-based metallocene complexes, the unsymmetrical cyclopentadienyl-based ansa-metallocene compounds of the invention are particularly useful as catalysts in the polymerisation of olefins, notably ethylene. In particular, the compounds of the invention exhibit improved catalytic characteristics when used in the preparation of polyethylene wax, which is highly valued by industry. Moreover, the compounds of the invention exhibit improved catalytic characteristics when used in the preparation of copolymers formed from the polymerisation of ethylene and one or more other α-olefins. Copolymers produced in this manner exhibit good inter-molecular uniformity.

In an embodiment, each Y is independently selected from halo, methyl, propyl, neopentyl, phenyl, benzyl, and $CH_2Si(CH_3)_3$. Suitably, each Y is independently selected from halo, methyl, propyl, neopentyl, phenyl and benzyl. More suitably, each Y is independently selected from halo, methyl and propyl.

In another embodiment, each Y is independently selected from halo, (1-5C)alkyl (e.g. methyl, ethyl propyl, butyl or pentyl), phenyl, benzyl, and $CH_2Si(CH_3)_3$. Suitably, each Y is independently selected from halo, methyl, propyl, neopentyl, phenyl and benzyl. More suitably, each Y is independently selected from halo, methyl and propyl.

In another embodiment, both Y groups are methyl.

In another embodiment, each Y is independently halo. Suitably, at least one Y group is chloro. More suitably, both Y groups are chloro.

In another embodiment, $R_a$ and $R_b$ are each independently (1-3C)alkyl.

In another embodiment, $R_a$ and $R_b$ are each independently methyl or propyl. Suitably, at least one of $R_a$ and $R_b$ is methyl. More suitably, both $R_a$ and $R_b$ are methyl. Alternatively, both $R_a$ and $R_b$ are ethyl.

In another embodiment, X is zirconium.

In another embodiment, $R_1$, $R_2$, $R_3$ and $R_4$ are each independently selected from hydrogen, methyl, n-butyl and t-butyl.

In another embodiment, the compound of formula (I) has a structure according to formula (Ia) or (Ib) shown below:

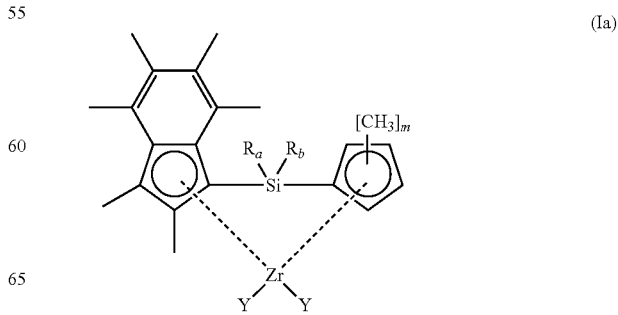

(Ia)

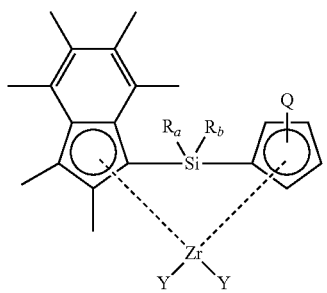

(Ib)

wherein $R_a$, $R_b$ and Y have any of the definitions recited hereinbefore;

m is 1, 2, 3, or 4; and

Q is n-butyl or t-butyl.

In an embodiment of the compounds of formula (Ia) or (Ib), $R_a$ and $R_b$ are each independently methyl or propyl. Suitably, at least one of $R_a$ and $R_b$ is methyl. More suitably, both $R_a$ and $R_b$ are methyl.

In another embodiment of the compounds of formula (Ia) or (Ib), each Y is independently selected from halo, methyl, propyl, neopentyl, phenyl, benzyl, and $CH_2Si(CH_3)_3$. Suitably, each Y is independently selected from halo, methyl, propyl, neopentyl, phenyl and benzyl. More suitably, each Y is independently selected from halo, methyl and propyl.

In another embodiment of the compounds of formula (Ia) or (Ib), each Y is independently halo. Suitably, at least one Y group is chloro. More suitably, both Y groups are chloro.

In another embodiment of the compounds of formula (Ia) or (Ib), at least one Y group is bromo. More suitably, both Y groups are bromo.

In another embodiment of the compounds of formula (Ia) or (Ib), both Y groups are benzyl.

In another embodiment of the compounds of formula (Ia) or (Ib), both Y groups are methyl.

In another embodiment of the compounds of formula (Ia) or (Ib), m is 1, 3 or 4. Suitably, m is 1.

In another embodiment, the compound of formula (I) has a structure according to formula (Ic) or (Id) shown below:

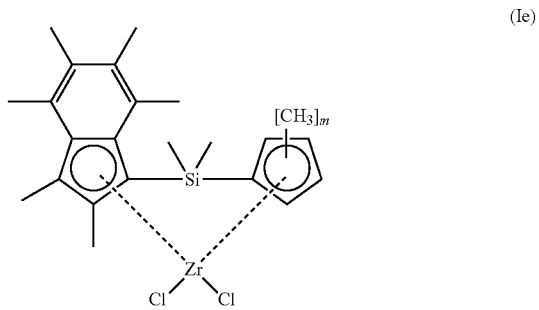

(Ic)

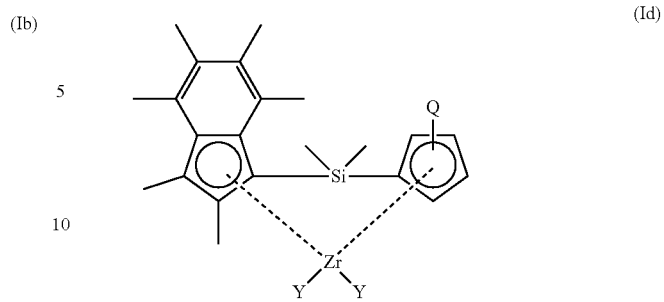

(Id)

wherein each Y independently has any of the definitions recited hereinbefore;

m is 1, 2, 3, or 4; and

Q is n-butyl or t-butyl.

In an embodiment of the compounds of formula (Ic) or (Id), each Y is independently selected from halo, methyl, propyl, neopentyl, phenyl, benzyl, and $CH_2Si(CH_3)_3$. Suitably, each Y is independently selected from halo, methyl, propyl, neopentyl, phenyl and benzyl. More suitably, each Y is independently selected from halo, methyl and propyl.

In another embodiment of the compounds of formula (Ic) or (Id), each Y is independently halo. Suitably, at least one Y group is chloro. More suitably, both Y groups are chloro.

In another embodiment of the compounds of formula (Ic) or (Id), at least one Y group is bromo. More suitably, both Y groups are bromo.

In another embodiment of the compounds of formula (Ic) or (Id), both Y groups are benzyl.

In another embodiment of the compounds of formula (Ic) or (Id), both Y groups are methyl.

In another embodiment of the compounds of formula (Ic) or (Id), m is 1, 3 or 4. Suitably, m is 1.

In another embodiment, the compound of formula (I) has a structure according to formula (Ie) or (If) shown below:

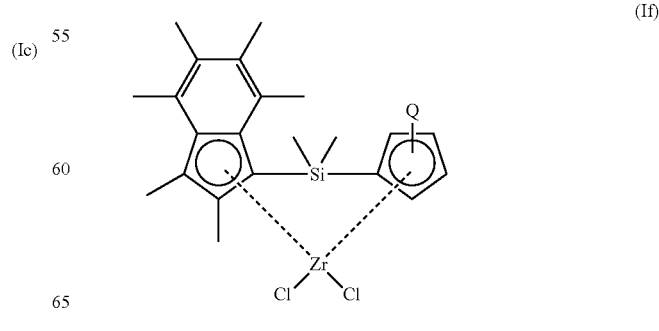

(Ie)

(If)

wherein m is 1, 2, 3, or 4; and

Q is n-butyl or t-butyl.

In an embodiment of the compounds of formula (Ie) or (If), m is 1, 3 or 4. Suitably, m is 1.

In an embodiment, the compound of formula (I) has any one of the following structures:

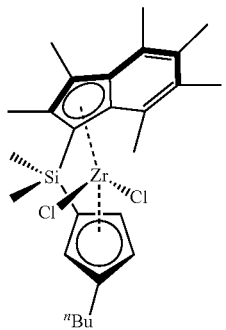 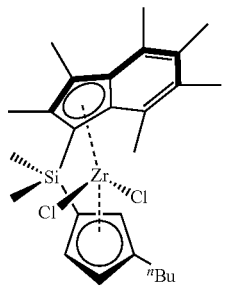

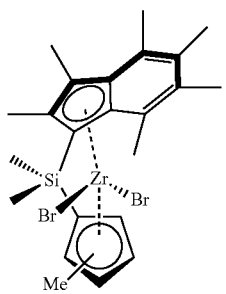 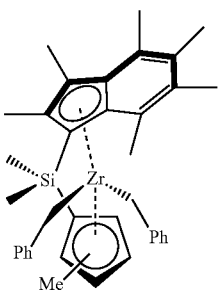

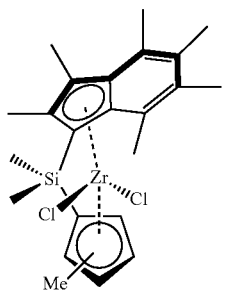 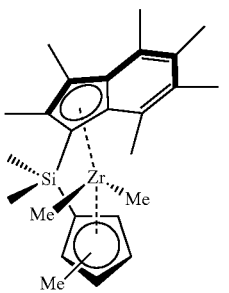

In an embodiment the compound of formula (I) has any one of the following structures:

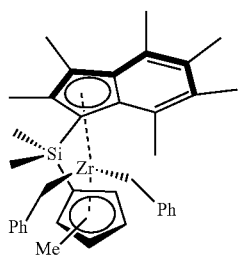 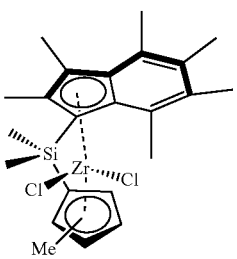

-continued

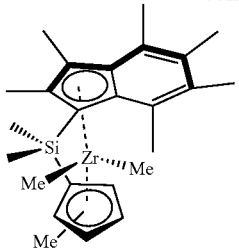

Compositions of the Invention

As described hereinbefore, the present invention also provides a composition comprising a compound of formula (I) as defined herein and a support material.

When compared with currently-available symmetrical cyclopentadienyl-based metallocene complexes, the supported unsymmetrical cyclopentadienyl-based ansa-metallocene compounds of the invention are particularly useful as catalysts in the polymerisation of olefins, notably ethylene. In particular, the compositions of the invention exhibit improved catalytic characteristics when used in the preparation of polyethylene wax, which is highly valued by industry. Moreover, the compositions of the invention exhibit improved catalytic characteristics when used in the preparation of copolymers formed from the polymerisation of ethylene and one or more other α-olefins. Copolymers produced in this manner exhibit good inter-molecular uniformity.

In the compositions of the invention, the compound of formula (I) is immobilised on the support matter. The compound of formula (I) may be immobilized directly on support, or via a suitable linker. The compound of formula (I) may be immobilized on the support by one or more ionic or covalent interactions.

It will be understood that the support is a solid support, in the sense that it is insoluble in the conditions required for polymerisation of olefins. In an embodiment, the support is selected from silica, LDH (layered double hydroxide), solid MAO, or any other inorganic support material. Compositions comprising silica, LDH or solid MAO supports are useful as heterogeneous catalysts in the slurry-phase polymerisation or copolymerisation of olefins, especially ethylene.

Exemplary LDHs include AMO-LDH (aqueous-miscible organic solvent LDH), such as those having the formula $[Mg_{1-x}Al_x(OH)_2]^{x+}(A^{n-})_{x/n}.y(H_2O).w(solvent)$, in which $0.1<x>0.9$; A=anion eg. $CO_3^{2-}$, $OH^-$, $F^-$, $Cl^-$, $Br^-$, $I^-$, $SO_4^{2-}$, $NO_3^-$ and $PO_4^{3-}$; w is a number less than 1; y is 0 or a number greater than 0 which gives compounds optionally hydrated with a stoichiometric amount or a non-stoichiometric amount of an aqueous-miscible organic solvent (AMO-solvent), such as acetone. It will be appreciated that the AMO-solvent can be exchanged for water.

Supports such as silica and AMO-LDH may be subjected to a heat treatment prior to use. An exemplary heat treatment involves heating the support to 400-600° C. (for silicas) or 100-150° C. (for AMO-LDHs) in a nitrogen atmosphere.

Supports such as silica and AMO-LDH may also contain a portion of methylaluminoxane (MAO). Such materials may be referred to as silica-supported MAO and LDH-supported MAO.

Supports such as silica and LDH may be used alongside a separate activator species. Suitable activator species include organo aluminium compounds (e.g. alkyl aluminium compounds). Suitably, the activator is triisobutylaluminium (TIBA).

In a particularly suitably embodiment, the support used in the composition is solid MAO. Compositions comprising solid MAO supports are particularly useful as catalysts in the preparation of polyethylene wax, which is highly valued by industry. The terms "solid MAO", "polymethylaluminoxane" and "solid polymethylaluminoxane" are used synonymously herein to refer to a solid-phase material having the general formula -[(Me)AlO]$_n$—, wherein n is an integer from 10 to 50. Any suitable solid MAO may be used.

There exist numerous substantial structural and behavioural differences between solid MAO and other (non-solid) MAOs. Perhaps most notably, solid MAO is distinguished from other MAOs as it is insoluble in hydrocarbon solvents and so acts as a heterogeneous support system. The solid MAO useful in the compositions of the invention are insoluble in toluene and hexane.

In contrast to non-solid (hydrocarbon-soluble) MAOs, which are traditionally used as an activator species in slurry polymerisation or to modify the surface of a separate solid support material (e.g. SiO$_2$), the solid MAOs useful as part of the present invention are themselves suitable for use as solid-phase support materials, without the need for an additional activator. Hence, compositions of the invention comprising solid MAO are devoid of any other species that could be considered a solid support (e.g. inorganic material such as SiO$_2$, Al$_2$O$_3$ and ZrO$_2$). Moreover, given the dual function of the solid MAO (as catalytic support and activator species), the compositions of the invention comprising solid MAO contain no additional catalytic activator species.

In an embodiment, the solid MAO is prepared by heating a solution containing MAO and a hydrocarbon solvent (e.g. toluene), so as to precipitate solid MAO. The solution containing MAO and a hydrocarbon solvent may be prepared by reacting trimethyl aluminium and benzoic acid in a hydrocarbon solvent (e.g. toluene), and then heating the resulting mixture.

In an embodiment, the solid MAO is prepared according to the following protocol:

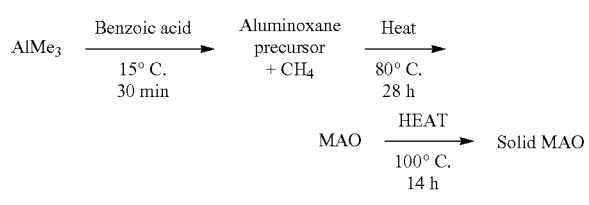

The properties of the solid MAO can be adjusted by altering one or more of the processing variables used during its synthesis. For example, in the above-outlined protocol, the properties of the solid MAO may be adjusted by varying the Al:O ratio, by fixing the amount of AlMe$_3$ and varying the amount of benzoic acid. Exemplary Al:O ratios are 1:1, 1.1:1, 1.2:1, 1.3:1, 1.4:1 and 1.6:1. Suitably the Al:O ratio is 1.2:1 or 1.3:1. Alternatively, the properties of the solid MAO may be adjusted by fixing the amount of benzoic acid and varying the amount of AlMe$_3$.

In another embodiment, the solid MAO is prepared according to the following protocol:

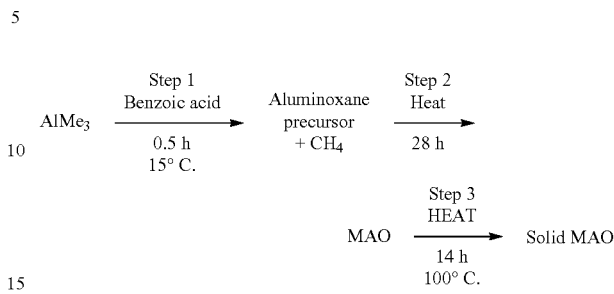

In the above protocol, steps 1 and 2 may be kept constant, with step 2 being varied. The temperature of step 2 may be 70-100° C. (e.g. 70° C., 80° C., 90° C. or 100° C.). The duration of step 2 may be from 12 to 28 hours (e.g. 12, 20 or 28 hours). The duration of step 2 may be from 5 minutes to 24 hours. Step 3 may be conducted in a solvent such as toluene.

In an embodiment, the aluminium content of the solid MAO falls within the range of 36-41 wt %.

The solid MAO useful as part of the present invention is characterised by extremely low solubility in toluene and n-hexane. In an embodiment, the solubility in n-hexane at 25° C. of the solid MAO is 0-2 mol %. Suitably, the solubility in n-hexane at 25° C. of the solid MAO is 0-1 mol %. More suitably, the solubility in n-hexane at 25° C. of the solid MAO is 0-0.2 mol %. Alternatively or additionally, the solubility in toluene at 25° C. of the solid MAO is 0-2 mol %. Suitably, the solubility in toluene at 25° C. of the solid MAO is 0-1 mol %. More suitably, the solubility in toluene at 25° C. of the solid MAO is 0-0.5 mol %. The solubility in solvents can be measured by the method described in JP-B(KOKOKU)-H07 42301.

In a particularly suitable embodiment, the solid MAO is as described in US2013/0059990, WO2010/055652 or WO2013/146337, and is obtainable from Tosoh Finechem Corporation, Japan.

In an embodiment, the mole ratio of support material to the compound of formula (I) is 50:1 to 500:1. Suitably, the mole ratio of support material to the compound of formula (I) is 75:1 to 400:1.

In another embodiment, when X (of the compound of formula (I)) is hafnium, the mole ratio of solid MAO to the compound of formula (II) is 125:1 to 250:1.

In another embodiment, when X (of the compound of formula (I)) is zirconium, the mole ratio of solid MAO to the compound of formula (II) is 175:1 to 350:1.

In another embodiment, when X (of the compound of formula (I)) is hafnium, the mole ratio of solid MAO to the compound of formula (II) is 50:1 to 250:1.

In another embodiment, when X (of the compound of formula (I)) is zirconium, the mole ratio of solid MAO to the compound of formula (II) is 50:1 to 350:1, or alternatively 50:1 to 250:1.

Synthesis of Compounds of the Invention

Generally, the processes of preparing a compound of the present invention as defined herein comprises:

(i) reacting a compound of formula A:

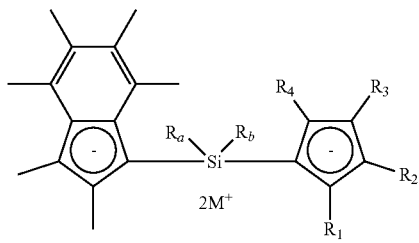

(wherein $R_1$, $R_2$, $R_3$, $R_4$, $R_a$ and $R_b$ are each as defined hereinbefore and M is Li, Na or K)
with a compound of the formula B:

B (wherein X is as defined hereinbefore and Y' is halo (particularly chloro or bromo))
in the presence of a suitable solvent to form a compound of formula I':

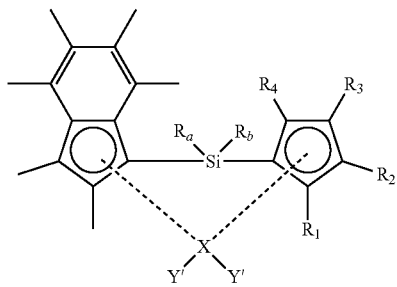

and optionally thereafter:
(ii) reacting the compound of formula I' above with MY" (wherein M is as defined above and Y" is a group Y as defined herein other than halo), in the presence of a suitable solvent to form the compound of the formula I" shown below

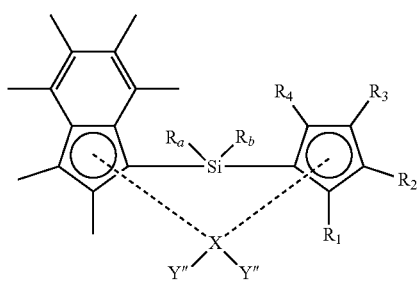

Suitably, M is Li in step (i) of the process defined above.

In an embodiment, the compound of formula B is provided as a solvate. In particular, the compound of formula B may be provided as $X(Y')_4 \cdot THF_p$, where p is an integer (e.g. 2).

Any suitable solvent may be used for step (i) of the process defined above. A particularly suitable solvent is toluene, benzene or THF.

If a compound of formula I in which Y is other than halo is required, then the compound of formula I' above may be further reacted in the manner defined in step (ii) to provide a compound of formula I".

Any suitable solvent may be used for step (ii) of the process defined above. A suitable solvent may be, for example, diethyl ether, toluene, THF, dichloromethane, chloroform, hexane DMF, benzene etc.

A person of skill in the art will be able to select suitable reaction conditions (e.g. temperature, pressures, reaction times, agitation etc.) for such a synthesis.

Processes by which compounds of the formula A above can be prepared are well known art. For example, a process for the synthesis of a di-sodium ethylene-bis-hexamethylindenyl ligand of formula A is described in J. Organomet. Chem., 694, (2009), 1059-1068.

Compounds of formula A may generally be prepared by:
(i) Reacting a compound of formula C

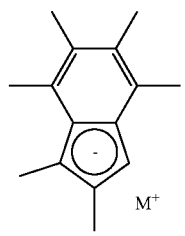

(wherein M is lithium, sodium, or potassium) with one equivalent of a compound having formula D shown below:

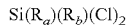

D (wherein $R_a$ and $R_b$ are as defined hereinbefore)
to form the compound of the formula E shown below:

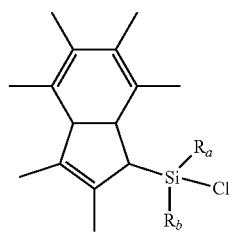

(ii) Reacting the compound of formula E with a compound of formula F shown below:

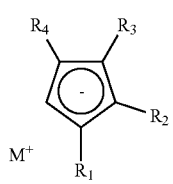

(wherein $R_1$, $R_2$, $R_3$ and $R_4$ are as defined hereinbefore, and M is lithium, sodium or potassium).

Compounds of formulae C and F can be readily synthesized by techniques well known in the art.

Any suitable solvent may be used for step (i) of the above process. A particularly suitable solvent is THF.

Similarly, any suitable solvent may be used for step (ii) of the above process. A suitable solvent may be, for example, toluene, THF, DMF etc.

A person of skill in the art will be able to select suitable reaction conditions (e.g. temperature, pressures, reaction times, agitation etc.) for such a synthesis.

Uses of the Invention

As described hereinbefore, the present invention also provides a use of a compound of formula (I) defined herein or a composition defined herein in the polymerisation of one or more olefins.

The compounds and compositions of the invention may be used as catalysts in the preparation of a variety of polymers, including polyalkylenes (e.g. polyethylene) of varying molecular weight and copolymers. Such polymers and copolymers may be prepared by homogeneous solution-phase polymerisation (e.g. using the compounds of the invention), or heterogeneous slurry-phase polymerisation (e.g. using the compositions of the invention).

In an embodiment, the one or more olefins is ethylene. The compounds and compositions of the invention are therefore useful in the preparation of polyethylene homopolymers.

In another embodiment, the one or more olefins is ethylene, and the ethylene monomers are polymerised in the presence of hydrogen. The compounds and compositions of the invention are particularly useful in the preparation of lower molecular weight, in particular polyethylene wax. The low molecular weight polyethylenes may have a molecular weight ranging from 1000 to 30,000 Da. Alternatively, the low molecular weight polyethylenes may have a molecular weight ranging from 1000 to 25,000 Da. Alternatively still, the low molecular weight polyethylenes may have a molecular weight ranging from 1000 to 15,000 Da.

Polyethylenes having low molecular weights are highly valued in industry as a result of the unique characteristics that such materials possess. As a consequence, low molecular weight polyethylenes find use in a variety of industrial applications. Polyethylene wax is a low molecular weight polyethylene that, because of its molecular weight, exhibits wax-like physical characteristics. Polyethylene waxes may be prepared by polymerising ethylene in the presence of species capable of controlling the molecular weight of the growing polymer. Hydrogen is an effective controller of polyethylene molecular weight. Owing to their unique polymer properties, polyethylene waxes are used in industry in a diverse array of applications, ranging from lubrication to surface modification. Typically, polyethylene waxes are solid or semi-solid at room temperature, having molecular weight, Mw, of 2,000 to 10,000 Da. The compositions of the invention, in particular those comprising solid MAO as a support material, are particularly useful as catalysts in the preparation of polyethylene wax by polymerising ethylene in the presence of hydrogen.

The polyethylene wax prepared by polymerising ethylene in the presence of hydrogen and a compound or composition of the invention may have a density of 0.96-0.97 g/cm³.

In another embodiment, the one or more olefins are ethylene and one or more (3-8C)α-olefin (e.g. 1-butene or 1-hexene). The compounds and compositions of the invention are therefore useful as catalysts in the preparation of copolymers formed from the polymerisation of ethylene and one or more (3-8C)α-olefin. An exemplary copolymer is prepared by polymerising ethylene and 1-butene, and has a density of 0.93-0.95 g/cm³.

Methods of the Invention

As defined hereinbefore, the present invention also provides a polymerisation process comprising the step of:
   a) polymerising one or more olefins in the presence of:
      i. a compound or composition defined herein.

The compounds and compositions of the invention may be used as catalysts in the preparation of a variety of polymers, including polyalkylenes (e.g. polyethylene) of varying molecular weight and copolymers. Such polymers and copolymers may be prepared by homogeneous solution-phase polymerisation (e.g. using the compounds of the invention), or heterogeneous slurry-phase polymerisation (e.g. using the compositions of the invention).

In an embodiment, the one or more olefins is ethylene. The compounds and compositions of the invention are therefore useful in the preparation of polyethylene homopolymers.

In another embodiment, step a) involves polymerising one or more olefins in the presence of a composition defined herein. Suitably, the composition comprises solid MAO as a support material.

In another embodiment, step a) comprises polymerising ethylene in the presence of i) a composition defined herein, and ii) hydrogen. The compositions of the invention, in particular those comprising solid MAO as support material, are particularly useful as catalysts in the preparation of low molecular weight polyethylene, such as polyethylene wax. In these embodiments of the invention, hydrogen acts to control the molecular weight of the growing polyethylene, which results in polymers having a viscosity (and molecular weight) in the range observed for polyethylene waxes. As discussed hereinbefore, low molecular weight polyethylene, such as polyethylene waxes, are highly valued by industry, due to their unique properties, which make them suitable candidates for a broad arrange of applications.

In embodiments where step a) comprises polymerising ethylene in the presence of i) a composition defined herein, and ii) hydrogen, any suitable mole ratio of hydrogen to ethylene many be used. In an embodiment, the mole ratio of hydrogen to ethylene ranges from 0.001:1 to 0.3:1 (0.1 mol % to 30 mol % hydrogen in ethylene feed stream). Alternatively, the mole ratio of hydrogen to ethylene ranges from 0.001:1 to 0.15:1. Alternatively still, the mole ratio of hydrogen to ethylene ranges from 0.001:1 to 0.1:1. Alternatively still, the mole ratio of hydrogen to ethylene ranges from 0.005:1 to 0.08:1. Alternatively still, the mole ratio of hydrogen to ethylene ranges from 0.01:1 to 0.08:1. In a particular embodiment, the mole ratio of hydrogen to ethylene ranges from 0.03:1 to 0.05:1. In another particular embodiment, the mole ratio of hydrogen to ethylene ranges from 0.005:1 to 0.05:1.

In those embodiments where step a) comprises polymerising ethylene in the presence of i) a composition defined herein, and ii) hydrogen, step a) may be conducted at a temperature of 30-120° C.

In those embodiments where step a) comprises polymerising ethylene in the presence of i) a composition defined herein, and ii) hydrogen, step a) may be conducted at a pressure of 1-10 bar.

In those embodiments where step a) comprises polymerising ethylene in the presence of i) a composition defined herein, and ii) hydrogen, step a) may be conducted for between 1 minute and 5 hours. Suitably, step a) may be conducted for between 5 minutes and 2 hours.

In another embodiment, the one or more olefins is ethylene and one or more α-olefins (e.g. 1-butene or 1-hexene). The compounds and compositions of the invention are therefore useful as catalysts in the preparation of copolymers formed from the polymerisation of ethylene and one or more (3-8C)α-olefin.

In those embodiments where ethylene is copolymerised with one or more α-olefins, the quantity of the one or more (3-8C)α-olefin, relative to the quantity of ethylene, is 0.05-10 mol %. Suitably, the quantity of the one or more (3-8C)α-olefin, relative to the quantity of ethylene, is 0.05-5 mol %. More suitably, the quantity of the one or more (3-8C)α-olefin, relative to the quantity of ethylene, is 0.05-2 mol %.

In those embodiments where ethylene is copolymerised with one or more α-olefins, step a) may be conducted at a temperature of 30-120° C.

In those embodiments where ethylene is copolymerised with one or more α-olefins, step a) may be conducted at a pressure of 1-10 bar.

In those embodiments where ethylene is copolymerised with one or more α-olefins, step a) may be conducted for between 1 minute and 5 hours. Suitably, step a) may be conducted for between 5 minutes and 2 hours.

In an embodiment, step a) is conducted in the presence of one of more compounds selected from triethyl aluminium, methyl aluminoxane, trimethyl aluminium and triisobutyl aluminium. Suitably, step a) is conducted in the presence of triisobutyl aluminium or triethyl aluminium.

As described hereinbefore, the present invention also provides a polymerisation process comprising the step of:
a) polymerising ethylene in the presence of:
  i. a composition comprising solid MAO and a compound according to formula (II) shown below

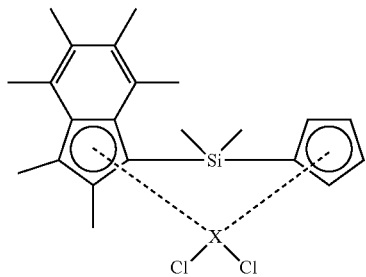

(II)

wherein X is zirconium or hafnium; and
ii. hydrogen;
wherein the mole ratio of hydrogen to ethylene in step a) ranges from 0.0365 to 0.3:1.

The process of the invention, employing unsymmetrical unsubstituted cyclopentadienyl-based ansa-metallocenes of formula (II), results in the formation of low molecular weight polyethylene, such as polyethylene wax, having particularly advantageous properties. In particular, processes employing the compounds of formula (II) can be used to produce polyethylene wax having especially low molecular weights (in the range of 2000 to 10000 Da).

Polyethylenes (e.g. polyethylene waxes) produced by a process employing compounds of formula (II) may have a molecular weight, $M_w$, lower than 5000 Da. Alternatively, the polyethylene (e.g. polyethylene waxes) produced by a process employing compounds of formula (II) may have a molecular weight, $M_w$, lower than 3000 Da.

In an embodiment, the mole ratio of hydrogen to ethylene in step a) ranges from 0.0365:1 to 0.1:1. Suitably, the mole ratio of hydrogen to ethylene in step a) ranges from 0.0365:1 to 0.08:1. More suitably, the mole ratio of hydrogen to ethylene in step a) ranges from 0.038:1 to 0.06:1. Most suitably, the mole ratio of hydrogen to ethylene in step a) ranges from 0.04:1 to 0.055:1.

In another embodiment, step a) is conducted at a temperature of 30-120° C.

In another embodiment, step a) is conducted at a pressure of 1-10 bar.

In an embodiment, in step a), the mole ratio of solid MAO to the compound of formula (II) is 50:1 to 400:1

In another embodiment, in step a), the mole ratio of solid MAO to the compound of formula (II) is 125:1 to 400:1. Suitably, when X (in the compound of formula (II)) is hafnium, the mole ratio of solid MAO to the compound of formula (II) is 125:1 to 250:1. Suitably, when X (in the compound of formula (II)) is zirconium, the mole ratio of solid MAO to the compound of formula (II) is 175:1 to 350:1. Most suitably, X (in the compound of formula (II)) is zirconium, and the mole ratio of solid MAO to the compound of formula (II) is 175:1 to 225:1.

In another embodiment, when X (in the compound of formula (II)) is zirconium, the mole ratio of solid MAO to the compound of formula (II) is 250:1 to 350:1.

In an embodiment, step a) is conducted in the presence of one of more compounds selected from triethyl aluminium, methyl aluminoxane, trimethyl aluminium and triisobutyl aluminium. Suitably, step a) is conducted in the presence of triisobutyl aluminium or triethyl aluminium.

EXAMPLES

Examples of the invention will now be described, for the purpose of illustration only, with reference to the accompanying figures, in which.

Figure 13:
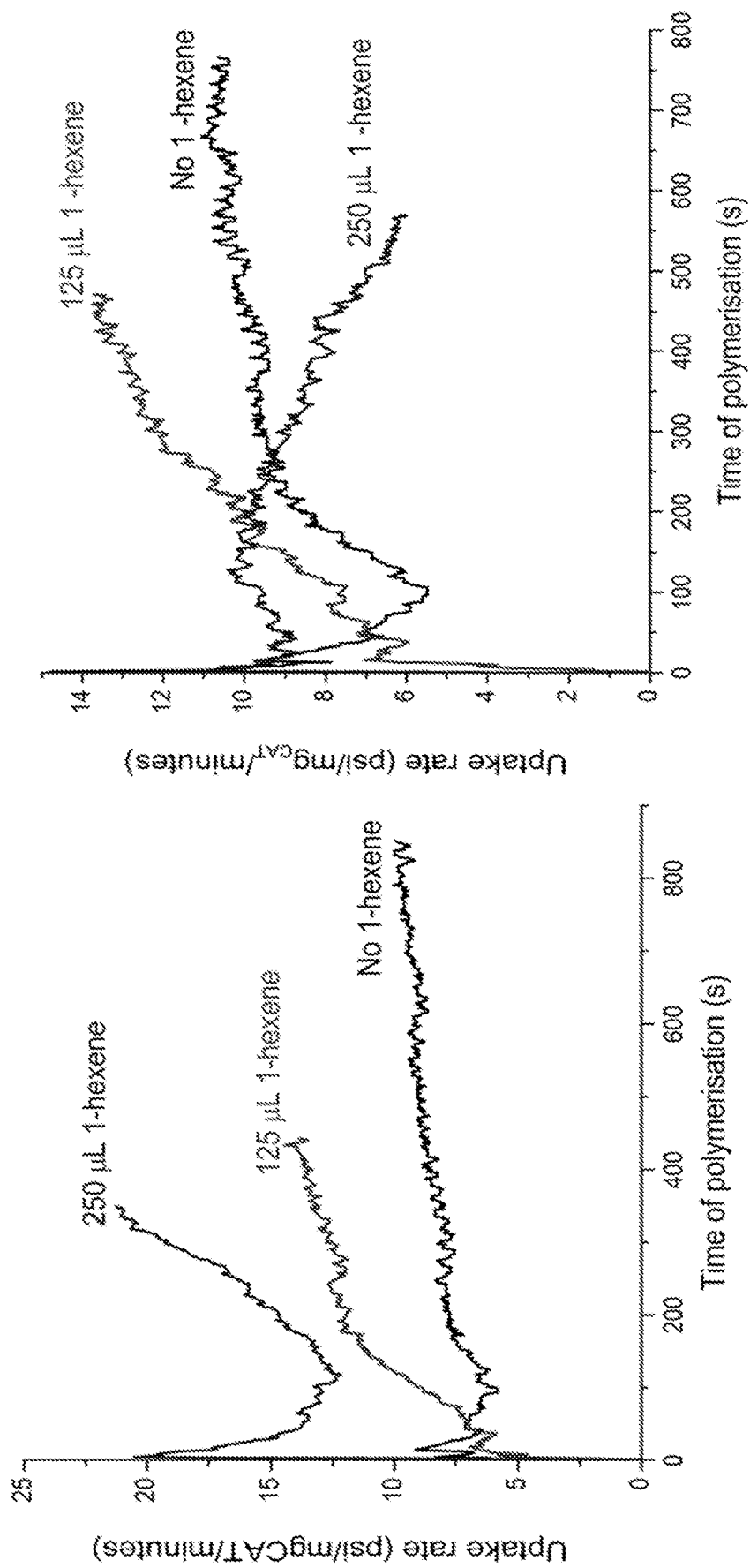

FIG. 13 shows uptake rate of ethylene for copolymerisation of ethylene and 1-hexene; using Solid MAO/$^{Me2}$SB(Cp,I*)ZrCl$_2$ catalyst using [Al]$_0$/[Zr]$_0$ ratio of 100 (left) and 150 (right). Polymerisation conditions: 0.05 mg of catalyst, 5 mL heptane, 8 bar and 80° C.

Figure 14:
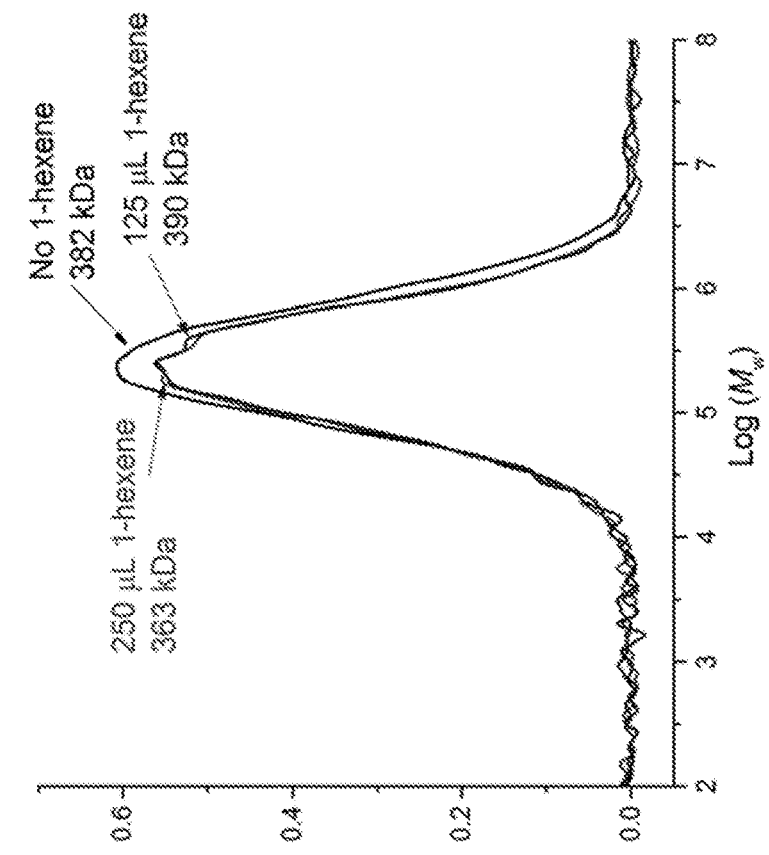
Figure 14:
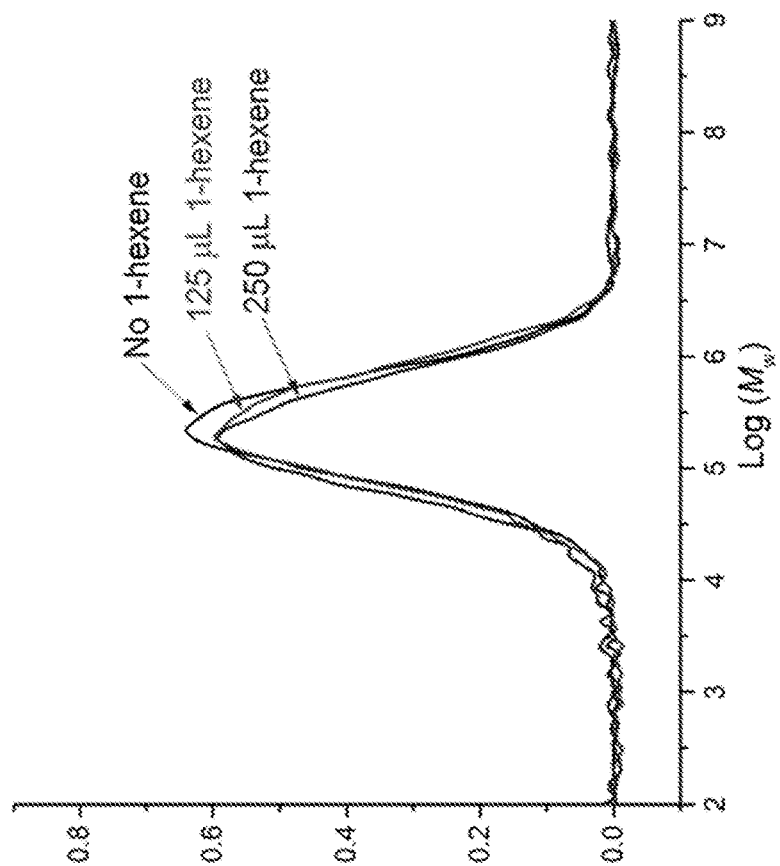

FIG. 14 shows molecular weights, $M_w$, for copolymerisation of ethylene and 1-hexene using Solid MAO/$^{Me2}$SB(Cp,I*)ZrCl$_2$ catalyst using [Al]$_0$/[Zr]$_0$ ratio of 100 (left) and 150 (right). Polymerisation conditions: 0.05 mg of catalyst, 5 mL heptane, 8 bar and 80° C.

Figure 15:
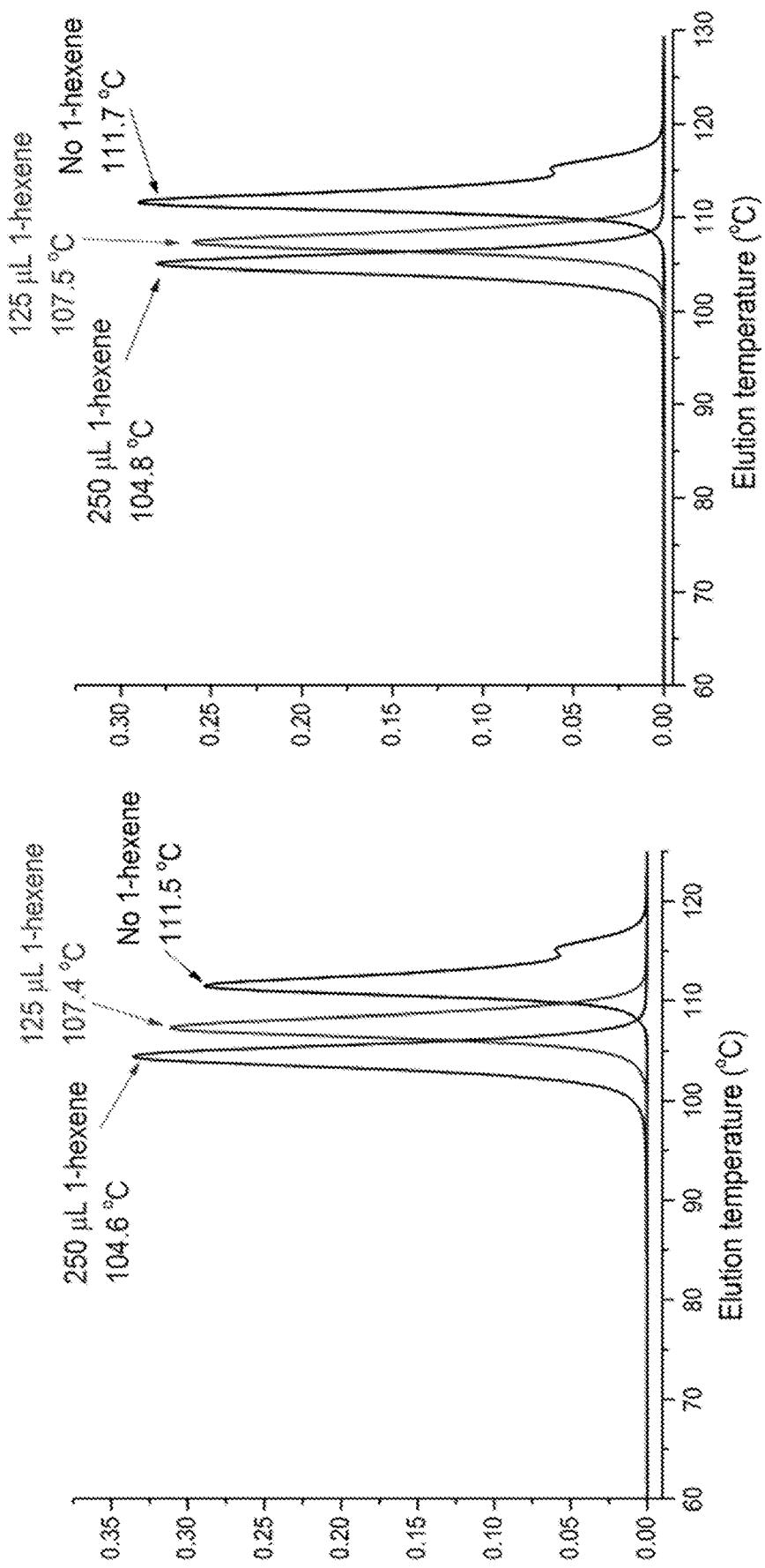

FIG. 15 shows CEF traces for the copolymerisation of ethylene and 1-hexene using Solid MAO/$^{Me2}$SB(Cp,I*)ZrCl$_2$ catalyst using [Al]$_0$/[Zr]$_0$ ratio of 100 (left) and 150 (right). Polymerisation conditions: 0.05 mg of catalyst, 5 mL heptane, 8 bar and 80 CC.

Figure 16:
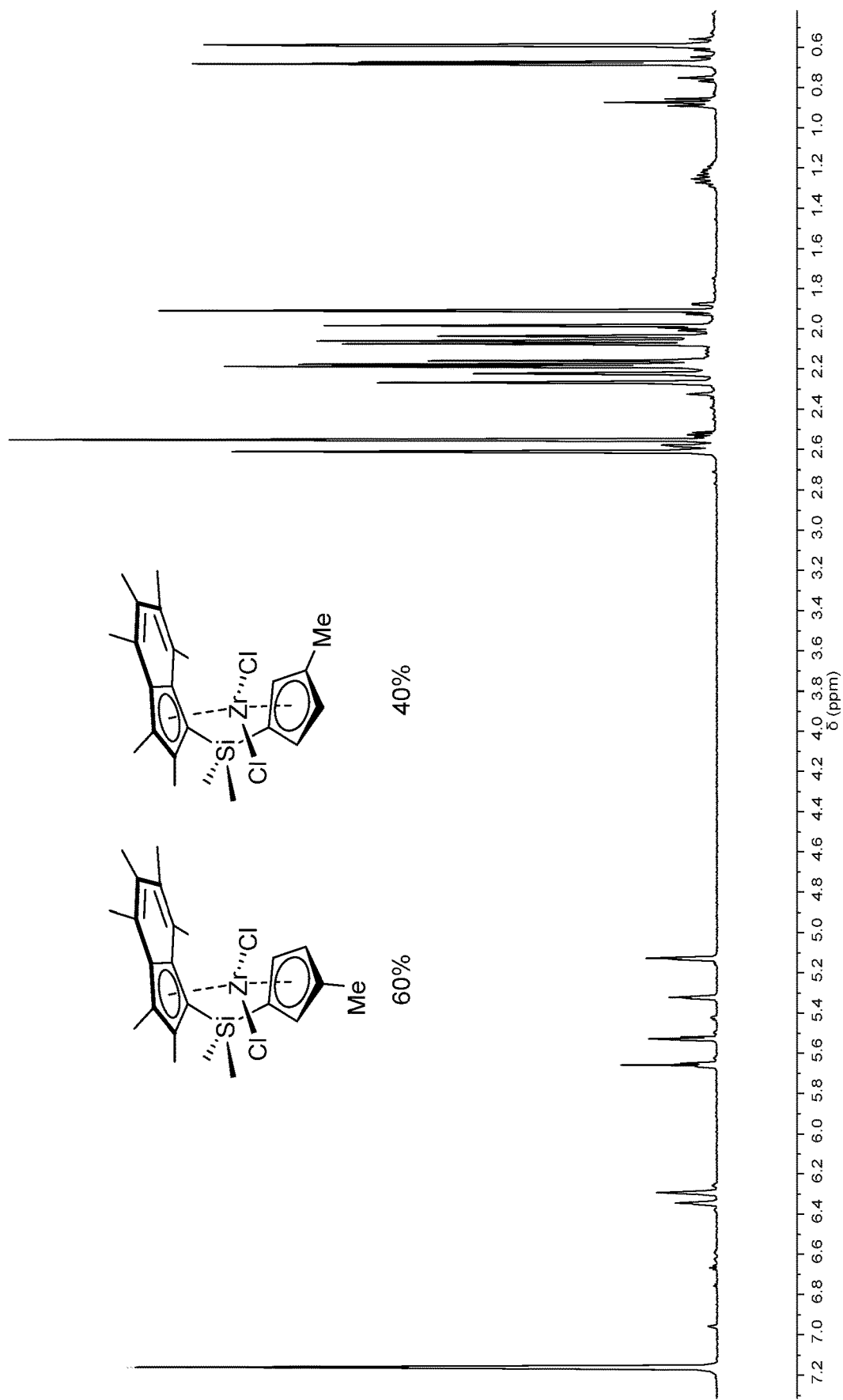

FIG. 16 shows the $^1$H NMR spectrum of two isomers of $^{Me_2}$SB(Cp$^{Me}$,I*)ZrCl$_2$ in a 40:60 ratio with the methyl group on the cyclopentadienyl ring (298 K, 400 MHz, benzene-d$_6$).

Figure 17:
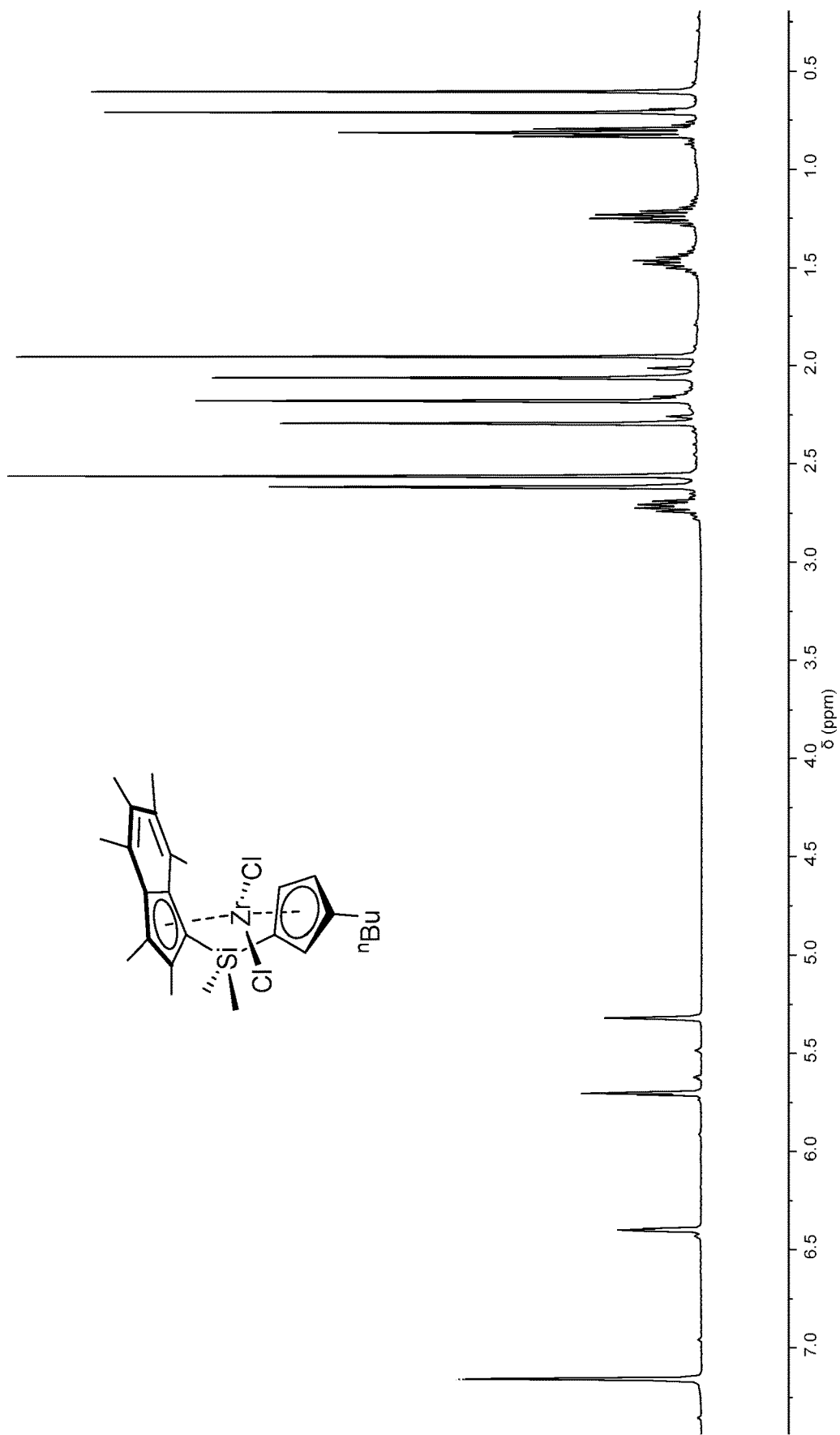

FIG. 17 shows the $^1$H NMR spectrum of one isomer of $^{Me_2}$SB(Cp$^{nBu}$,I*)ZrCl$_2$ with the n-butyl group on the cyclopentadienyl ring (298 K, 400 MHz, benzene-d$_6$).

Figure 18:
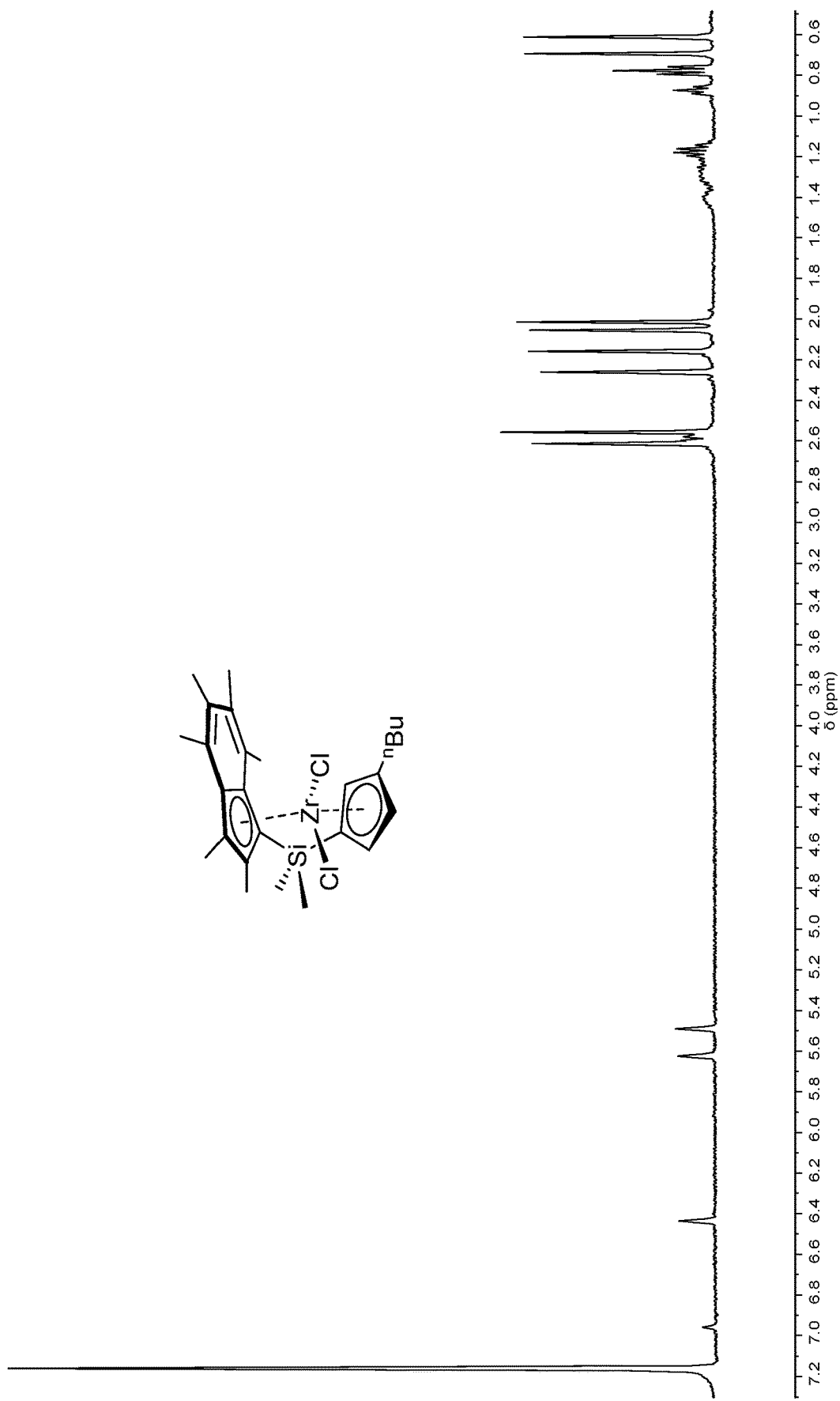

FIG. 18 shows the $^1$H NMR spectrum of the other isomer of $^{Me_2}$SB(Cp$^{nBu}$,I*)ZrCl$_2$ with the n-butyl group on the cyclopentadienyl ring (298 K, 400 MHz, benzene-d$_6$).

Figure 19:
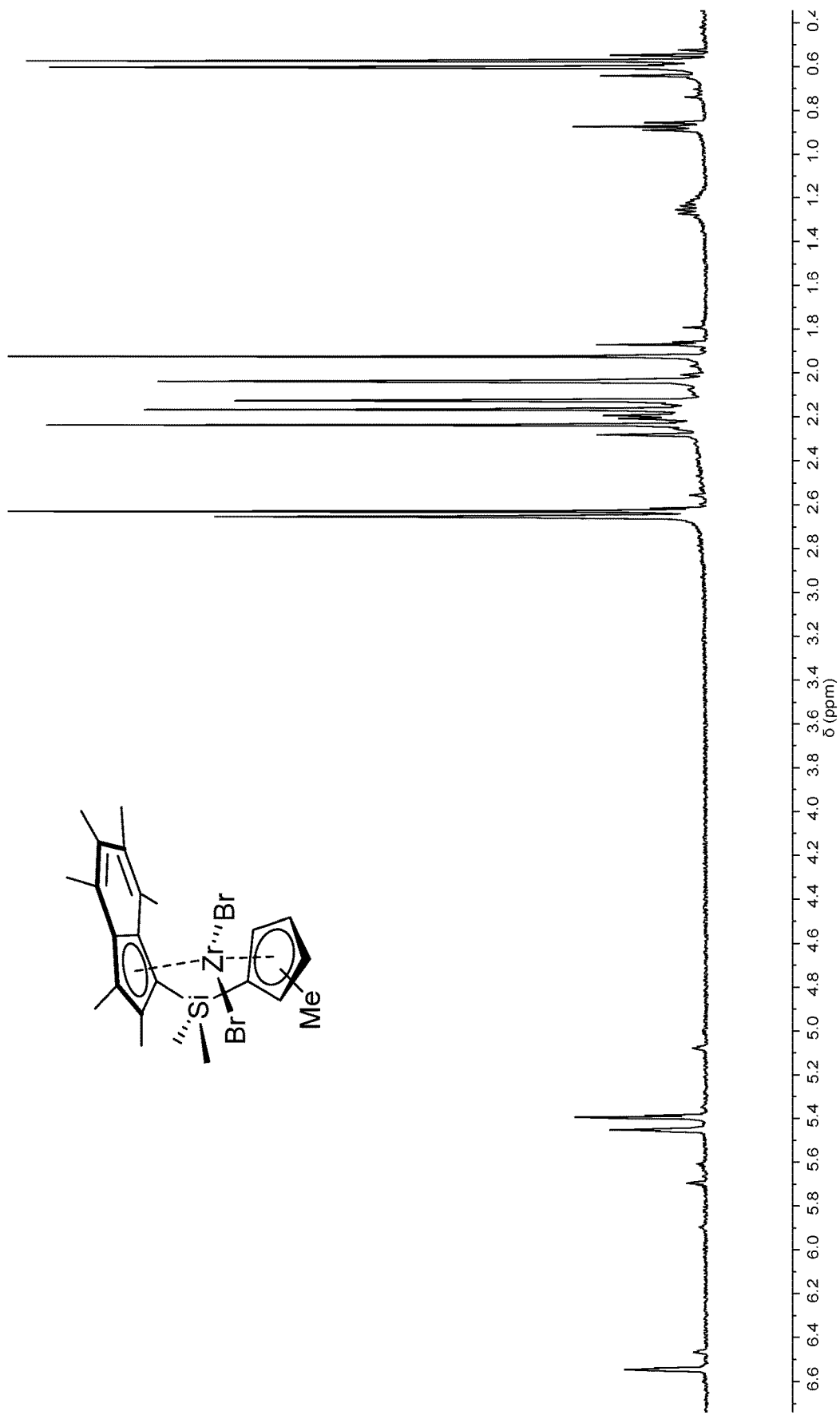

FIG. 19 shows the $^1$H NMR spectrum of one isomer of $^{Me_2}$SB(Cp$^{Me}$,I*)ZrBr$_2$ (298 K, 400 MHz, benzene-4).

Figure 20:
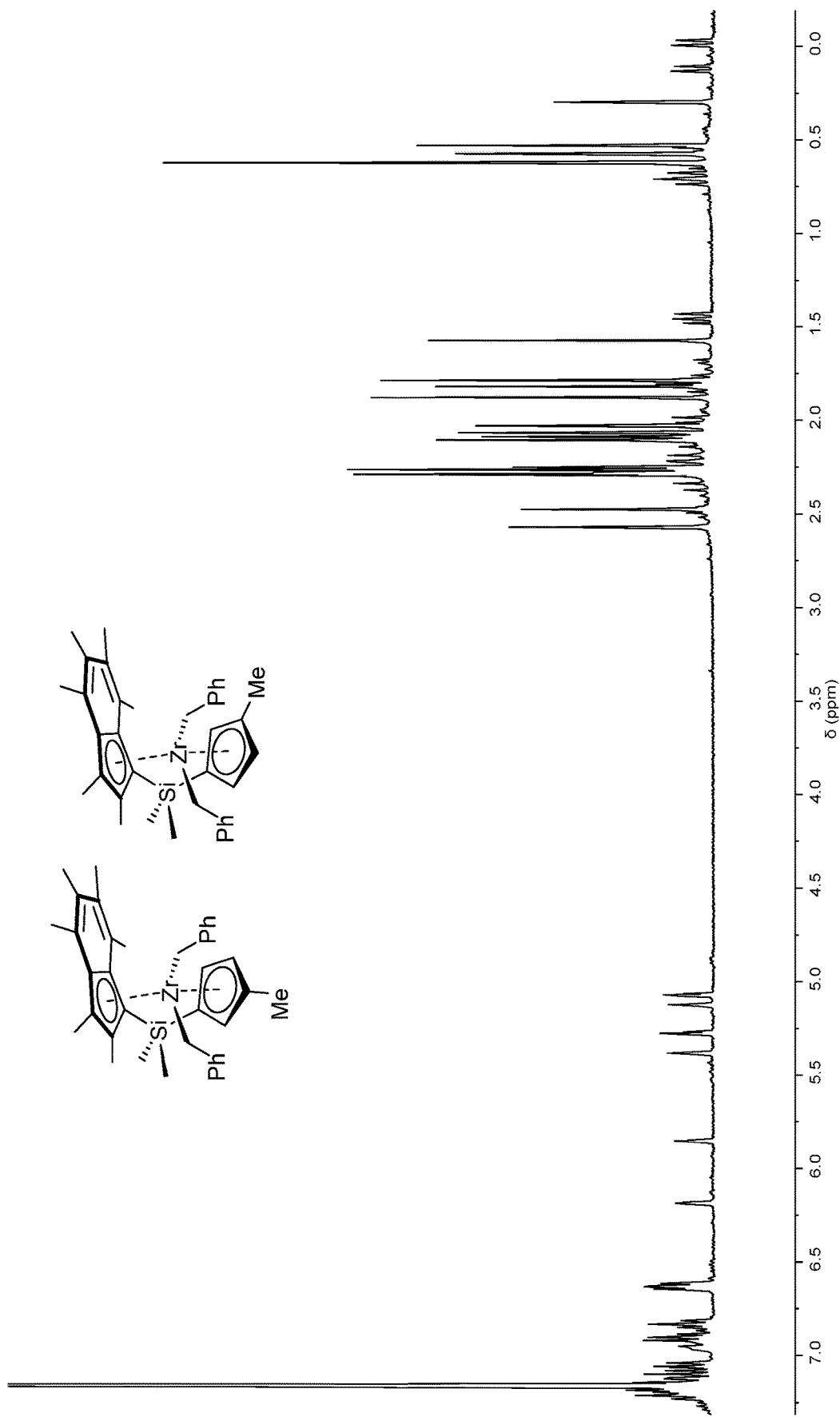

FIG. 20 shows the $^1$H NMR spectrum of two isomers of $^{Me_2}$SB(Cp$^{Me}$,I*)Zr(CH$_2$Ph)$_2$ in a 40:60 ratio with the methyl group on the cyclopentadienyl ring (298 K, 400 MHz, benzene-d$_6$).

Figure 21:
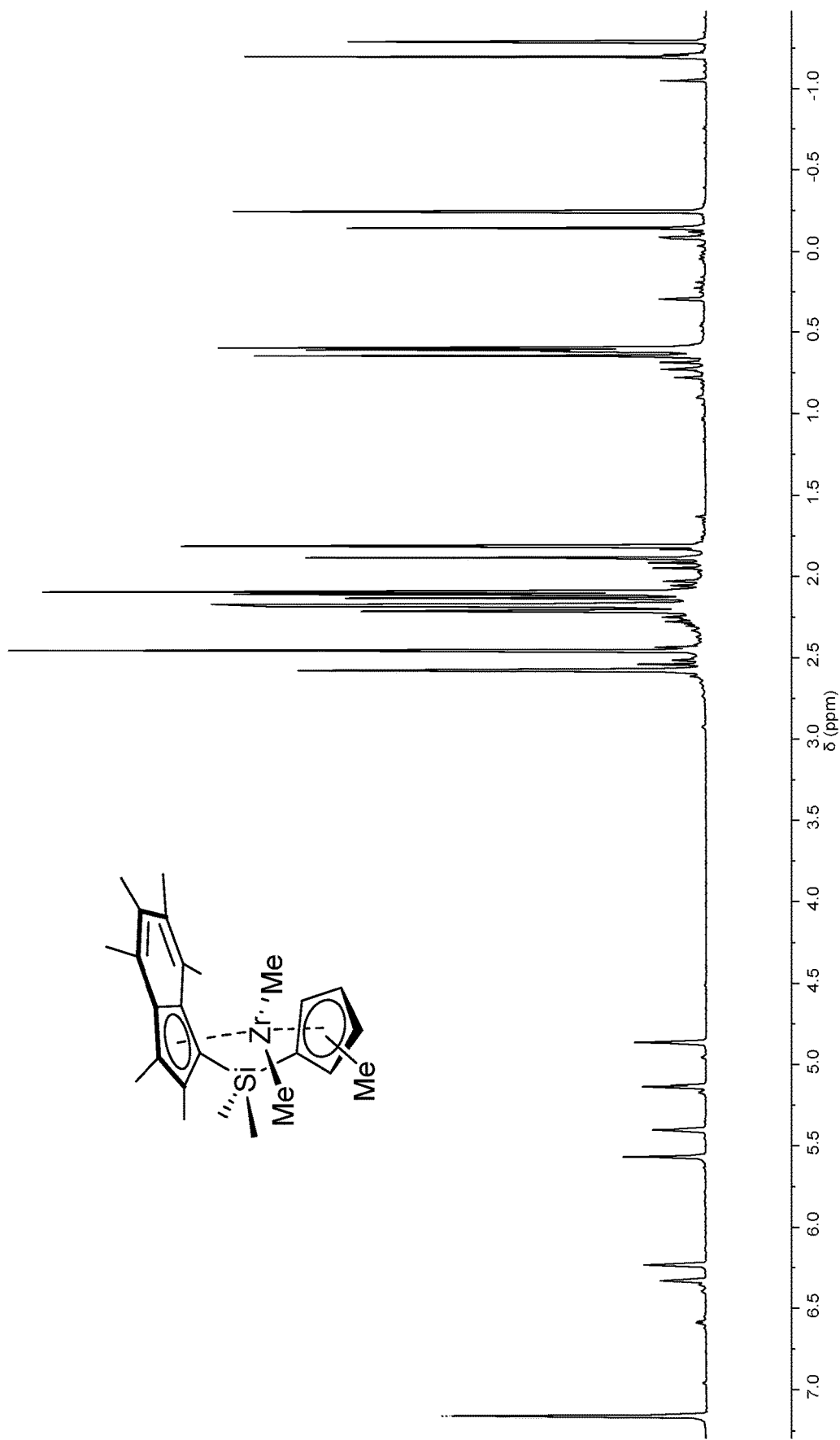

FIG. 21 shows the $^1$H NMR spectrum of two isomers of $^{Me_2}$SB(Cp$^{Me}$,I*)ZrMe$_2$ in a 40:60 ratio with the methyl group on the cyclopentadienyl ring (298 K, 400 MHz, benzene-d$_6$).

Figure 22:
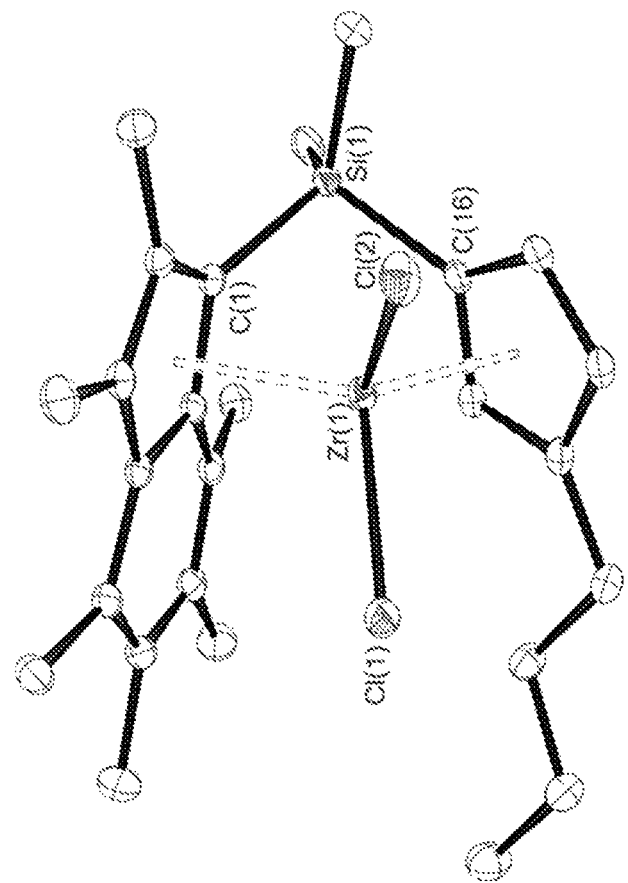
Figure 22:
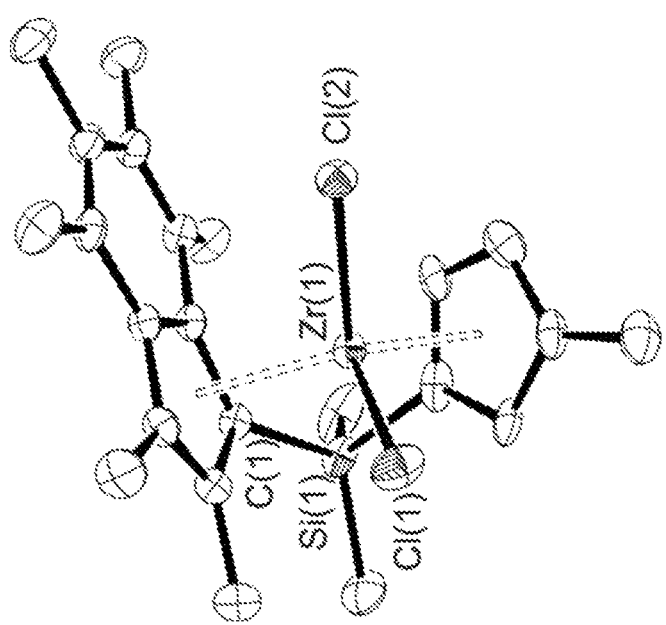

FIG. 22 shows the crystal structures for $^{Me_2}$SB(Cp$^{Me}$,I*)ZrCl$_2$ and $^{Me_2}$SB(Cp$^{nBu}$,I*)ZrCl$_2$.

Figure 23:
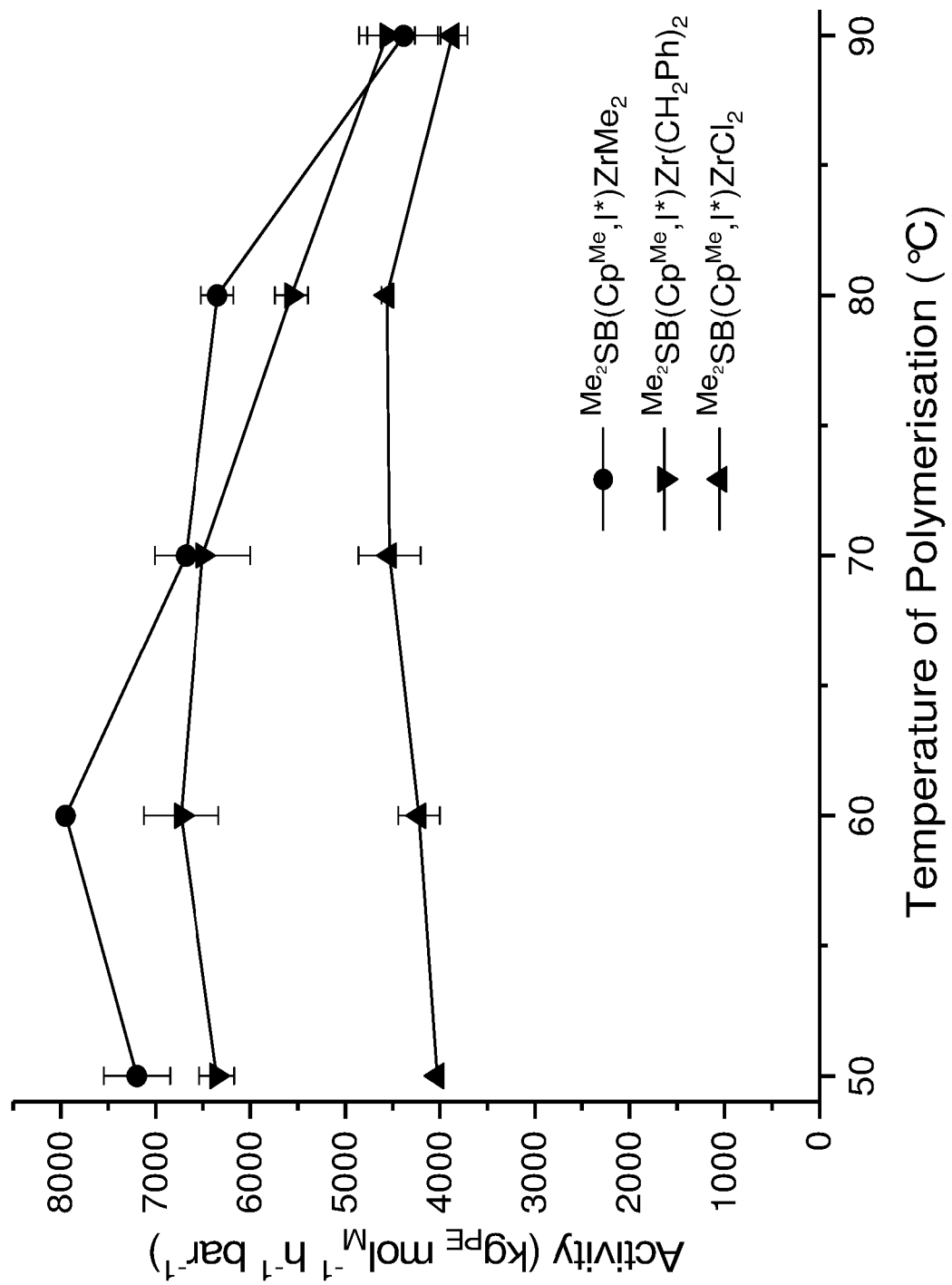

FIG. 23 shows activity vs temperature of polymerisation of ethylene using solid MAO supported/$^{Me_2}$SB(Cp$^{Me}$,I*)ZrMe$_2$ (circle), $^{Me_2}$SB(Cp$^{Me}$,I*)Zr(CH$_2$Ph)$_2$ (inverted triangle), $^{Me_2}$SB(Cp$^{Me}$,I*)ZrCl$_2$ (triangle). Polymerisation conditions: 10 mg of catalyst, 50 mL hexanes, 2 bar, 30 minutes, 150 mg of TIBA and [Al]$_0$/[Zr]$_0$=200.

Figure 24:
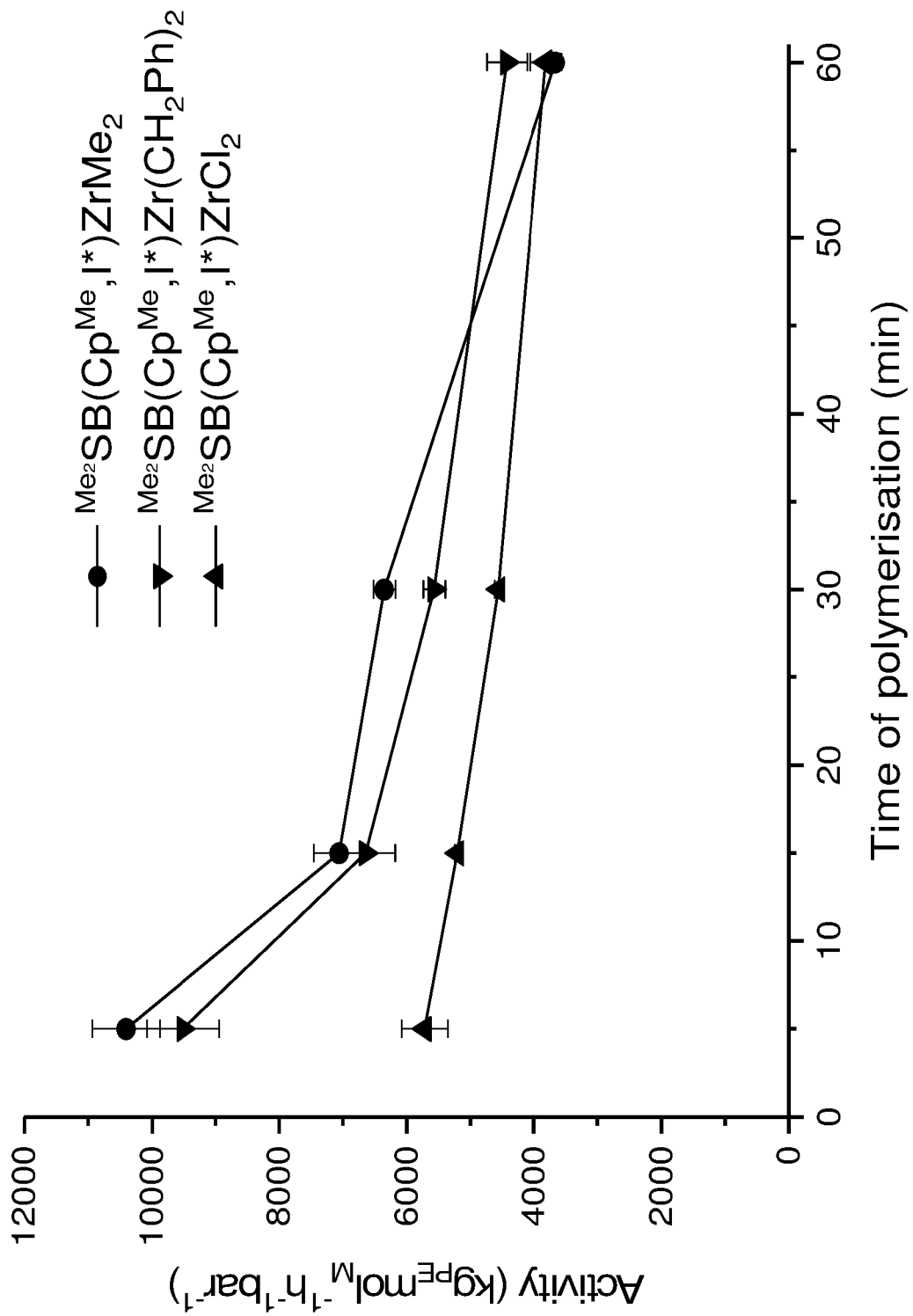

FIG. 24 shows activity vs time of polymerisation of ethylene using solid MAO supported/$^{Me_2}$SB(Cp$^{Me}$,I*)ZrMe$_2$ (circle), $^{Me_2}$SB(Cp$^{Me}$,I*)Zr(CH$_2$Ph)$_2$ (inverted triangle), $^{Me_2}$SB(Cp$^{Me}$,I*)ZrCl$_2$ (triangle). Polymerisation conditions: 10 mg of catalyst, 50 mL hexanes, 2 bar, 80° C., 150 mg of TIBA and [Al]$_0$/[Zr]$_0$=200.

Figure 25:
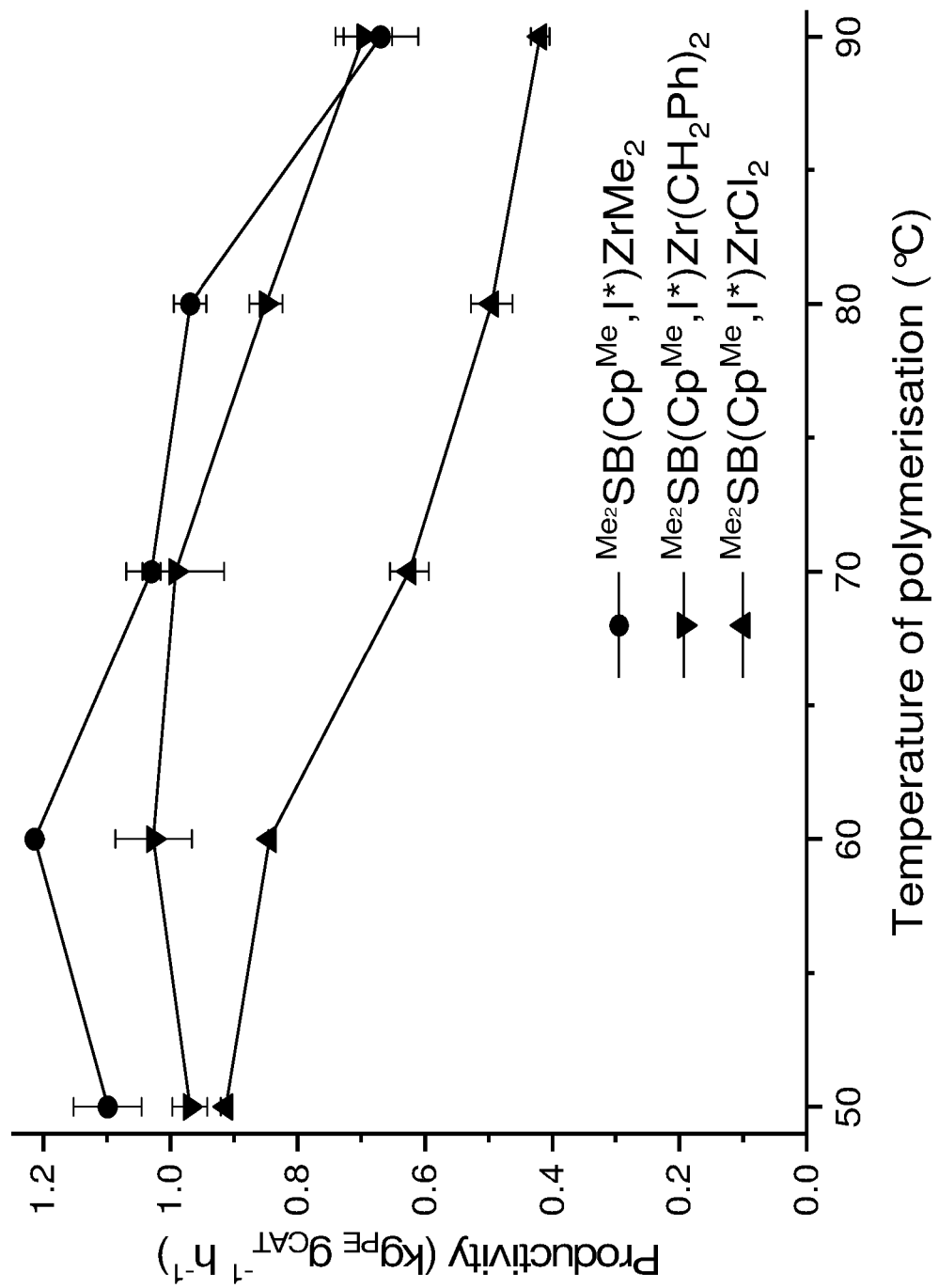

FIG. 25 shows productivity vs temperature of polymerisation of ethylene using solid MAO supported/$^{Me_2}$SB(Cp$^{Me}$, I*)ZrMe$_2$ (circle), $^{Me_2}$SB(Cp$^{Me}$,I*)Zr(CH$_2$Ph)$_2$ (inverted triangle), $^{Me_2}$SB(Cp$^{Me}$,I*)ZrCl$_2$ (triangle). Polymerisation conditions: 10 mg of catalyst, 50 mL hexanes, 2 bar, 30 minutes, 150 mg of TIBA and [Al]$_0$/[Zr]$_0$=200.

Figure 26:
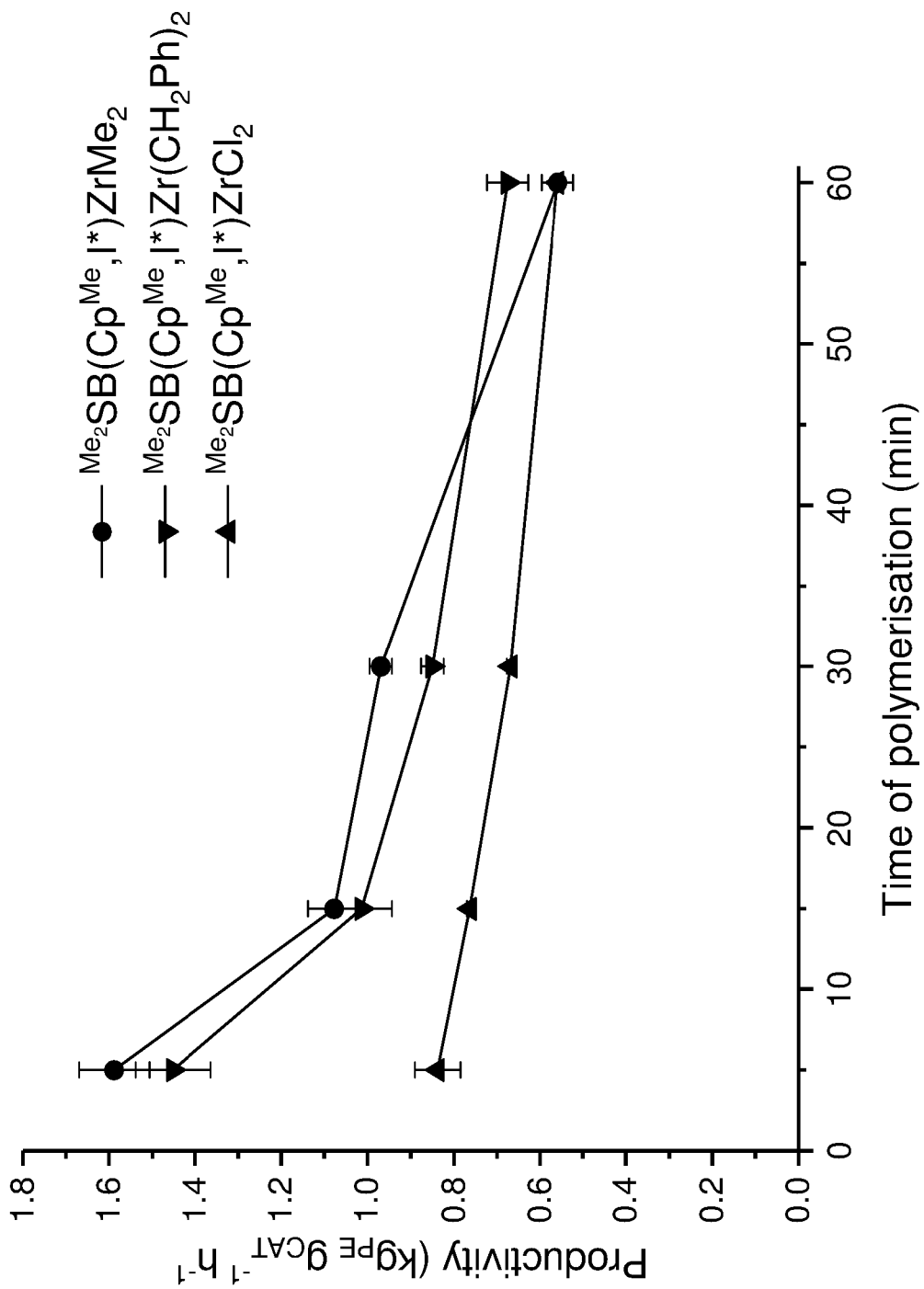

FIG. 26 shows productivity vs time of polymerisation of ethylene using solid MAO supported/$^{Me_2}$SB(Cp$^{Me}$,I*)ZrMe$_2$ (circle), $^{Me_2}$SB(Cp$^{Me}$, I*)Zr(CH$_2$Ph)$_2$ (inverted triangle), $^{Me_2}$SB(Cp$^{Me}$,I*)ZrCl$_2$ (triangle). Polymerisation conditions: 10 mg of catalyst, 50 mL hexanes, 2 bar, 80° C., 150 mg of TIBA and [Al]$_0$/[Zr]$_0$=200.

Figure 27:
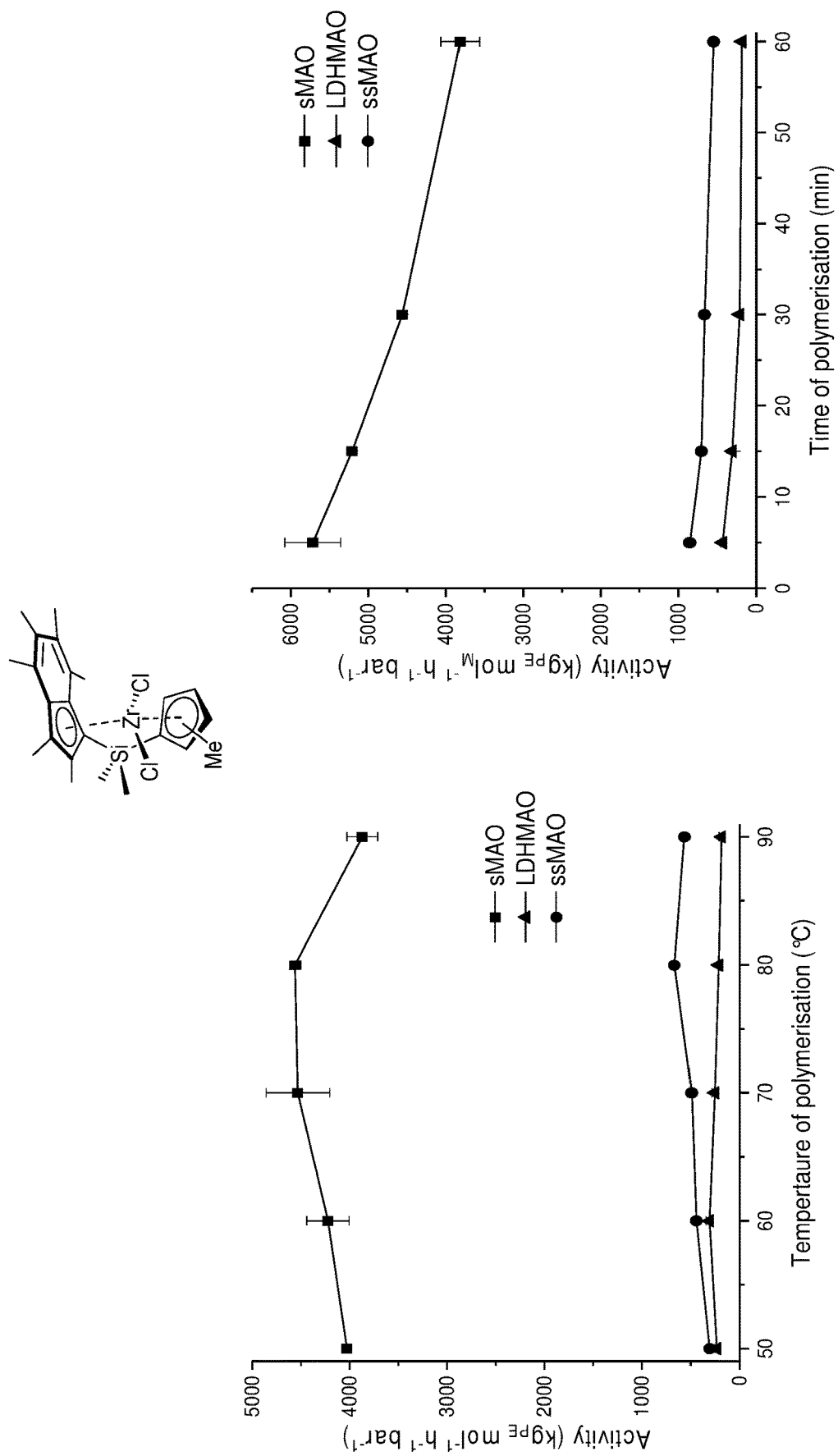

FIG. 27 shows activity vs temperature (left) and activity vs. time (right) of polymerisation of ethylene using $^{Me_2}$SB(Cp$^{Me}$,I*)ZrCl$_2$ supported on Solid MAO (square), MAO modified LDH, LDHMAO/Mg$_3$AlCO$_3$, (triangle) and MAO modified silica, ssMAO, (circle). Polymerisation conditions: 10 mg of catalyst, 50 mL hexanes, 2 bar, 150 mg of TIBA and [Al]$_0$/[Zr]$_0$=200.

Figure 28:
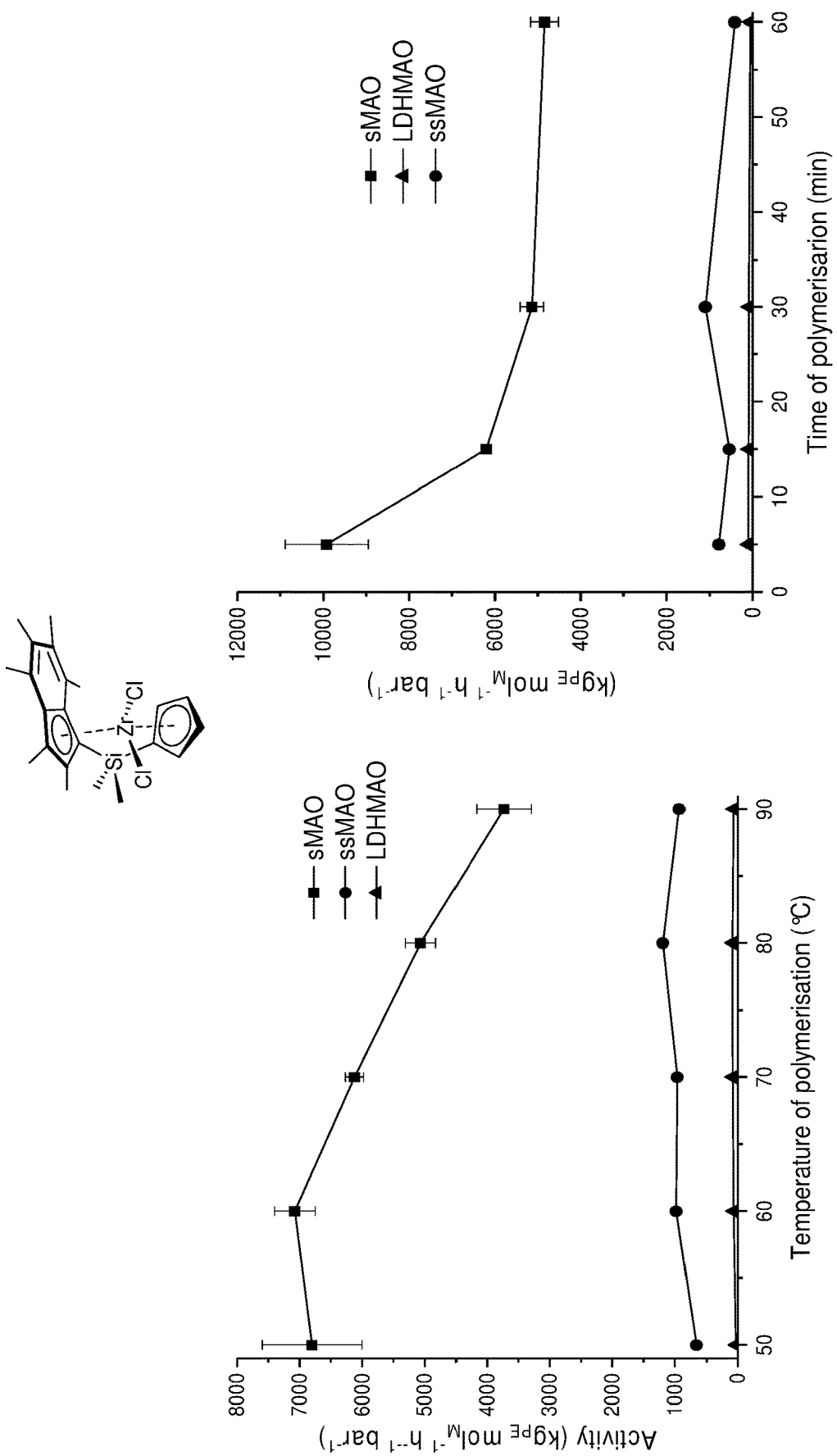

FIG. 28 shows activity vs temperature (left) and activity vs. time (right) of polymerisation of ethylene using $^{Me_2}$SB(Cp,I*)ZrCl$_2$ supported on Solid MAO (square), MAO modified LDH, LDHMAO/Mg$_3$AlCO$_3$, (triangle) and MAO modified silica, ssMAO, (circle). Polymerisation conditions: 10 mg of catalyst, 50 mL hexanes, 2 bar, 150 mg of TIBA and [Al]$_0$/[Zr]$_0$=200.

Figure 29:
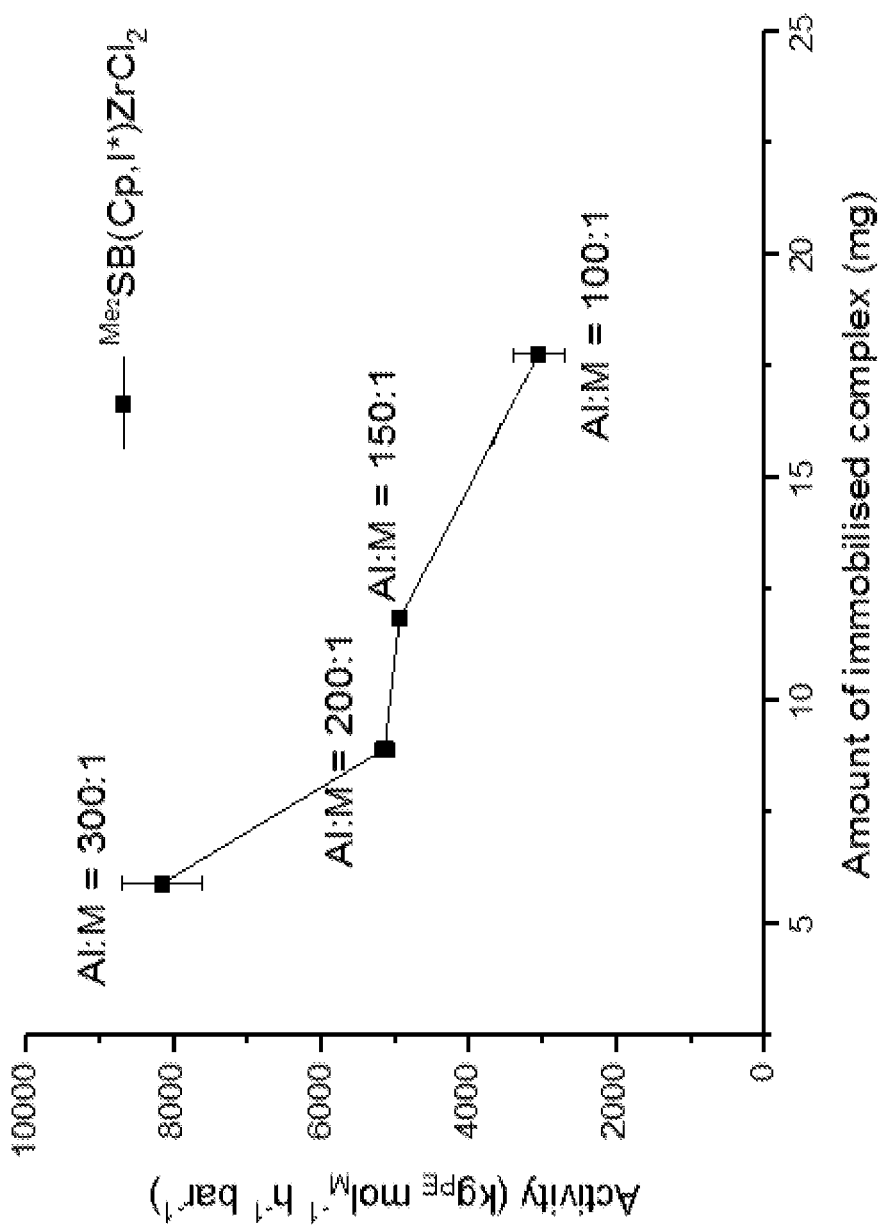

FIG. 29 shows activity vs amount of immobilised complex for polymerising ethylene using solid MAO supported/$^{Me_2}$SB(Cp,I*)ZrCl$_2$. Polymerisation conditions: 10 mg of catalyst, 50 mL hexanes, 2 bar, 150 mg of TIBA, 30 min and 80 CC.

Figure 30:
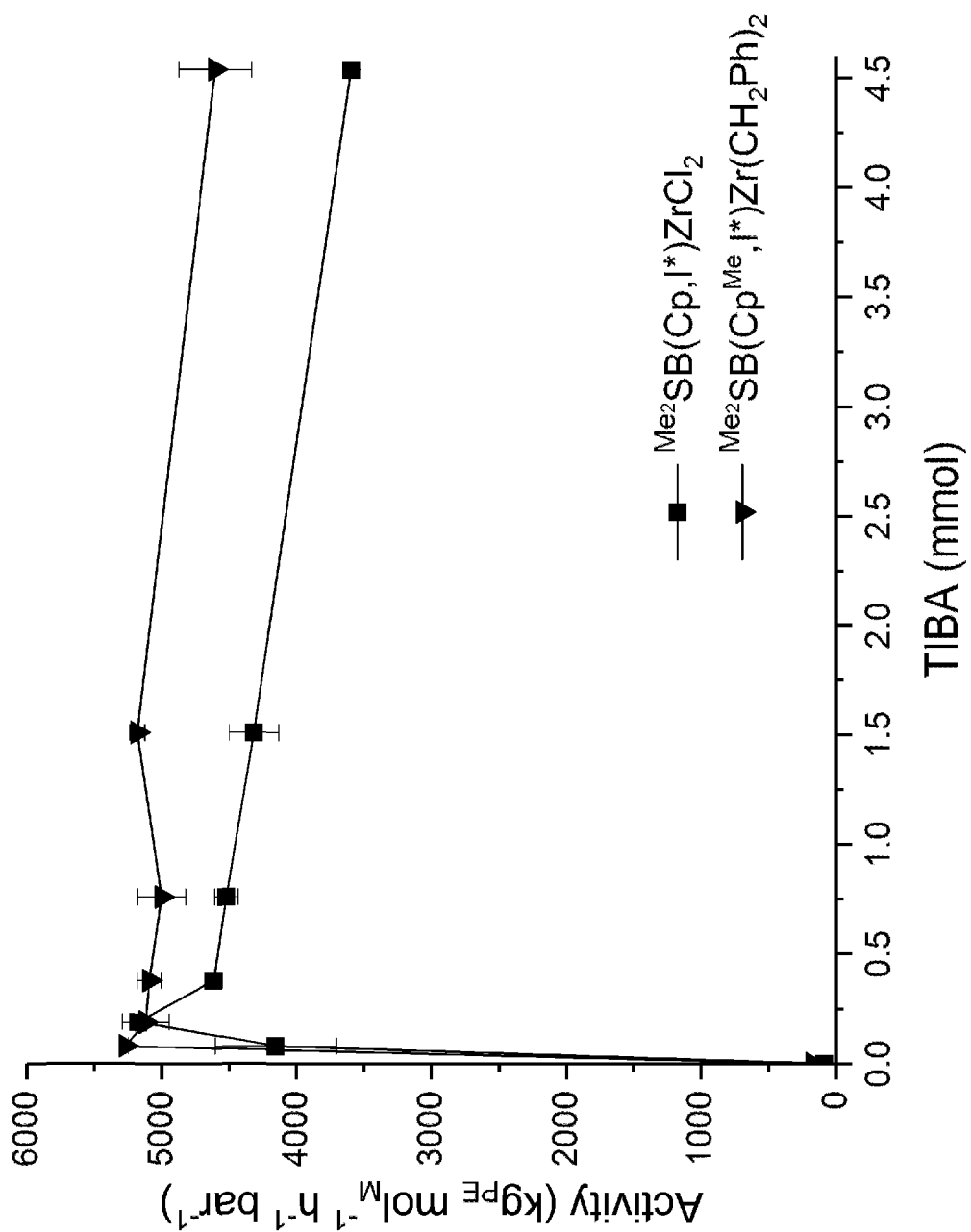

FIG. 30 shows activity vs amount of TIBA for polymerising ethylene using solid MAO supported/$^{Me_2}$SB(Cp,I*)ZrCl$_2$ (square) and solid MAO supported/$^{Me_2}$SB(Cp$^{Me}$, I*)Zr(CH$_2$Ph)$_2$ (inverted triangle). Polymerisation conditions: 10 mg of catalyst, 50 mL hexanes, 2 bar, 30 min and 80° C.

Figure 31:
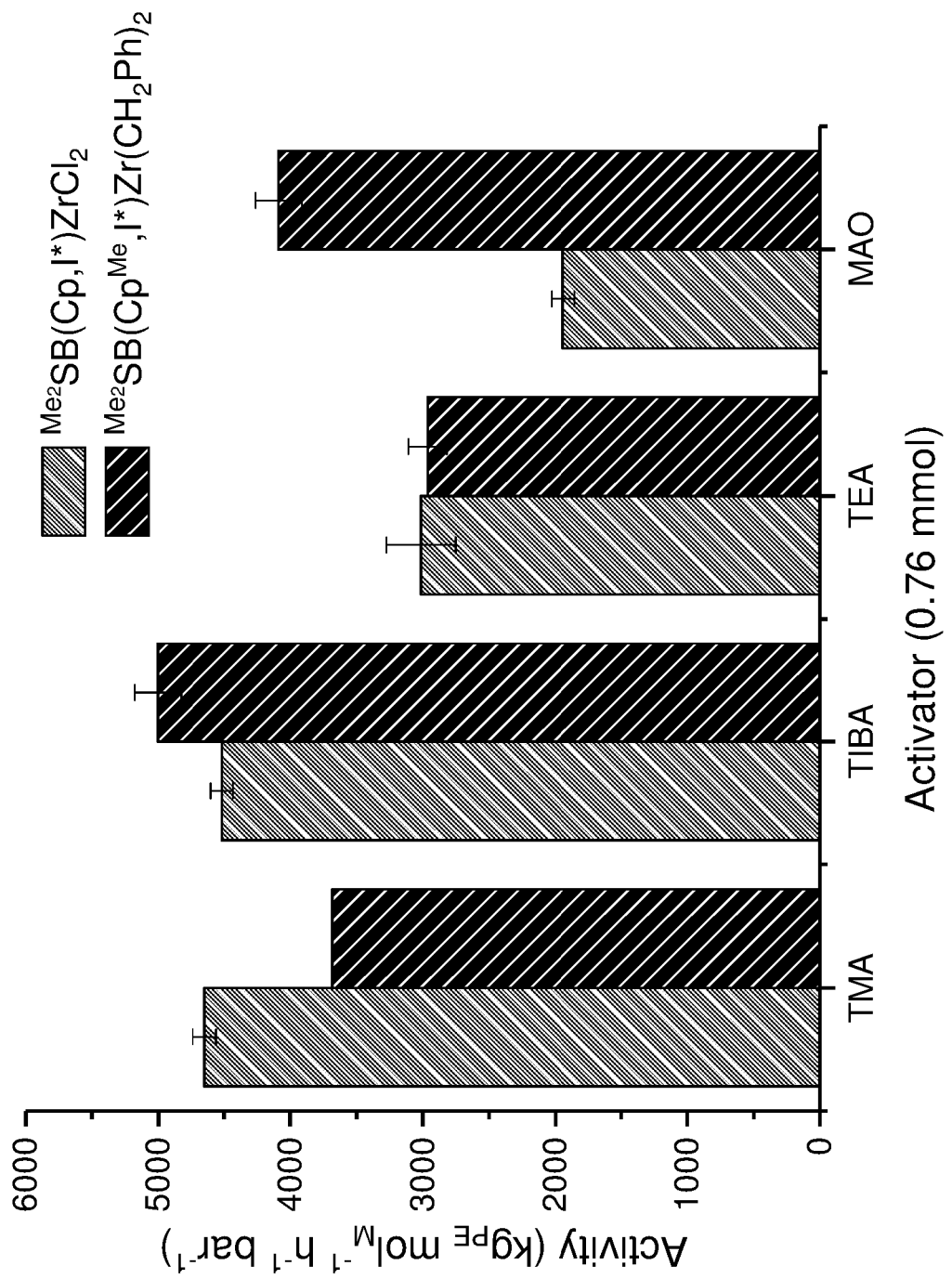

FIG. 31 shows activity vs varying activators for polymerising ethylene using solid MAO supported/$^{Me_2}$SB(Cp,I*)ZrCl$_2$ and solid MAO supported/$^{Me_2}$SB(Cp$^{Me}$,I*)Zr(CH$_2$Ph)$_2$. Polymerisation conditions: 10 mg of catalyst, 50 mL hexanes, 2 bar, 30 min and 80 (C.

Figure 32:
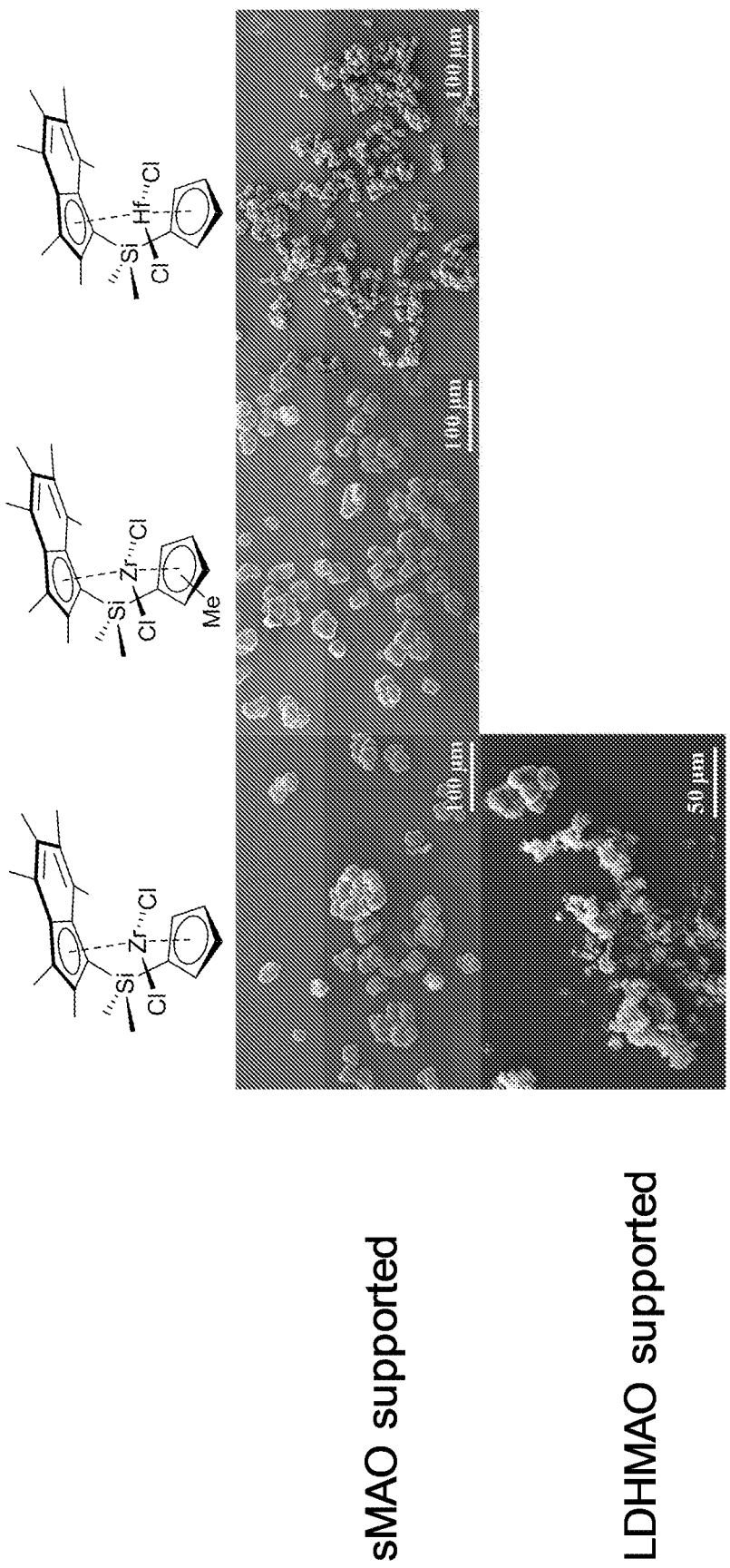

FIG. 32 shows SEM images for the polyethylene produced from solid MAO supported/$^{Me_2}$SB(Cp,I*)ZrCl$_2$, $^{Me_2}$SB(Cp$^{Me}$,I*)ZrCl$_2$ and $^{Me_2}$SB(Cp,I*)HfCl$_2$, and MAO modified LDH, LDHMAO/Mg$_3$AlCO$_3$, supported $^{Me_2}$SB (Cp,I*)ZrCl$_2$, Polymerisation conditions: 10 mg of catalyst, 50 mL hexanes, 2 bar, 30 min and 80 CC.

Figure 33:
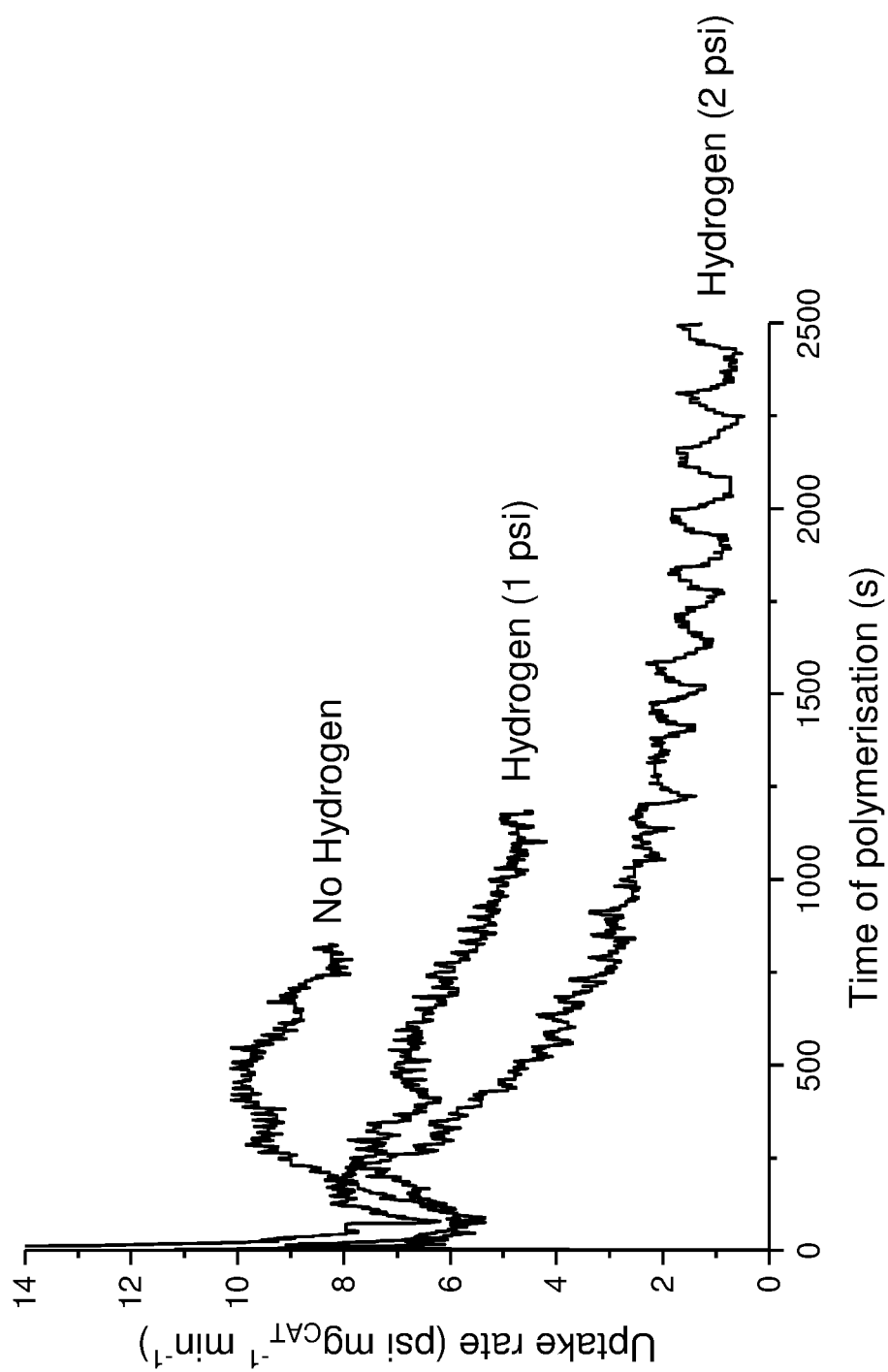

FIG. 33 shows uptake rate of ethylene for ethylene polymerisation with hydrogen response using Solid MAO/$^{Me2}$SB(Cp$^{Me}$,I*)ZrCl$_2$ catalyst with [Al]$_0$/[Zr]$_0$ ratio of 200. Polymerisation conditions: 0.05 mg of catalyst, 5 mL heptane, 8 bar and 80° C.

Figure 34:
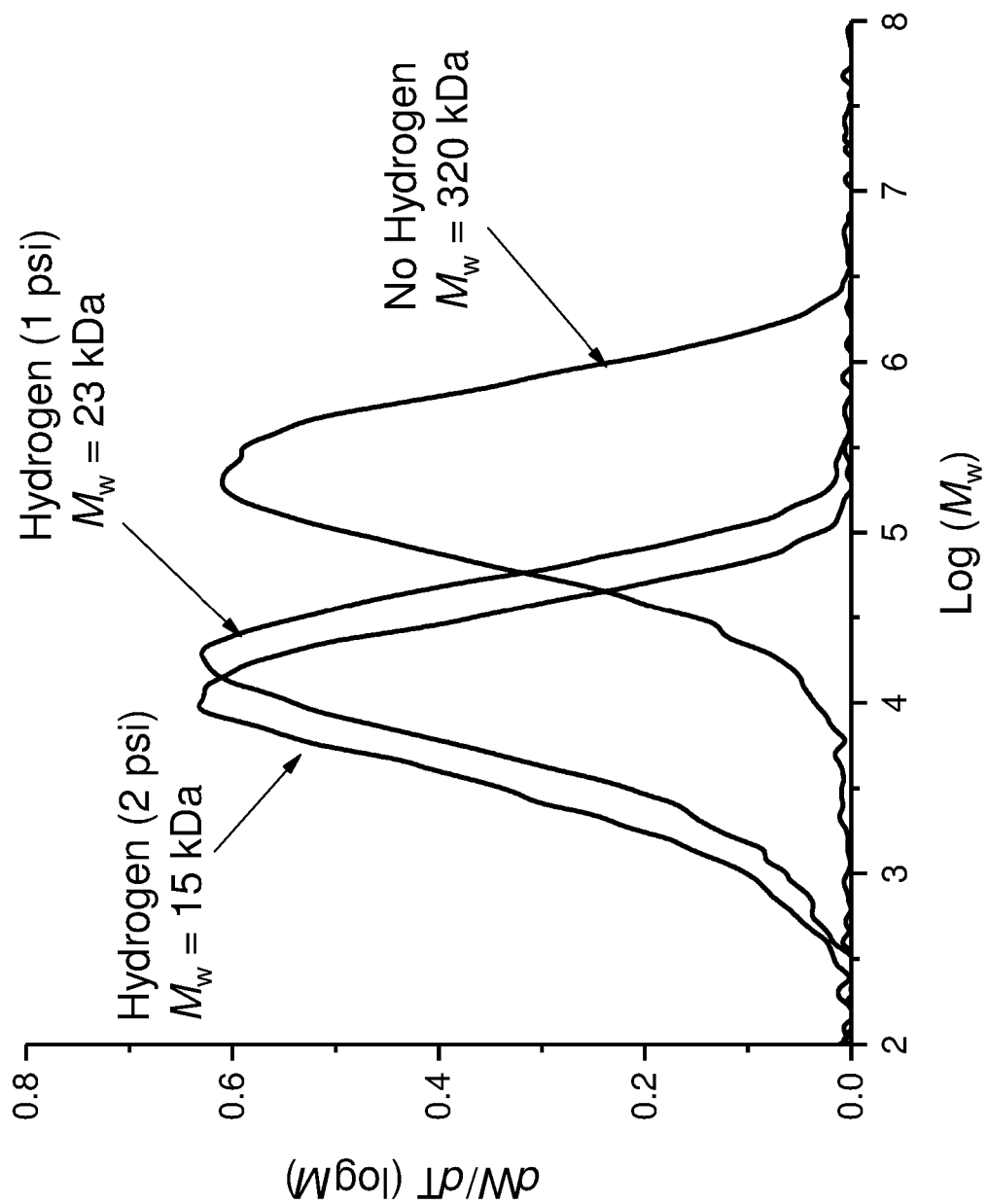

FIG. 34 shows molecular weights, M$_w$, of ethylene polymerisation with hydrogen response using Solid MAO/$^{Me2}$SB(Cp$^{Me}$,I*)ZrCl$_2$ catalyst with [Al]$_0$/[Zr]$_0$ ratio of 200. Polymerisation conditions: 0.05 mg of catalyst, 5 mL heptane, 8 bar and 80° C.

Figure 35:
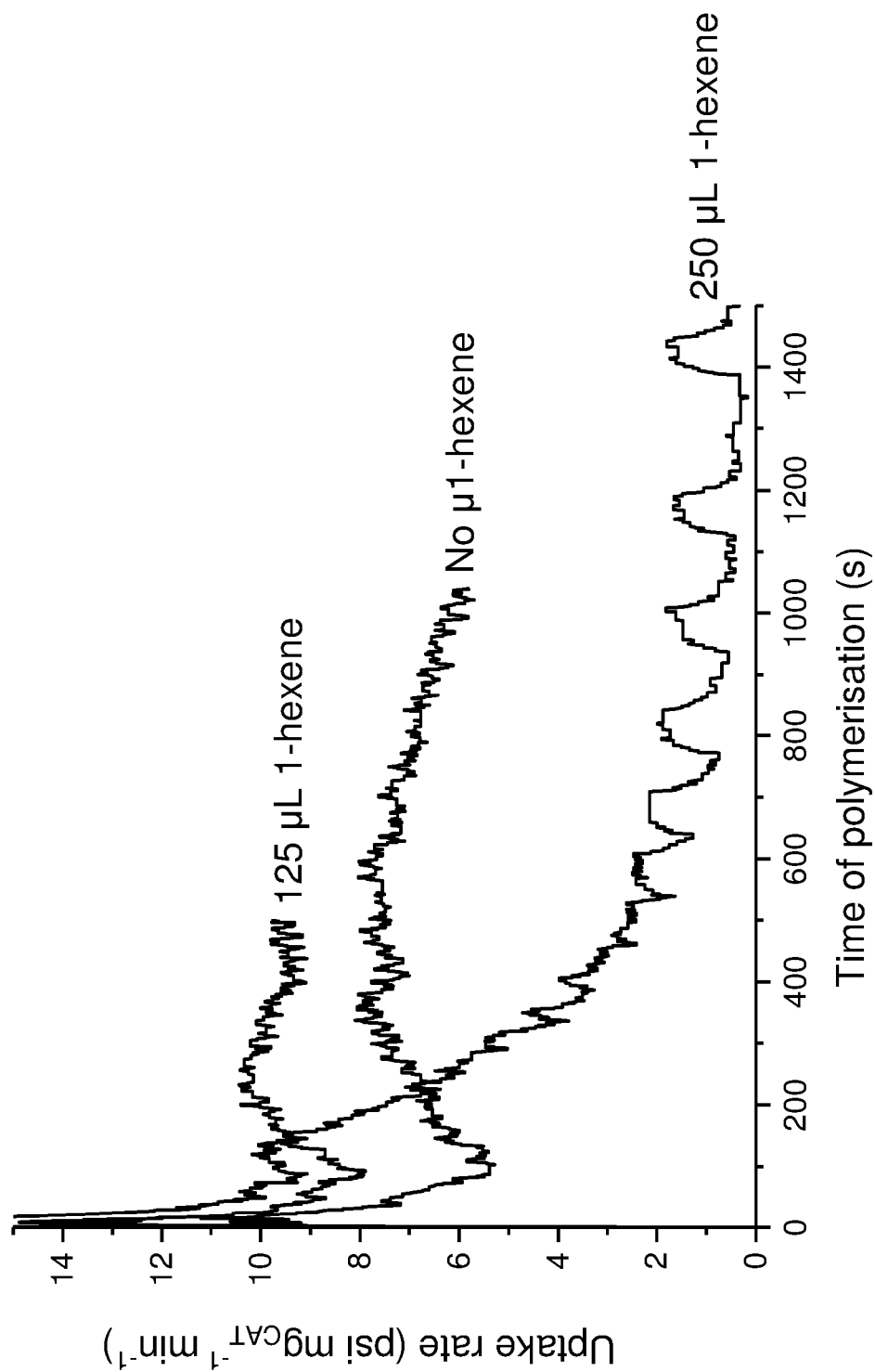

FIG. 35 shows uptake rate of ethylene for copolymerisation of ethylene and 1-hexene; using Solid MAO/$^{Me2}$SB(Cp$^{Me}$,I*)ZrCl$_2$ catalyst with [Al]$_0$/[Zr]$_0$ ratio of 200. Polymerisation conditions: 0.05 mg of catalyst, 5 mL heptane, 8 bar and 80° C.

Figure 36:
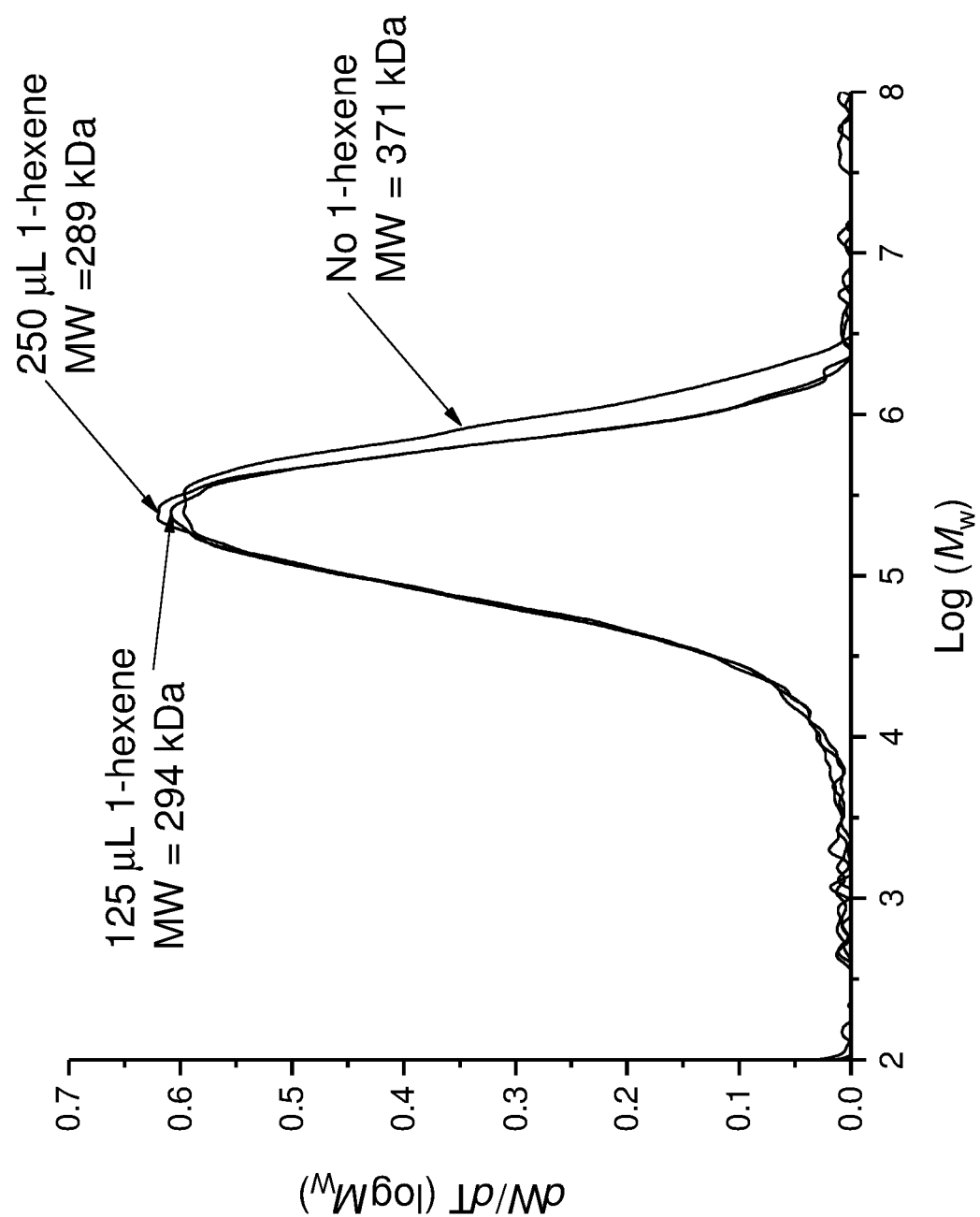

FIG. 36 shows molecular weights, M$_w$, for copolymerisation of ethylene and 1-hexene using Solid MAO/$^{Me2}$SB(Cp$^{Me}$,I*)ZrCl$_2$ catalyst with [Al]$_0$/[Zr]$_0$ ratio of 200. Polymerisation conditions: 0.05 mg of catalyst, 5 mL heptane, 8 bar and 80° C.

Figure 37:
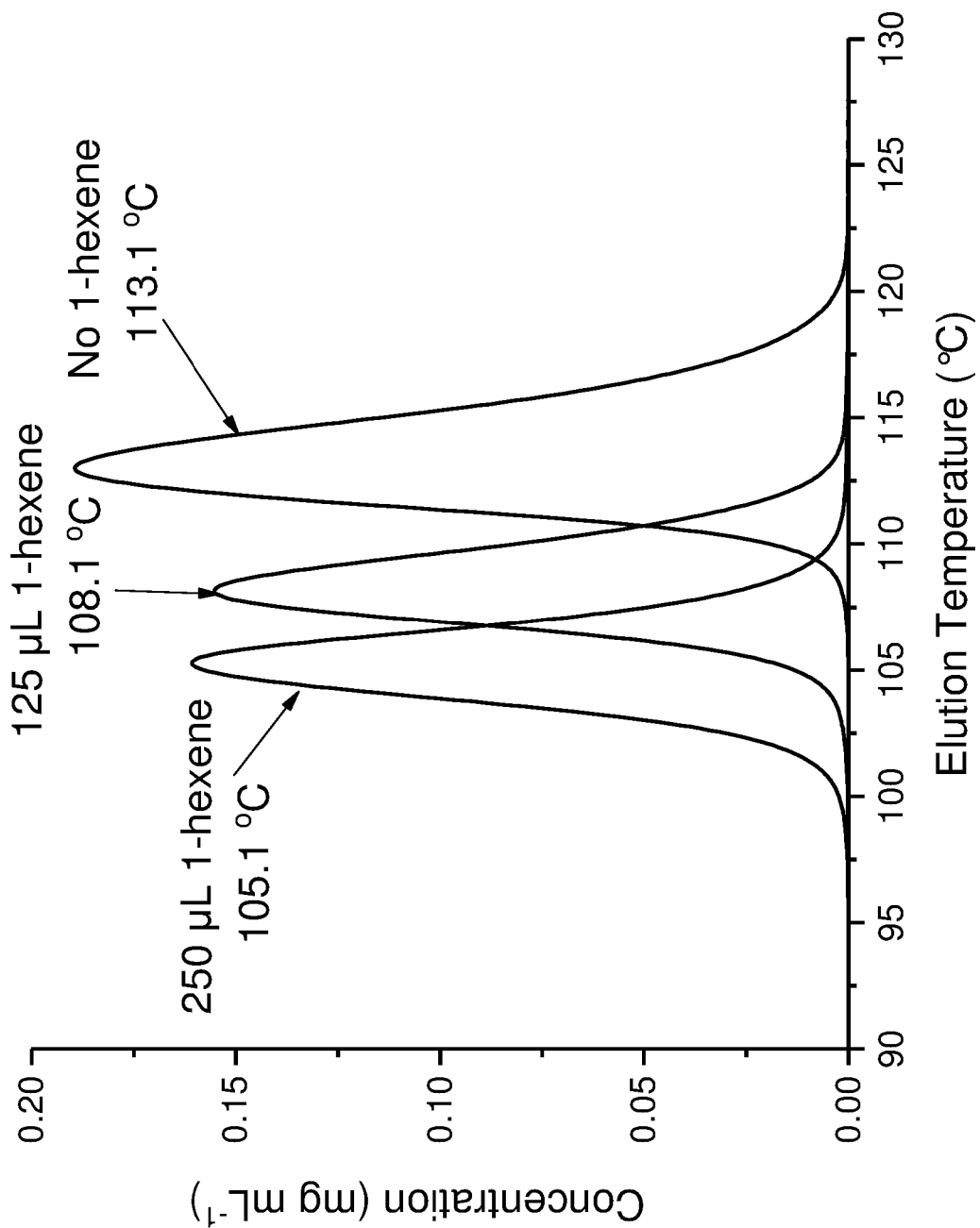

FIG. 37 shows CEF traces for the copolymerisation of ethylene and 1-hexene using Solid MAO/$^{Me2}$SB(Cp$^{Me}$,I*)ZrCl$_2$ catalyst with [Al]$_0$/[Zr]$_0$ ratio of 200. Polymerisation conditions: 0.05 mg of catalyst, 5 mL heptane, 8 bar and 80° C.

Figure 38:
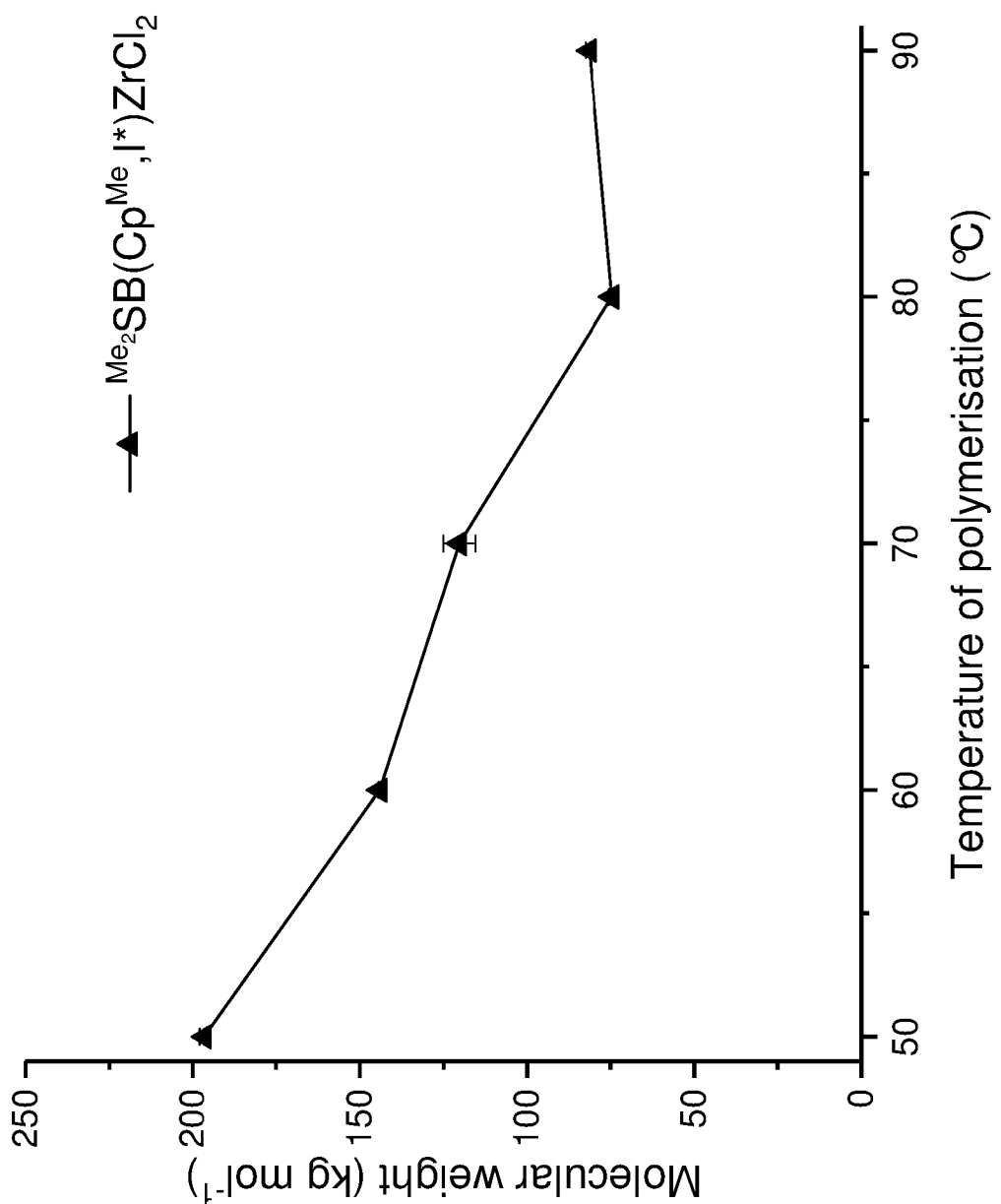

FIG. 38 Shows molecular weight vs temperature of polymerisation of ethylene using solid MAO supported/$^{Me2}$SB(Cp$^{Me}$,I*)ZrCl$_2$. Polymerisation conditions: 10 mg of catalyst, 50 mL hexanes, 2 bar, 30 minutes, 80° C., 150 mg of TIBA and [Al]$_0$/[Zr]$_0$=200.

EXAMPLES

Example 1—Synthesis of Compounds

Scheme 1a below illustrates the synthesis of various unsymmetrical $^{Me2}$SB(Cp$^R$,I*)ZrCl$_2$ compounds of the invention (in which "SB" denotes silicon bridged, "Cp$^R$" denotes cyclopentadienyl substituted with R, and "I*" denotes per-methyl indenyl). All the reactions were carried out in pseudo one-pot synthesis from the chloro silane synthon, Ind*SiMe$_2$Cl, using the corresponding alkali salt in tetrahydrofuran, followed by a lithiation reaction in tetrahydrofuran and finally the complexation step using zirconium tetrachloride in benzene.

Scheme 1a - Synthesis of various unsymmetrical $^{Me2}$SB(Cp$^R$,I*)ZrCl$_2$ compounds of the invention

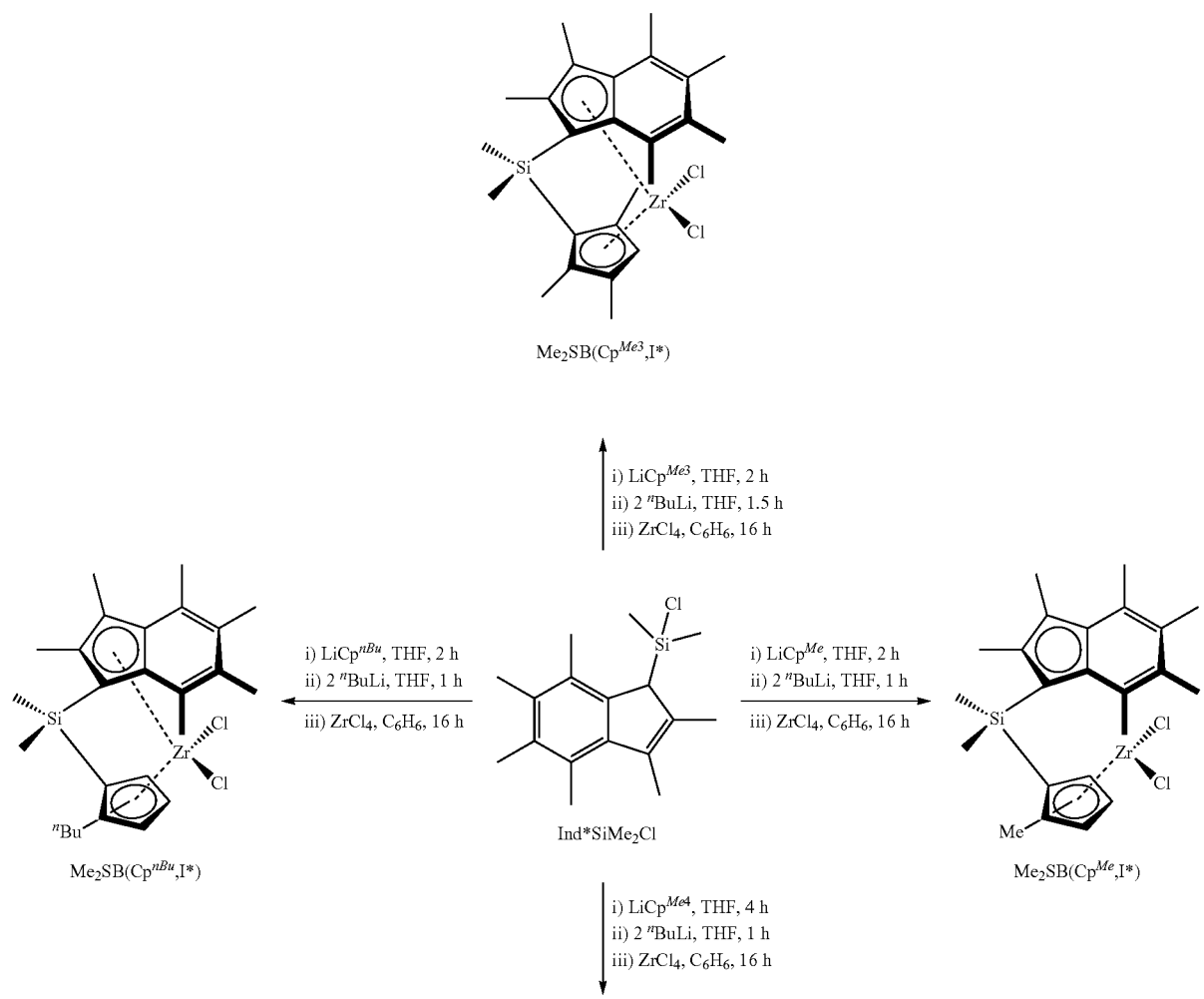

-continued

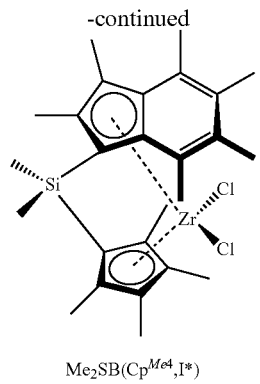

Me₂SB(Cp^{Me4},I*)

Figure 1:
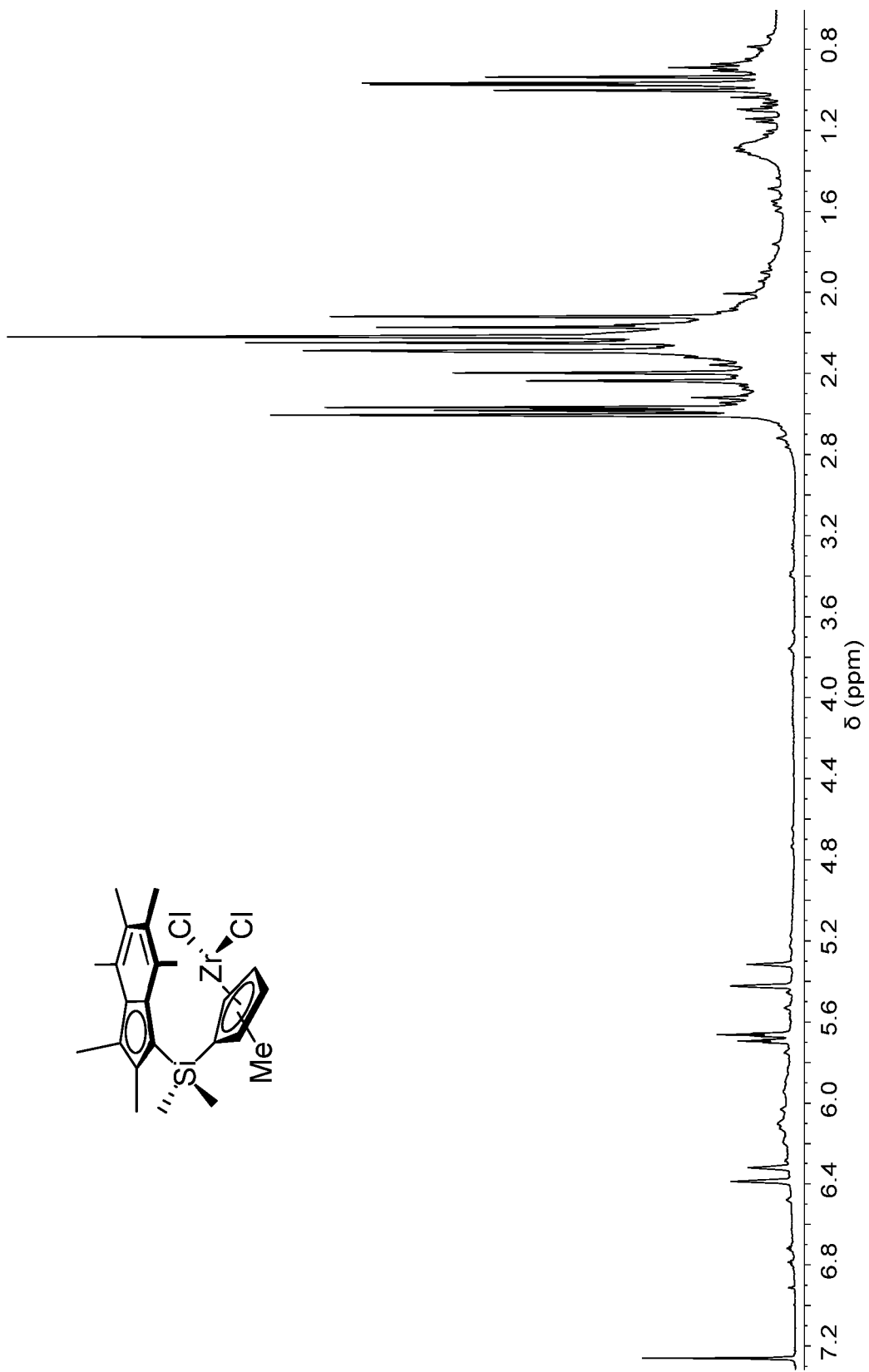
FIG. 1 shows the $^1$H NMR spectrum of $^{Me_2}SB(Cp^{Me},I^*)ZrCl_2$ (298 K, 400 MHz, chloroform-$d_1$).
Figure 2:
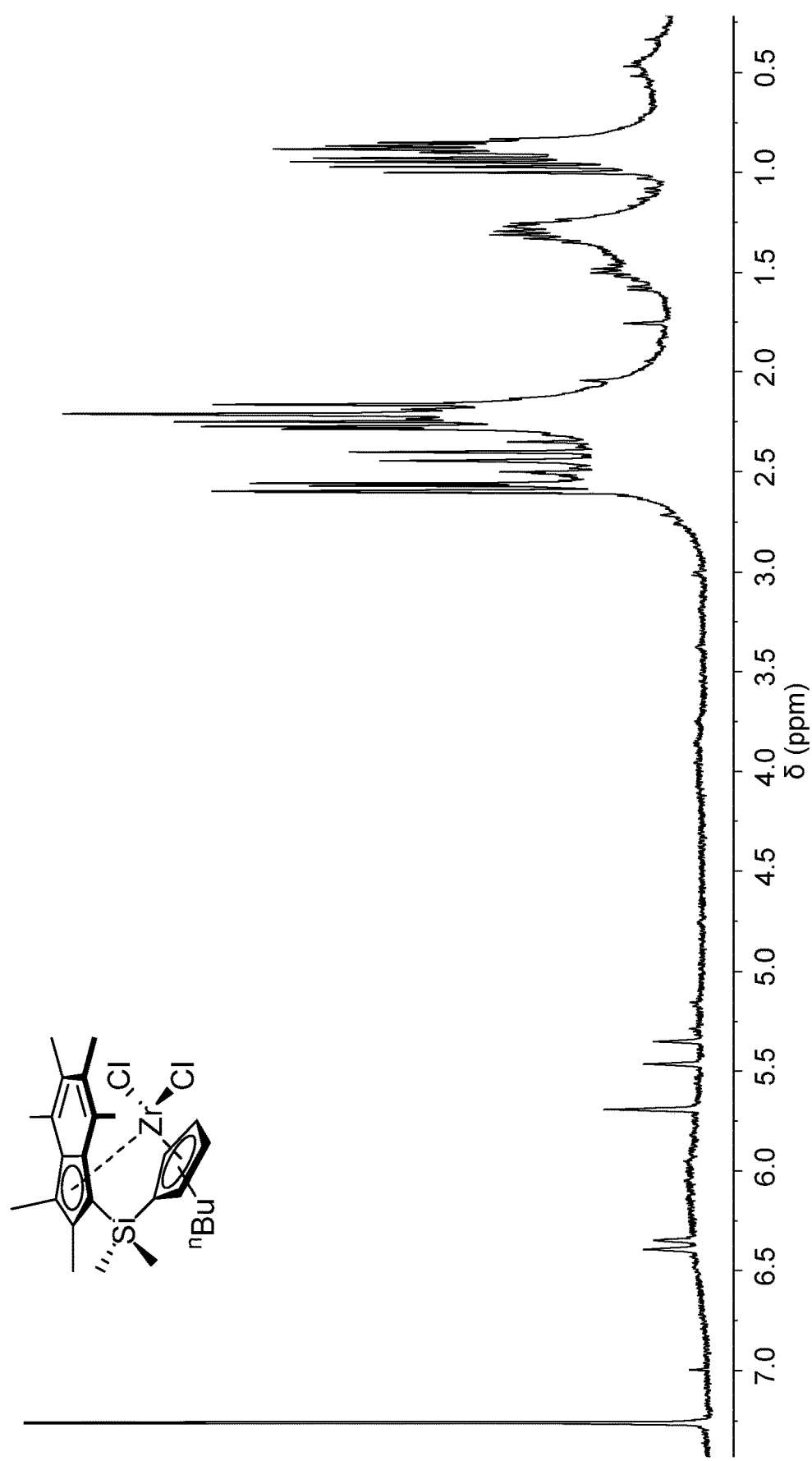
FIG. 2 shows the $^1$H NMR spectrum of $^{Me_2}SB(Cp^{nBu},I^*)ZrCl_2$ (298 K, 400 MHz, chloroform-$d_1$).

FIG. 1 shows the ¹H NMR spectrum of ^{Me2}SB(Cp^{Me},I*)ZrCl₂ (298 K, 400 MHz, chloroform-d₁). FIG. 2 shows the ¹H NMR spectrum of ^{Me2}SB(Cp^{nBu},I*)ZrCl₂ (298 K, 400 MHz, chloroform-d₁). The ¹H NMR spectra of the bulk materials for ^{Me2}SB(Cp^{Me},I*)ZrCl₂ and ^{Me2}SB(Cp^{nBu},I*)ZrCl₂ demonstrated the presence of two isomers based around the cyclopentadienyl ligand.

Scheme 1b below illustrates the synthesis of various unsymmetrical ^{Me2}SB(Cp^R,I*)ZrCl₂ compounds of the invention (in which "SB" denotes silicon bridged, "Cp^R" denotes cyclopentadienyl substituted with R, and "I*" denotes per-methyl indenyl). All the reactions were carried out in pseudo one-pot synthesis from the chloro silane synthon, Ind*SiMe₂Cl, using the corresponding alkali salt in tetrahydrofuran, followed by a lithiation reaction in tetrahydrofuran and finally the complexation step using zirconium tetrachloride in benzene.

Scheme 1b - Synthesis of various unsymmetrical ^{Me2}SB(Cp^R,I*)ZrCl₂ compounds of the invention

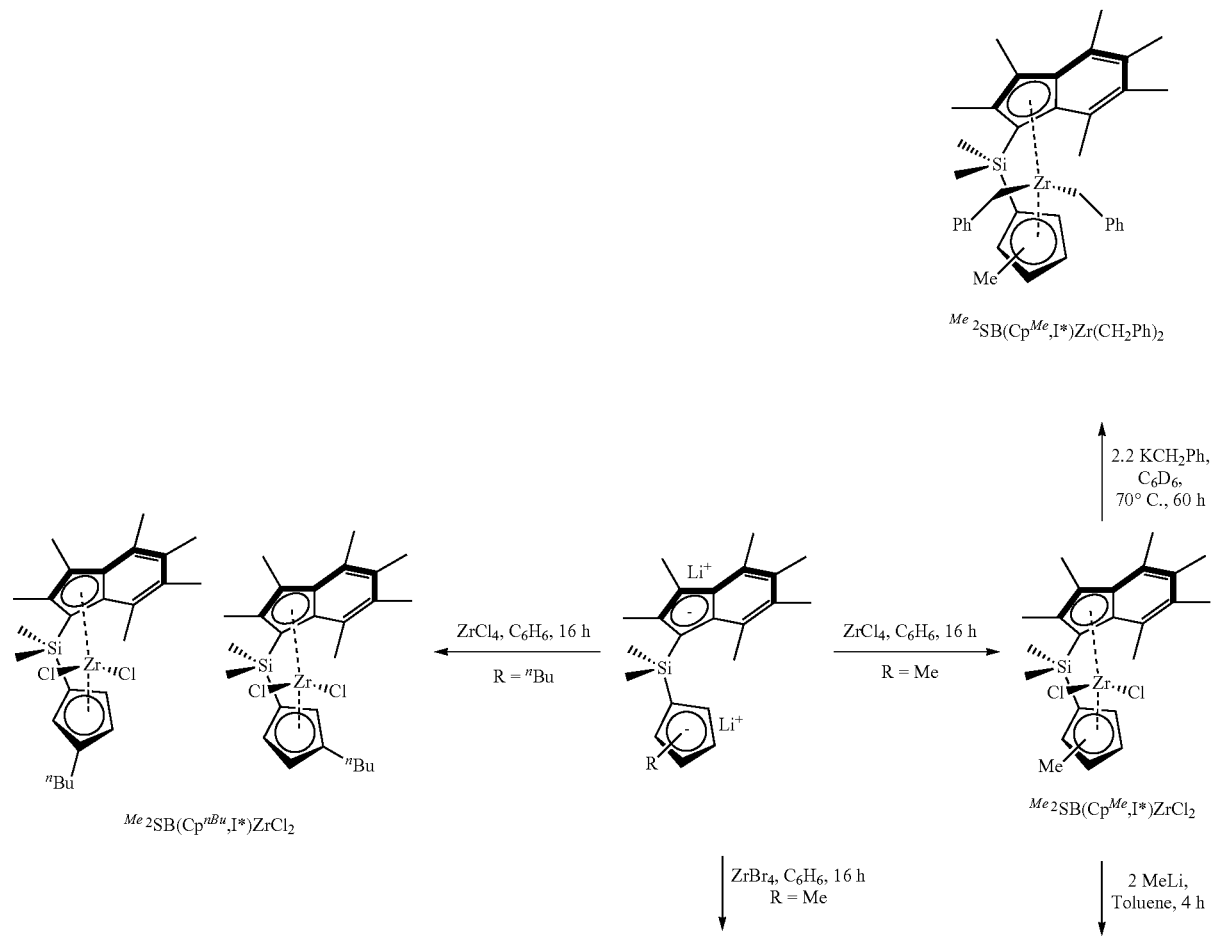

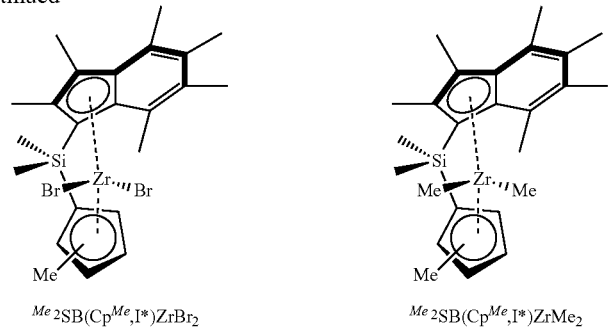

$^{Me_2}SB(Cp^{Me},I^*)ZrBr_2$      $^{Me_2}SB(Cp^{Me},I^*)ZrMe_2$

FIGS. 16 to 21 shows the $^1$H NMR spectroscopy for $^{Me_2}SB(Cp^{Me},I^*)ZrCl_2$, $^{Me_2}SB(Cp^{nBu},I^*)$, $^{Me_2}SB(Cp^{nBu},I^*)ZrCl_2$, $^{Me_2}SB(Cp^{Me},I^*)ZrBr_2$, $^{Me_2}SB(Cp^{Me},I^*)Zr(CH_2Ph)_2$ and $^{Me_2}SB(Cp^{Me},I^*)ZrMe_2$ at 25° C. in benzene-d highlighting the resonances due to each complex. FIG. 22 shows the molecular structures for $^{Me_2}SB(Cp^{Me},I^*)ZrCl_2$ and $^{Me_2}SB(Cp^{nBu},I^*)ZrCl_2$.

Example 2—Ethylene Homopolymerisation Studies

In addition to those compounds synthesised in Example 1, $^{Me_2}SB(Cp,I^*)ZrCl_2$ and $^{Me_2}SB(Cp^{Me},I^*)HfCl_2$ (in which the Cp group is unsubstituted, shown below) were also prepared, which were then reacted with solid MAO at various loadings (aluminium to Hf/Zr ratio).

The solid MAO used in this Example may be prepared via an adaptation of the optimised procedure in Kaji et al. in the U.S. Pat. No. 8,404,880 B2 embodiment 1 (Scheme 1). For brevity, each synthesised solid MAO is represented as solid MAO(Step 1 Al:O ratio/Step 2 temperature in ° C.,time in h/Step 3 temperature in ° C.,time in h). Hence, the synthesis conditions outlined in Scheme 2 below would yield solid MAO(1.2/70,32/100,12).

Scheme 2 - Synthesis of solid MAO (1.2/70,32/100,12)

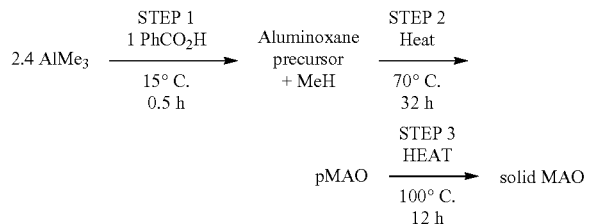

A Rotaflo ampoule containing a solution of trimethyl aluminium (2.139 g, 2.967 mmol) in toluene (8 mL) was cooled to 15° C. with rapid stirring, and benzoic acid (1.509 g, 1.239 mmol) was added under a flush of $N_2$ over a period of 30 min. Effervescence (presumably methane gas, MeH) was observed and the reaction mixture appeared as a white suspension, which was allowed to warm to room temperature. After 30 min the mixture appeared as a colourless solution and was heated in an oil bath at 70° C. for 32 h (a stir rate of 500 rpm was used). The mixture obtained was a colourless solution free of gelatinous material, which was subsequently heated at 100° C. for 12 h. The reaction mixture was cooled to room temperature and hexane (40 mL) added, resulting in the precipitation of a white solid which was isolated by filtration, washed with hexane (2×40 mL) and dried in vacuo for 3 h. Total yield=1.399 g (71% based on 40 wt % Al).

Once the solid MAO is prepared, different quantities of the various metallocene compounds were supported on it (represented by varying aluminium to Hf/Zr ratios). In the glovebox, the solid MAO and the complex are weighed out in a Schlenk tube. Toluene (50 mL) is added to the Schlenk and the reaction mixture swirled at 60° C. for one hour. The coloured solid is allowed to settle from the clear, colourless solution which is decanted, and the solid is dried in vacuo (40° C., $1\times10^{-2}$ mbar). The product is scraped out in the glovebox in quantitative yield.

The catalytic properties of the solid MAO supported $^{Me_2}SB(Cp,I^*)ZrCl_2$ and $^{Me_2}SB(Cp^{Me},I^*)HfCl_2$ metallocenes were investigated.

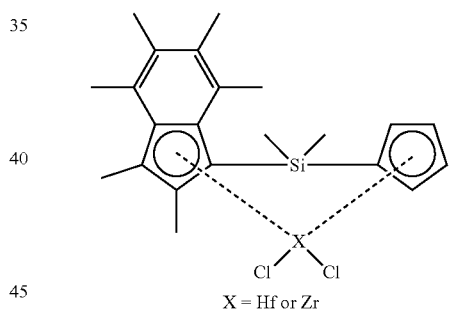

X = Hf or Zr

Figure 3:
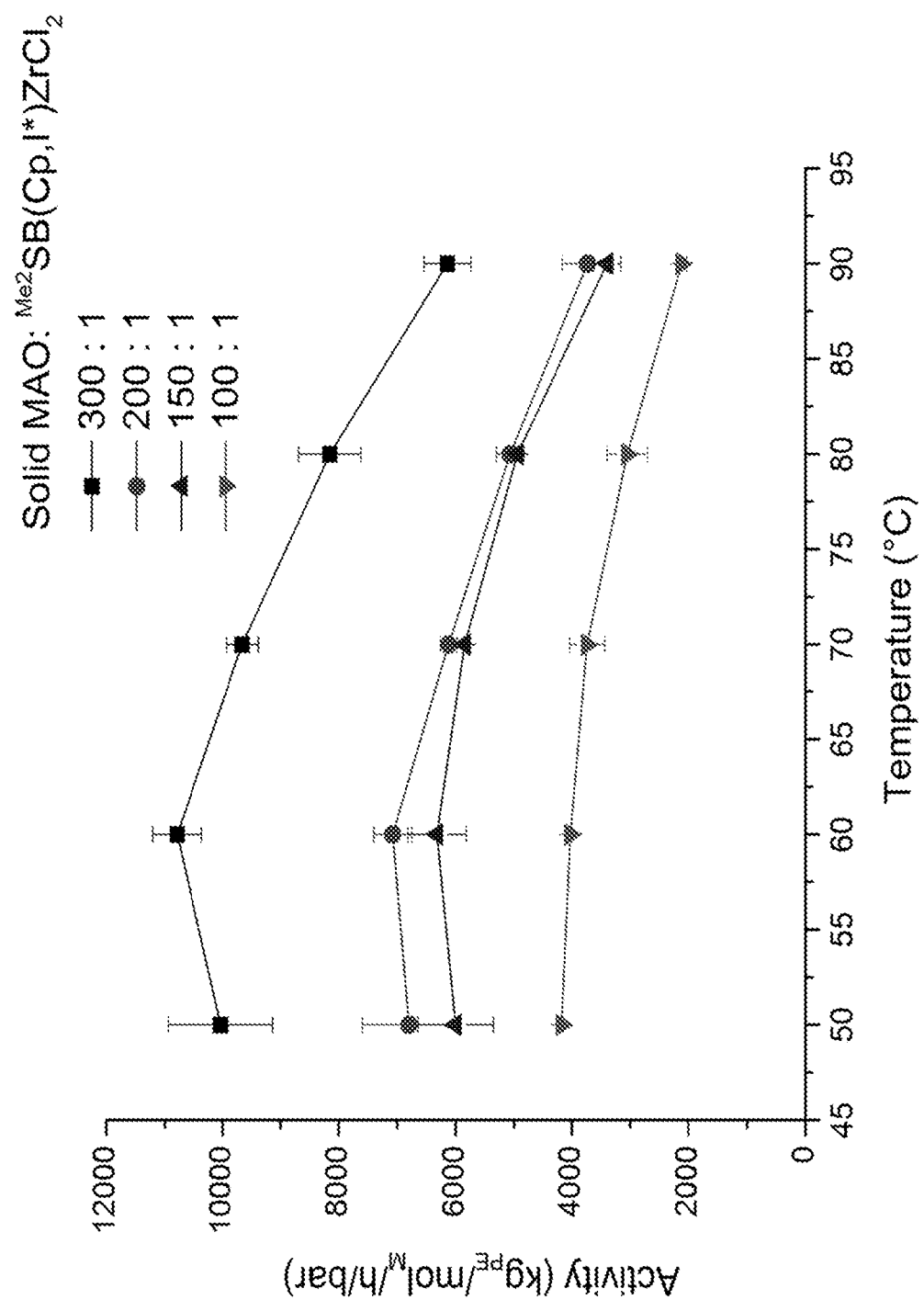
FIG. 3 shows activity vs temperature of polymerisation of ethylene using solid MAO supported/$^{Me_2}SB(Cp,I^*)ZrCl_2$: $[Al]_0/[Zr]_0$=300 (black square), $[Al]_0/[Zr]_0$=200 (red circle), $[Al]_0/[Zr]_0$=150 (blue triangle) and $[Al]_0/[Zr]_0$=100 (inverted pink triangle). Polymerisation conditions: 10 mg of catalyst, 50 mL hexanes, 2 bar, 30 minutes, and 150 mg of TIBA.
Figure 4:
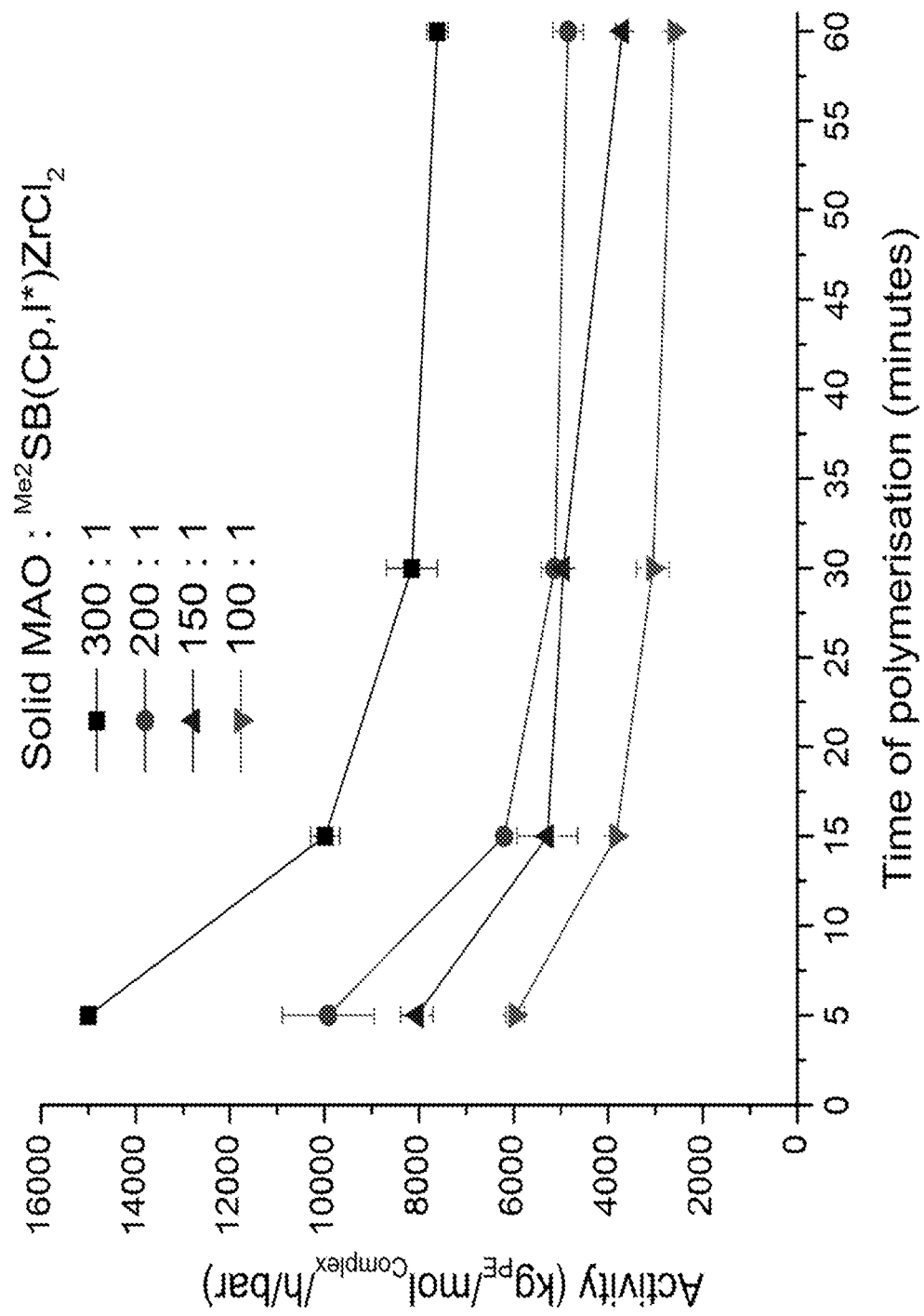
FIG. 4 shows activity vs time of polymerisation of ethylene using solid MAO supported/$^{Me_2}SB(Cp,I^*)ZrCl_2$: $[Al]_0/[Zr]_0$=300 (black square), $[Al]_0/[Zr]_0$=200 (red circle), $[Al]_0/[Zr]_0$=150 (blue triangle) and $[Al]_0/[Zr]_0$=300 (inverted pink triangle). Polymerisation conditions: 10 mg of catalyst, 50 mL hexanes, 2 bar, 70° C., and 150 mg of TIBA.

FIG. 3 shows the catalytic activity of various solid MAO supported $^{Me_2}SB(Cp,I^*)ZrCl_2$ compositions as a function of temperature, in the homopolymerisation of ethylene. FIG. 4 shows the catalytic activity of various solid MAO supported $^{Me_2}SB(Cp,I^*)ZrCl_2$ compositions as a function of time, in the homopolymerisation of ethylene. FIGS. 3 and 4 demonstrate that the aluminium to zirconium ratio $[Al]_0/[Zr]_0$ of 300 afforded the highest activity over time and temperature of polymerisation.

Figure 5:
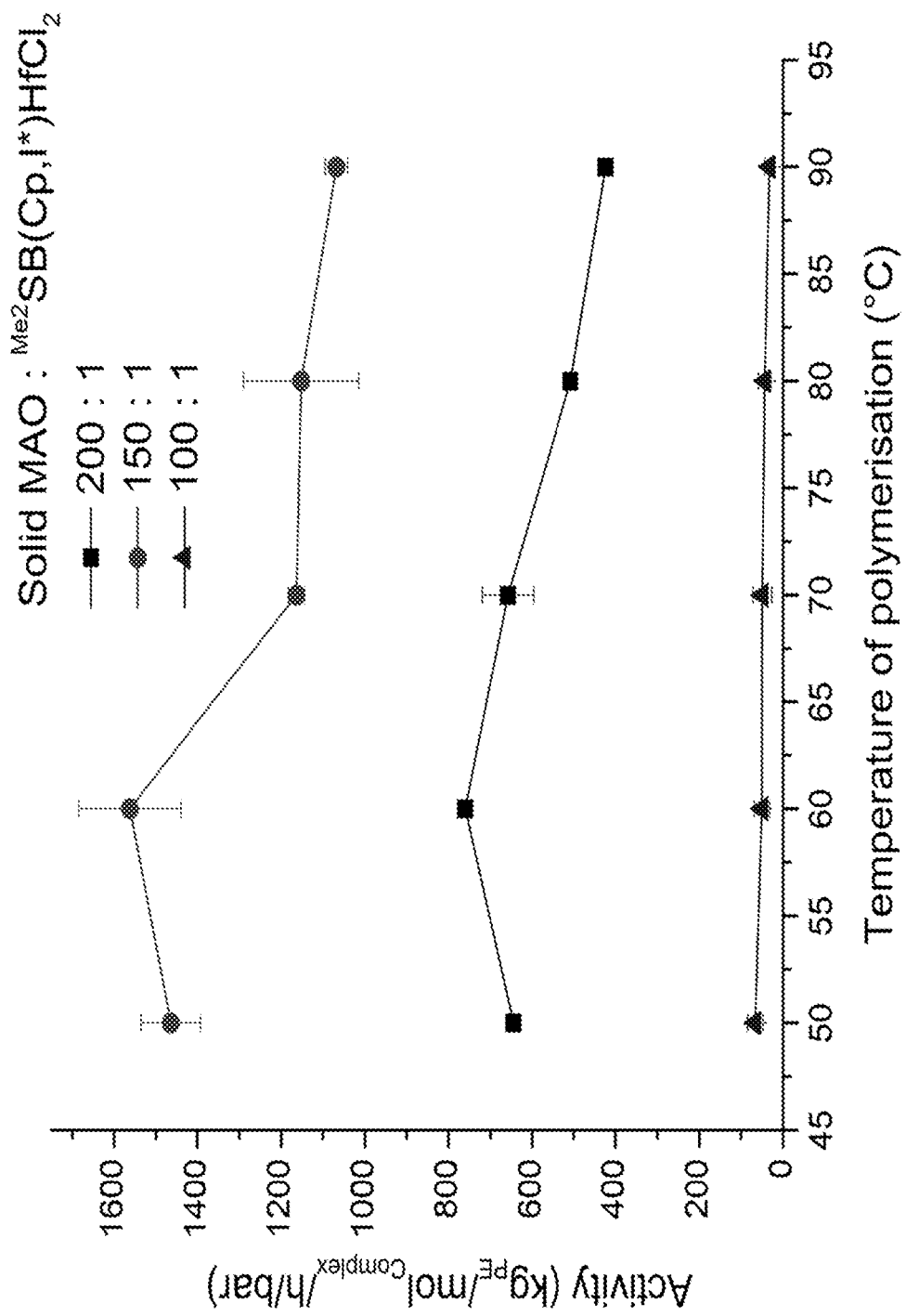
FIG. 5 shows activity vs temperature of polymerisation of ethylene using solid MAO supported/$^{Me_2}SB(Cp,I^*)HfCl_2$: $[Al]_0/[Zr]_0$=200 (black square), $[Al]_0/[Zr]_0$=150 (red circle), and $[Al]_0/[Zr]_0$=100 (blue triangle). Polymerisation conditions: 10 mg of catalyst, 50 mL hexanes, 2 bar, 30 minutes, and 150 mg of TIBA.
Figure 6:
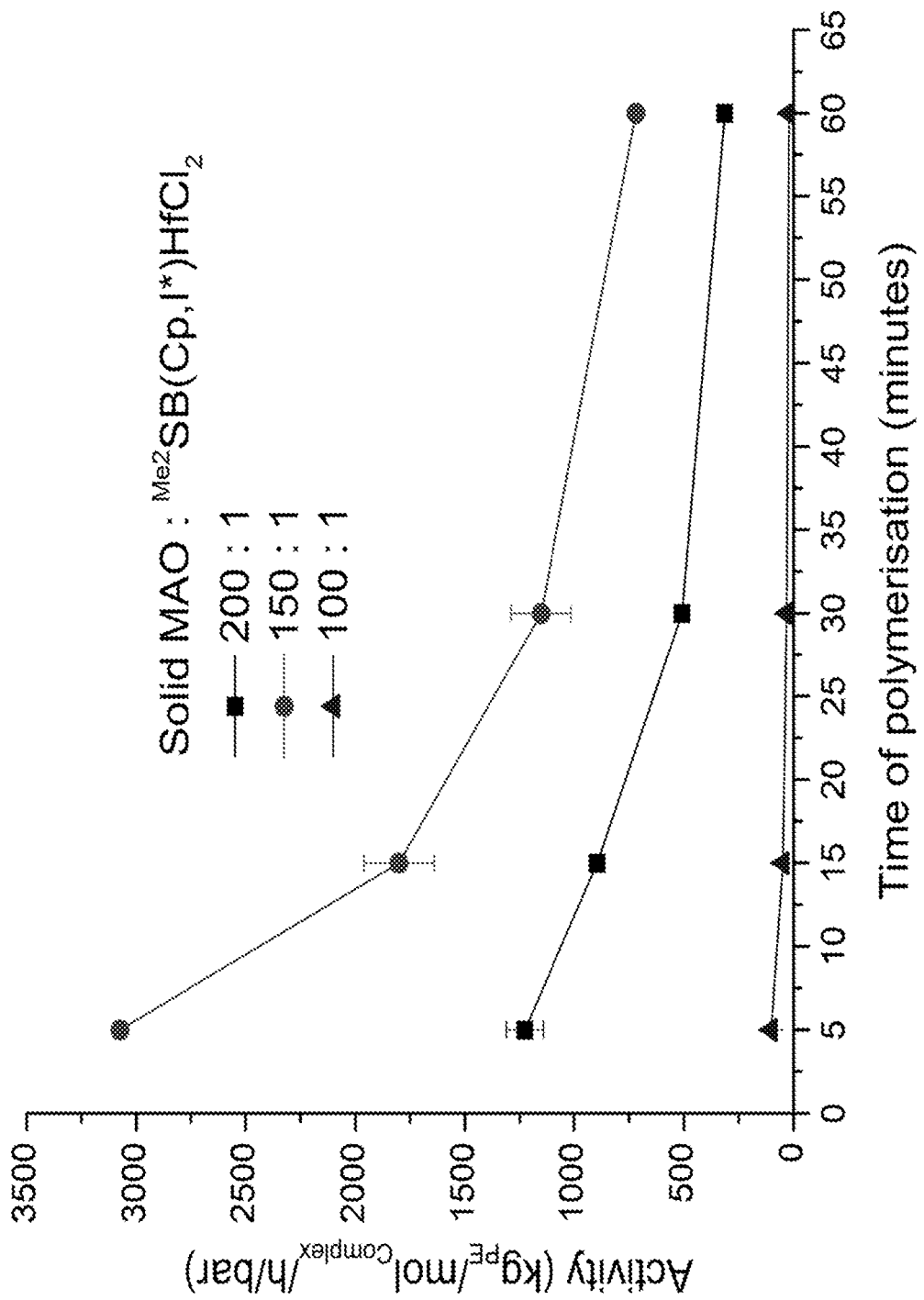
FIG. 6 shows activity vs time of polymerisation of ethylene using solid MAO supported/$^{Me_2}$SB(Cp,I*)HfCl$_2$: [Al]$_0$/[Zr]$_0$=200 (black square), [Al]$_0$/[Zr]$_0$=150 (red circle), and [Al]$_0$/[Zr]$_0$=100 (blue triangle). Polymerisation conditions: 10 mg of catalyst, 50 mL hexanes, 2 bar, 30 minutes, and 150 mg of TIBA.

FIG. 5 shows the catalytic activity of various solid MAO supported $^{Me_2}SB(Cp,I^*)HfCl_2$ compositions as a function of temperature, in the homopolymerisation of ethylene. FIG. 6 shows the catalytic activity of various solid MAO supported $^{Me_2}SB(Cp,I^*)HfCl_2$ compositions as a function of time, in the homopolymerisation of ethylene. FIGS. 5 and 6 show that when solid MAO/$^{Me_2}SB(Cp,I^*)HfCl_2$ was used, the $[Al]_0/[Zr]_0$ of 150 demonstrated higher activity than 200:1 or 100:1 over time and temperature of polymerisation of ethylene. This suggests a partial deactivation of the catalyst with high loadings of the hafnium compound.

Figure 7:
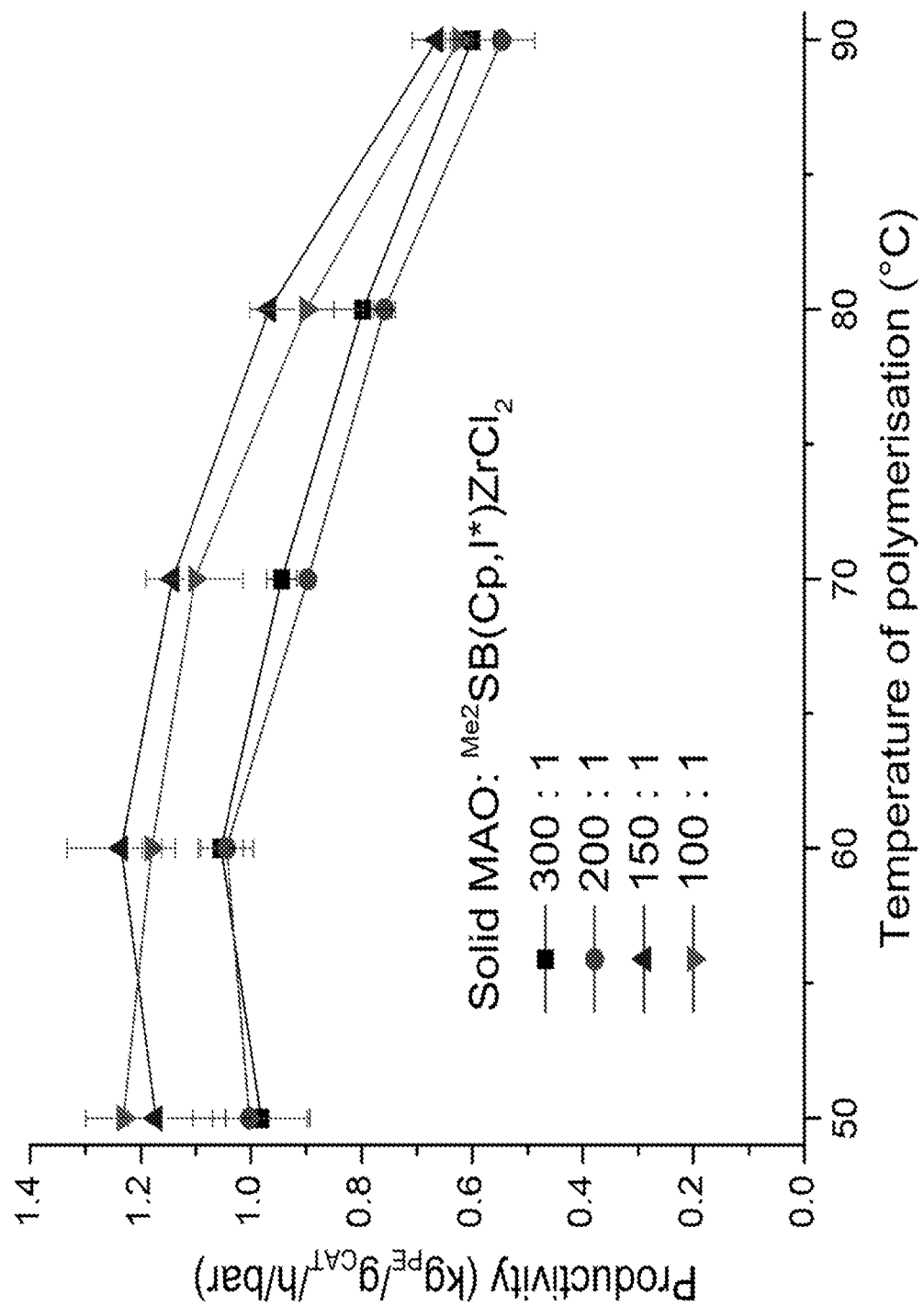
FIG. 7 shows Productivity vs temperature for solid MAO supported/$^{Me_2}$SB(Cp,I*)ZrCl$_2$: [Al]$_0$/[Zr]$_0$=300 (black square), [Al]$_0$/[Zr]$_0$=200 (red circle), [Al]$_0$/[Zr]$_0$=150 (blue triangle) and [Al]$_0$/[Zr]$_0$=100 (inverted pink triangle). Polymerisation conditions: 10 mg of catalyst, 50 mL hexanes, 2 bar, 30 minutes, and 150 mg of TIBA.

FIG. 7 shows the catalytic productivity of various solid MAO supported $^{Me_2}SB(Cp,I^*)ZrCl_2$ compositions as a function of temperature, in the homopolymerisation of ethylene.

Figure 8:
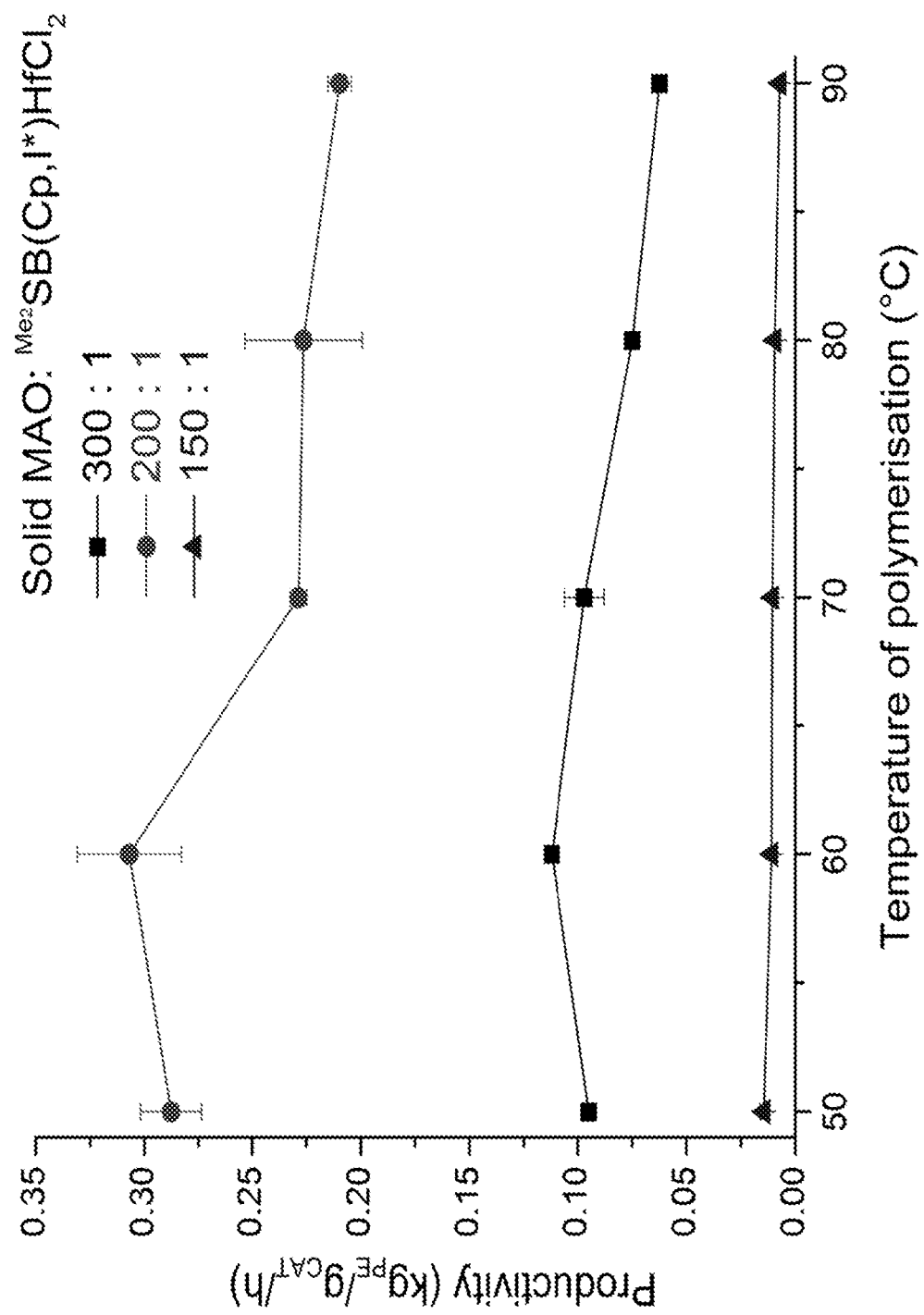
FIG. 8 shows Productivity vs temperature for solid MAO supported/$^{Me_2}$SB(Cp,I*)HfCl$_2$: [Al]$_0$/[Zr]$_0$=300 (black square), [Al]$_0$/[Zr]$_0$=200 (red circle), [Al]$_0$/[Zr]$_0$=150 (blue triangle) and [Al]$_0$/[Zr]$_0$=100 (inverted pink triangle). Polymerisation conditions: 10 mg of catalyst, 50 mL hexanes, 2 bar, 30 minutes, and 150 mg of TIBA.

FIG. 8 shows the catalytic productivity of various solid MAO supported $^{Me_2}SB(Cp,I^*)HfCl_2$ compositions as a function of temperature, in the homopolymerisation of ethylene.

In addition to investigating the catalytic properties of the solid MAO supported $^{Me_2}SB(Cp,I^*)ZrCl_2$ and $^{Me_2}SB(Cp^{Me},I^*)HfCl_2$ metallocenes, the catalytic properties of the solid MAO supported metallocenes depicted in Schemes 1a and 1b were also investigated. FIGS. 23 to 26 shows the activities and productivities for the slurry phase polymerisation of ethylene using the solid MAO supported metallocenes depicted in Schemes 1a and 1b. The figures show that $^{Me_2}SB(Cp^{Me},I^*)ZrMe_2$ is particularly active.

FIGS. 27 and 28 show the activities for the slurry phase polymerisation of ethylene using $^{Me_2}SB(Cp^{Me},I^*)ZrCl_2$ and $^{Me_2}SB(Cp,I^*)ZrCl_2$ supported on three different supports, namely solid polymethylaluminoxane (sMAO), methylaluminoxane modified layered double hydroxide (LDHMAO) and methylaluminoxane modified silica (ssMAO). These graphs demonstrate that sMAO supported complexes show the highest activities followed by LDHMAO and ssMAO.

FIG. 29 shows the various complex loading on solid polymethylaluminoxane (sMAO) for $^{Me_2}SB(Cp,I^*)ZrCl_2$, demonstrating that as expected, higher activities were obtained with lower loading of complex on the surface.

FIG. 30 shows the effect of varying the amount of triisobutylaluminium (TIBA) scavenger on the catalytic properties of solid MAO supported $^{Me_2}SB(Cp^{Me}, I^*)Zr(CH_2Ph)_2$ and $^{Me_2}SB(Cp,I^*)ZrCl_2$ in the slurry phase polymerisation of ethylene, demonstrating that only a small amount of TIBA is needed to obtain the highest activity.

Table 1 below shows slurry phase ethylene polymerisation data for the solid MAO supported $^{Me_2}SB(Cp^{Me}, I^*)Zr(CH_2Ph)_2$ and $^{Me_2}SB(Cp,I^*)ZrCl_2$ where the polymerisation is conducted on a larger lab scale. The data show that the activity of the catalyst increases with increasing reaction volume, but that an increasing TIBA content gives a negligible improvement in activity and productivity.

FIG. 38 shows the molecular weight of polyethylene produced from solid MAO supported $^{Me_2}SB(Cp^M,I^*)ZrCl_2$ as a function of polymerisation temperature.

Example 3—Low Molecular Weight Polyethylene Studies

Solid MAO supported $^{Me_2}SB(Cp,I^*)ZrCl_2$ (in which the Cp group is unsubstituted, shown below) was selected to investigate the ability of the compositions of the invention to catalyse the polymerisation of ethylene into low molecular weight polyethylene, including polyethylene wax, using hydrogen to control the molecular weight of the growing polymer chains.

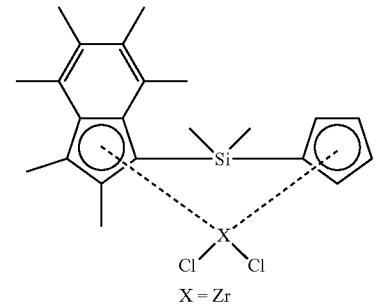

X = Zr

Figure 9:
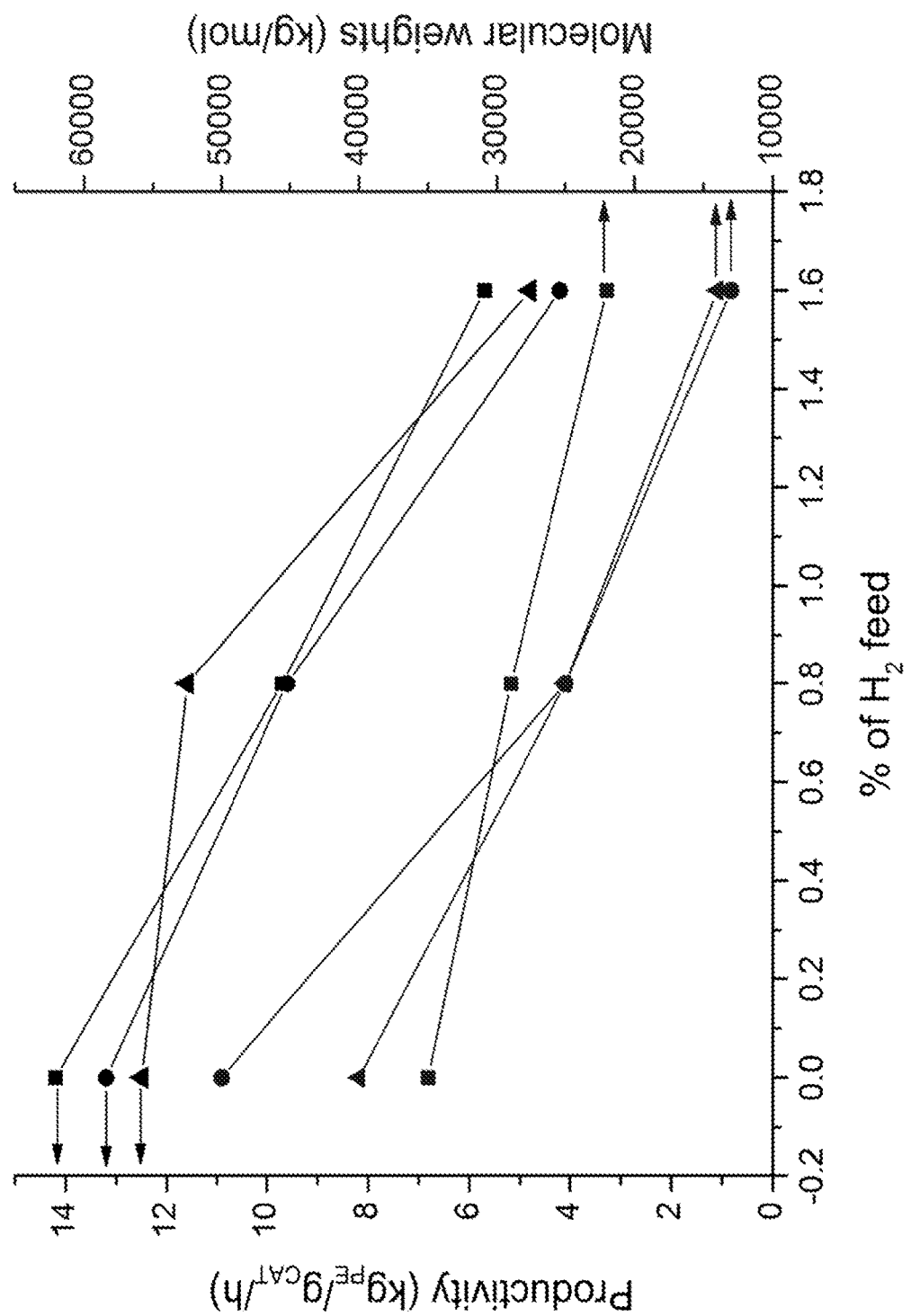
FIG. 9 shows productivity (black, left vertical axis) and molecular weights (blue, right vertical axis) vs H$_2$ content used as co-feed using solid MAO supported/$^{Me_2}$SB(Cp,I*)ZrCl$_2$ with [Al]$_0$/[Zr]$_0$ ratio of 200 (square), 150 (circle) and 100 (triangle). Polymerisation conditions: 0.05 mg of catalyst, 5 mL heptane, 8 bar and 80° C.

FIG. 9 shows the productivity (left vertical axis) and polyethylene molecular weight (right vertical axis) of various solid MAO supported $^{Me_2}SB(Cp,I^*)ZrCl_2$ compositions as a function of varying hydrogen concentration in ethylene feed stream. The data are tabulated in Table 2 below.

TABLE 1

Activity results ($kg_{PE}\,g_{CAT}^{-1}\,h^{-1}\,bar^{-1}$) and productivity ($kg_{PE}\,g_{CAT}^{-1}\,h^{-1}$), for the polymerisation of ethylene in slurry using $^{Me_2}SB(Cp,I^*)ZrCl_2$ and $^{Me_2}SB(Cp^{Me},I^*)Zr(CH_2Ph)_2$ supported on Solid MAO with $[Al]_0/[Zr]_0 = 200$.
Polymerisation conditions: 10 mg of catalyst, 250 mL hexane, 2 bar and 80° C.

| Catalyst | Catalyst mg | TIBA mg | Activity $kg_{PE}\,g_{CAT}^{-1}\,h^{-1}\,bar^{-1}$ | Productivity $kg_{PE}\,g_{CAT}^{-1}\,h^{-1}$ |
|---|---|---|---|---|
| $^{Me_2}SB(Cp,I^*)ZrCl_2$ | 9.6 | 150 mg | 10014 | 1.52 |
| $^{Me_2}SB(Cp,I^*)ZrCl_2$ | 9.5 | 750 mg | 9160 | 1.39 |
| $^{Me_2}SB(Cp^{Me},I^*)Zr(CH_2Ph)_2$ | 9.8 | 150 mg | 10612 | 1.61 |
| $^{Me_2}SB(Cp^{Me},I^*)Zr(CH_2Ph)_2$ | 9.8 | 750 mg | 11898 | 1.81 |

FIG. 31 shows the effect of varying the scavenger on the catalytic properties of solid MAO supported $^{Me_2}SB(Cp^{Me}, I^*)Zr(CH_2Ph)_2$ and $^{Me_2}SB(Cp,I^*)ZrCl_2$ in the slurry phase polymerisation of ethylene, demonstrating that triethylaluminium affords the lowest overall activity. It is believed that fouling occurred when MAO was used in combination with solid MAO supported $^{Me_2}SB(Cp,I^*)ZrCl_2$ leading to low activity.

FIG. 32 shows SEM images for polyethylene synthesised using various supported metallocenes. The solid MAO supported metallocenes appear to afford the best polyethylene morphology.

TABLE 2

Activity results ($kg_{PE}/g_{CAT}/h$) and molecular weight, $M_w$, (kg/mol) for the polymerization of ethylene in slurry using supported on Solid MAO/$^{Me_2}SB(Cp,I^*)ZrCl_2$ in function of $H_2$ feeding content. Polymerisation conditions: 0.05 mg of catalyst, 5 mL heptane, 8 bar and 80 ° C.

| $H_2$ (mol %) | $[Al]_0/[Zr]_0$ | Activity $kg_{PE}/g_{CAT}/h$ | $M_w$ (kg/mol) | $M_w/M_n$ | $T_{el,max}$ (° C.) |
|---|---|---|---|---|---|
| 0 | 200 | 14.2 | 35 | 14.2 | |
| 0.8 | 200 | 9.7 | 29 | 9.7 | |
| 1.6 | 200 | 5.7 | 22 | 5.7 | |

TABLE 2-continued

Activity results ($kg_{PE}/g_{CAT}/h$) and molecular weight, $M_w$, (kg/mol) for the polymerization of ethylene in slurry using supported on Solid MAO/$^{Me2}$SB(Cp,I*)ZrCl$_2$ in function of H$_2$ feeding content. Polymerisation conditions: 0.05 mg of catalyst, 5 mL heptane, 8 bar and 80 °C.

| H$_2$ (mol %) | [Al]$_0$/[Zr]$_0$ | Activity $kg_{PE}/g_{CAT}/h$ | $M_w$ (kg/mol) | $M_w/M_n$ | $T_{el,max}$ (°C.) |
|---|---|---|---|---|---|
| 0 | 150 | 13.2 | 50 | 2.4 | 111.6 |
| 0.8 | 150 | 9.6 | 25 | 2.7 | 110.4 |
| 1.6 | 150 | 4.2 | 13 | 3.3 | 109.8 |
| 0 | 100 | 12.5 | 40 | 4.3 | 111.6 |
| 0.8 | 100 | 11.6 | 25 | 2.5 | 110.6 |
| 1.6 | 100 | 4.8 | 14 | 2.7 | 109.8 |

Figure 10:
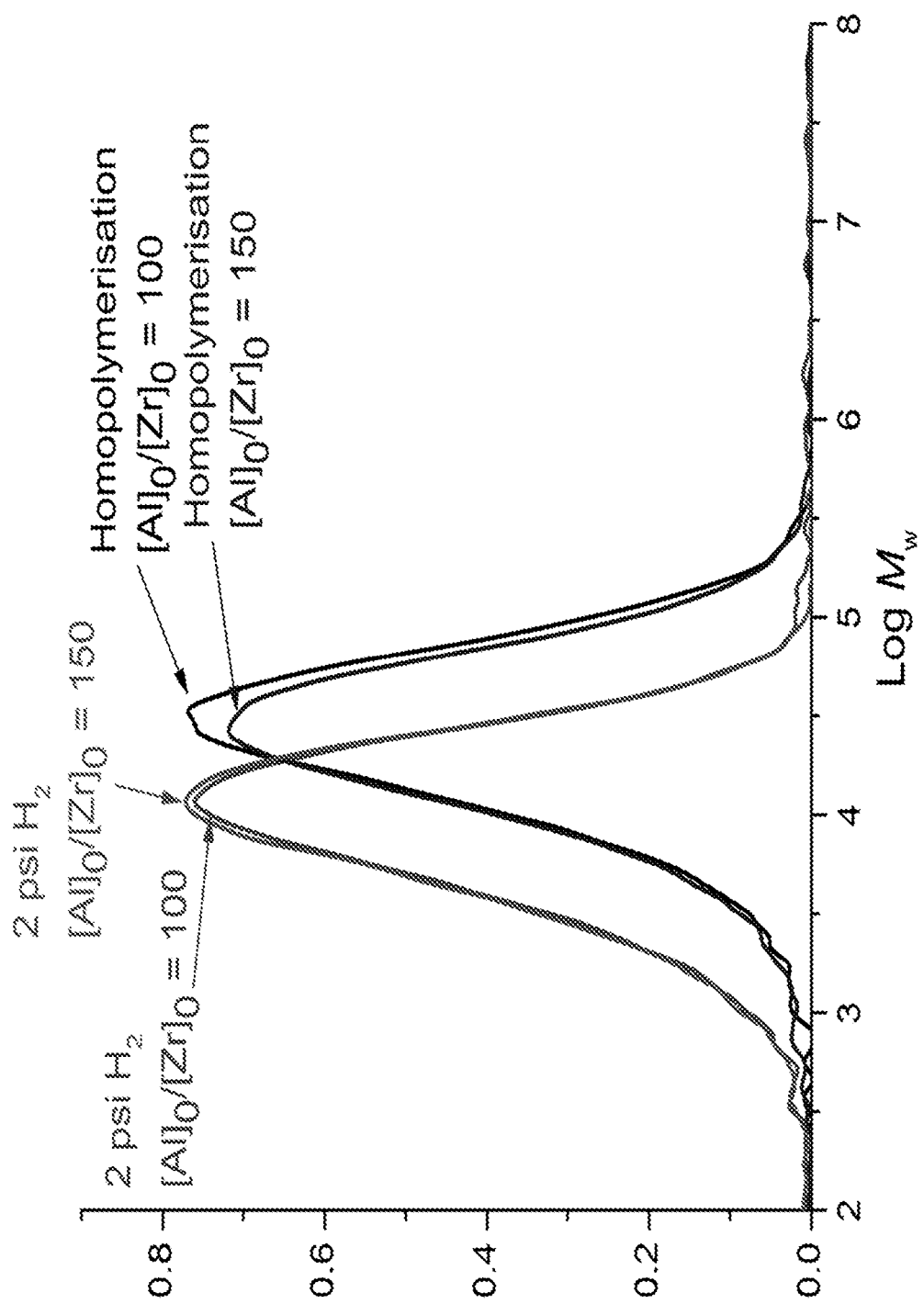
FIG. 10 shows Molecular weights, $M_w$, (horizontal axis) for the homopolymerisation and PE wax formation using Solid MAO/$^{Me2}$SB(Cp,I*)ZrCl$_2$ catalyst using various [Al]$_0$/[Zr]$_0$ ratio. Polymerisation conditions: 0.05 mg of catalyst, 5 mL heptane, 8 bar and 80° C.

FIG. 10 shows the molecular weight (horizontal axis) for the homopolymerisation and polyethylene wax formation using solid MAO/$^{Me2}$SB(Cp,I*)ZrCl$_2$ composition at various [Al]$_0$/[Zr]$_0$ ratios.

FIGS. 9 and 10, and Table 2 show that for the solid MAO/$^{Me2}$SB(Cp,I*)ZrCl$_2$ composition, as the [Al]$_0$/[Zr]$_0$ ratio decreases (meaning an increase in the amount of complex immobilised on the catalyst), there is a decrease in the molecular weight (22000 to 13000 kg/mol) with a constant productivity.

Figure 11:
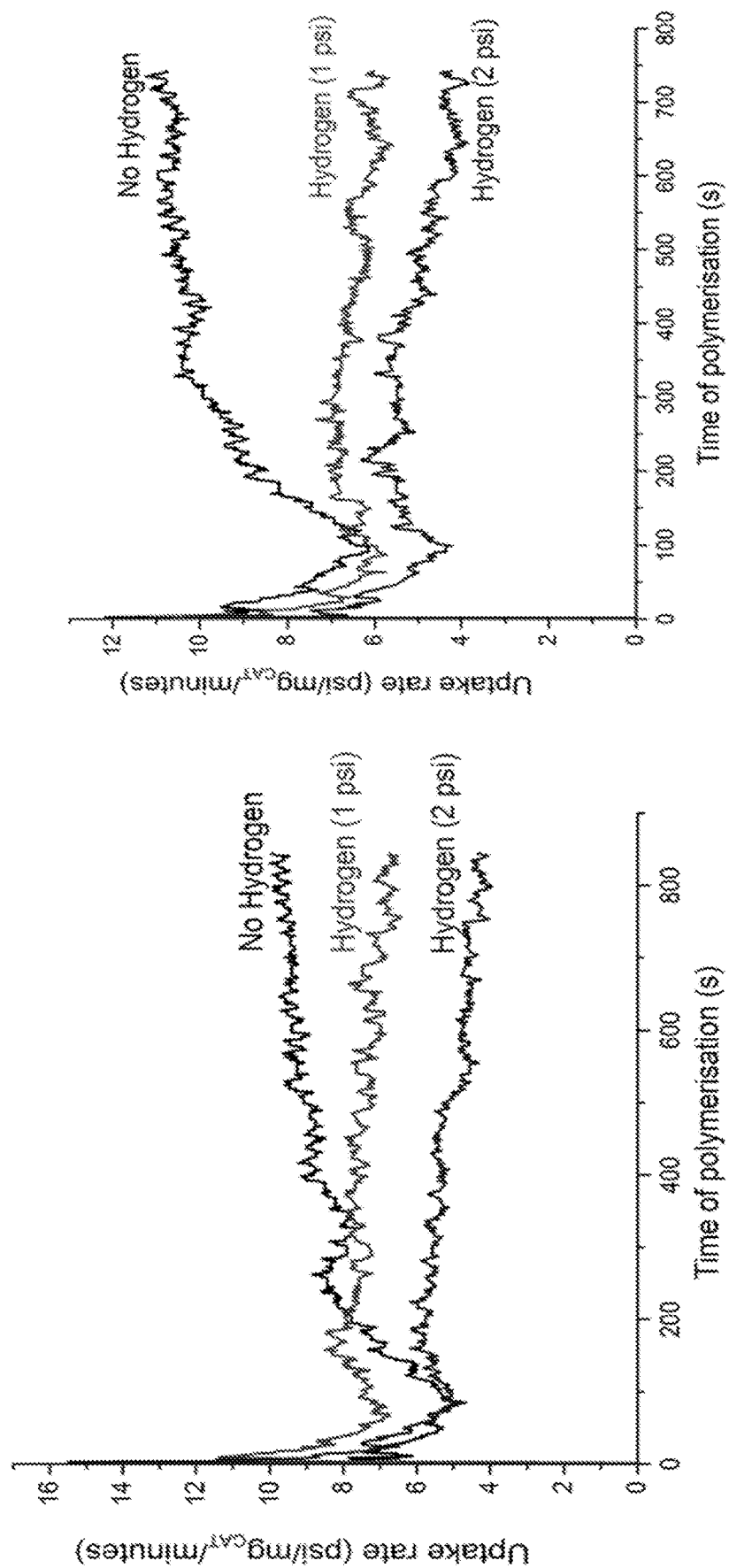
FIG. 11 shows uptake rate of ethylene for ethylene polymerisation with hydrogen response using Solid MAO/$^{Me2}$SB(Cp,I*)ZrCl$_2$ catalyst using [Al]$_0$/[Zr]$_0$ ratio of 100 (left) and 150 (right). Polymerisation conditions: 0.05 mg of catalyst, 5 mL heptane, 8 bar and 80° C.
Figure 12:
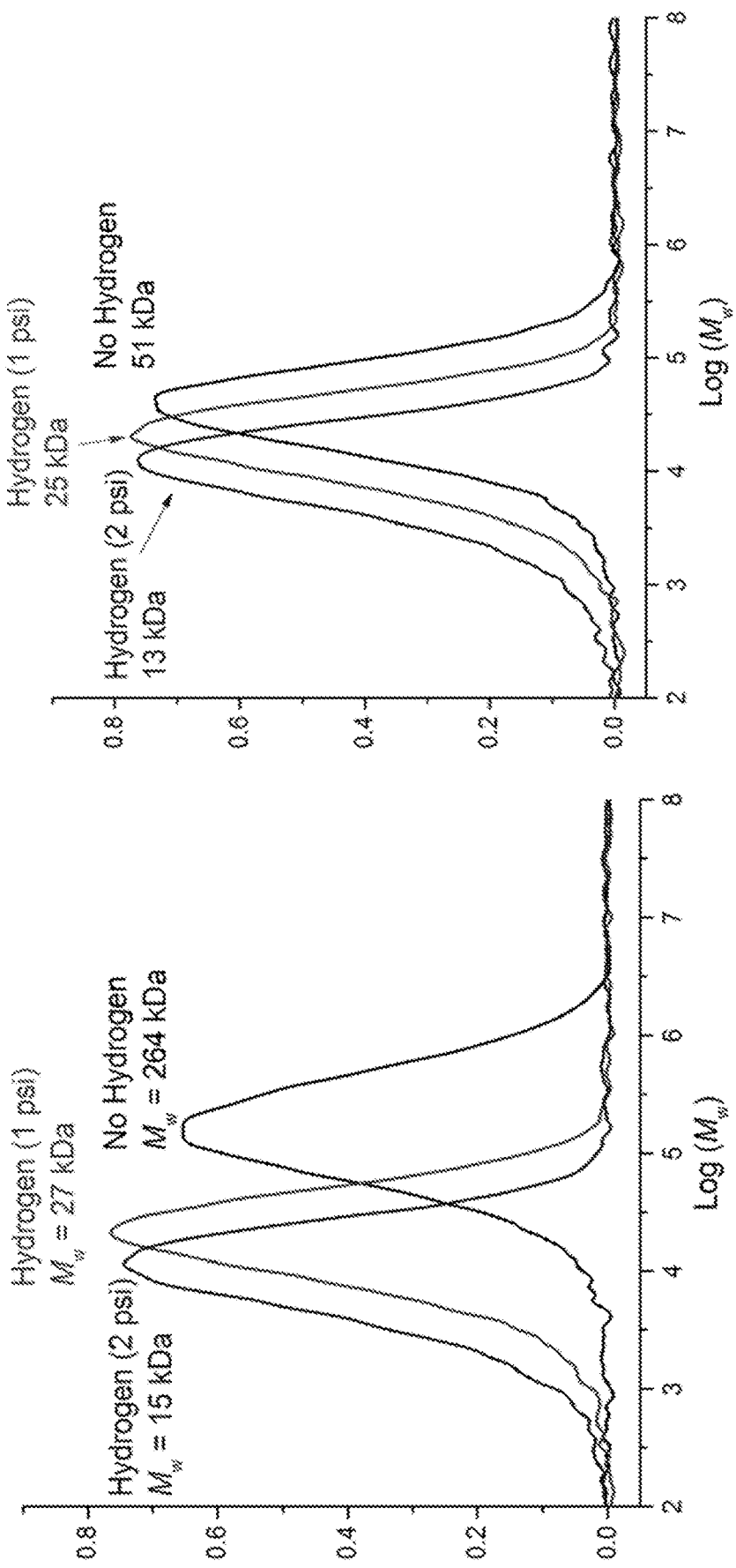
FIG. 12 shows molecular weights, $M_w$, of ethylene polymerisation with hydrogen response using Solid MAO/$^{Me2}$SB(Cp,I*)ZrCl$_2$ catalyst using [Al]$_0$/[Zr]$_0$ ratio of 100 (left) and 150 (right). Polymerisation conditions: 0.05 mg of catalyst, 5 mL heptane, 8 bar and 80° C.

FIG. 11 shows the uptake rate of ethylene for ethylene polymerisation with hydrogen response using Solid MAO/$^{Me2}$SB(Cp,I*)ZrCl$_2$ catalyst using [Al]$_0$/[Zr]$_0$ ratio 100 (left) and 150 (right). FIG. 12 shows molecular weights, $M_w$, of ethylene polymerisation with hydrogen response using Solid MAO/$^{Me2}$SB(Cp,I*)ZrCl$_2$ catalyst using [Al]$_0$/[Zr]$_0$ ratio of 100 (left) and 150 (right). FIGS. 11 and 12 demonstrate the capability of Solid MAO/$^{Me2}$SB(Cp,I*)ZrCl$_2$ to produce polyethylene wax with [Al]$_0$/[Zr]$_0$ ratio of 100 and 150.

Table 3 below compares the catalytic properties, in the preparation of polyethylene wax, of $^{Me2}$SB(Cp,I*)ZrCl$_2$ and the commercial standard, ($^n$BuCp)$_2$ZrCl$_2$, both of which were supported on solid MAO at a [Al]$_0$/[Zr]$_0$ ratio of 200.

TABLE 3

Activity results ($kg_{PE}/g_{CAT}/h/bar$) and molecular weight (kg/mol) for the polymerisation of ethylene with hydrogen response in slurry using supported on Solid MAO.

| Catalyst | [Al]$_0$/[Zr]$_0$ | Mol ratio H$_2$:C$_2$ | Time (h) | Activity $k_{PE}/g_{CAT}/h/bar$ | $M_w$ (kg/mol) | $M_w/M_n$ |
|---|---|---|---|---|---|---|
| (nBuCp)$_2$ZrCl$_2$ | 200 | 0.044:1 | 2 | 1.38 | 3.26 | 2.5 |
| $^{Me2}$SB(Cp,I*)ZrCl$_2$ | 200 | 0.0459:1 | 1 | 2.5 | 2.74 | 3.8 |

Polymerisation conditions: 80° C., 8.5 bar, 1000 mL Hexane

The data presented in Table 3 show that Solid MAO/$^{Me2}$SB(Cp,I*)ZrCl$_2$ is two times faster than Solid MAO/($^{nBu}$Cp)$_2$ZrCl$_2$ (commercial standard) when used with the same amount of hydrogen. Solid MAO/$^{Me2}$SB(Cp,I*)ZrCl$_2$ demonstrated particularly low molecular weight, $M_w$=2743 Kg/mol, which underlines the ability of such compositions to be effective catalysts in the preparation of polyethylene wax.

In addition to the data presented above in respect of solid MAO supported $^{Me2}$SB(Cp,I*)ZrCl$_2$, solid MAO supported $^{Me2}$SB(Cp$^{Me}$,I*)ZrCl$_2$ (depicted in Scheme 1a) was also selected to investigate the ability of the compositions of the invention to catalyse the polymerisation of ethylene into low molecular weight polyethylene, including polyethylene wax, using hydrogen to control the molecular weight of the growing polymer chains.

Table 4 and FIGS. 33 and 34 show data for the slurry phase polymerisation of ethylene with varying hydrogen content using solid MAO supported $^{Me2}$SB(Cp$^{Me}$,I*)ZrCl$_2$.

TABLE 4

Activity results ($kg_{PE}$ $g_{CAT}^{-1}$ $h^{-1}$ $bar^{-1}$) and molecular weight, $M_w$ (kg mol$^{-1}$), for the polymerisation of ethylene in slurry using $^{Me2}$SB(Cp$^{Me}$,I*)ZrCl$_2$ supported on Solid MAO with [Al]$_0$/[Zr]$_0$ = 200 in function of H$_2$ feeding content. Polymerisation conditions: 0.05 mg of catalyst, 5 mL heptane, 8 bar and 80° C.

| Complex | H$_2$ (psi) | H$_2$ (mol %) | Activity $kg_{PE}$ $g_{CAT}^{-1}$ $h^{-1}$ $bar^{-1}$ | $M_w$ kg mol$^{-1}$ | $M_w/M_n$ |
|---|---|---|---|---|---|
| $^{Me2}$SB(Cp$^{Me}$,I*)ZrCl$_2$ | 0 | 0 | 1.30 | 320 | 3.0 |
| $^{Me2}$SB(Cp$^{Me}$,I*)ZrCl$_2$ | 1 | 0.8 | 0.33 | 23 | 3.5 |
| $^{Me2}$SB(Cp$^{Me}$,I*)ZrCl$_2$ | 2 | 1.6 | 0.85 | 15 | 2.9 |

Table 4, as well as FIGS. 33 and 34, shows that when solid MAO supported $^{Me2}SB(Cp^{Me},I^*)ZrCl_2$ was used the uptake rate and molecular weights decrease with increasing hydrogen feeding leading to polyethylene having a molecular weight tending towards that of polyethylene wax.

Example 4—Copolymerisation Studies

Solid MAO supported $^{Me2}SB(Cp,I^*)ZrCl_2$ (in which the Cp group is unsubstituted, shown below) was selected to investigate the ability of the compositions of the invention to catalyse the copolymerisation of ethylene and (3-8C)α-olefins, in particular 1-hexene.

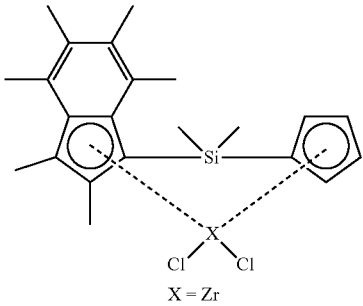

X = Zr

Table 5 below shows the activity results, molecular weight and CEF value for the polymerisation of ethylene and co-polymerisation of ethylene and 1-hexene in slurry using $^{Me2}SB(Cp,I^*)ZrCl_2$ supported on Solid MAO.

TABLE 5

Activity results ($kg_{PE}/g_{CAT}/h$), molecular weight (kg/mol) and CEF value for the polymerisation of ethylene and co-polymerisation of ethylene and 1-hexene in slurry using supported on Solid MAO.

| $[Al]_0/$ $[Zr]_0$ | $[Hexene]_{feed}$ (μL) | $[Hexene]_{cop}$ (mol %) | Activity $kg_{PE}/$ $g_{CAT}/h$ | $M_w$ (kg/mol) | $M_w/$ $M_n$ | $T_{el,max}$ (° C.) |
|---|---|---|---|---|---|---|
| 200 | 0 | 0 | 14.2 | 73 | 2.6 | 111.1 |
| 200 | 125 | 0.6 | 20.2 | 85 | 2.4 | 107.2 |

TABLE 5-continued

Activity results ($kg_{PE}/g_{CAT}/h$), molecular weight (kg/mol) and CEF value for the polymerisation of ethylene and co-polymerisation of ethylene and 1-hexene in slurry using supported on Solid MAO.

| $[Al]_0/$ $[Zr]_0$ | $[Hexene]_{feed}$ (μL) | $[Hexene]_{cop}$ (mol %) | Activity $kg_{PE}/$ $g_{CAT}/h$ | $M_w$ (kg/mol) | $M_w/$ $M_n$ | $T_{el,max}$ (° C.) |
|---|---|---|---|---|---|---|
| 200 | 250 | 1.0 | 18.5 | 60 | 2.1 | 104.1 |
| 150 | 0 | 0 | 15.0 | 440 | 3.3 | 111.7 |
| 150 | 125 | 0.45 | 16.6 | 403 | 3.0 | 107.5 |
| 150 | 250 | 0.8 | 19.1 | 363 | 2.8 | 105.0 |
| 100 | 0 | 0 | 15.9 | 396 | 3.0 | 111.5 |
| 100 | 125 | 0.5 | 26.2 | 417 | 3.2 | 107.4 |
| 100 | 250 | 0.9 | 28.2 | 349 | 3.4 | 104.6 |

Polymerisation conditions: 80° C., 8 bar, 5 mL Heptane

FIG. 13 shows the uptake rate of ethylene for copolymerisation of ethylene and 1-hexene; using Solid MAO/$^{Me2}SB(Cp,I^*)ZrCl_2$ catalyst using $[Al]_0/[Zr]_0$ ratio of 100 (left) and 150 (right). FIG. 14 shows the molecular weights, $M_w$, for copolymerisation of ethylene and 1-hexene using Solid MAO/$^{Me2}SB(Cp,I^*)ZrCl_2$ catalyst using $[Al]_0/[Zr]_0$ ratio of 100 (left) and 150 (right). FIG. 15 shows the CEF traces for the copolymerisation of ethylene and 1-hexene using Solid MAO/$^{k}h^*SB(Cp,I^*)ZrCl_2$ catalyst using $[Al]_0/[Zr]_0$ ratio of 100 (left) and 150 (right). FIGS. 13 to 15 shows that in the copolymerisation of ethylene and 1-hexene, the uptake of 1-hexene increases as the amount of 1-hexene increases. FIGS. 13-15 also demonstrate that the molecular weight of the copolymer does not vary with increasing amounts of 1-hexene, but that the temperature of elution does decrease. This is seen to be the case for both $[Al]_0/[Zr]_0$ ratios.

In addition to the data presented above in respect of solid MAO supported $^{Me2}SB(Cp,I^*)ZrCl_2$, solid MAO supported $^{Me2}SB(Cp^{Me},I^*)ZrCl_2$ (depicted in Scheme 1a) was also selected to investigate the ability of the compositions of the invention to catalyse the copolymerisation of ethylene and (3-8C)α-olefins, in particular 1-hexene.

Table 6 and FIGS. 35 to 37 show data for the slurry phase copolymerisation of ethylene and 1-hexene using solid MAO supported $^{Me2}SB(Cp^{Me},I^*)ZrCl_2$.

TABLE 6

Activity results ($kg_{PE}$ $g_{CAT}^{-1}$ $h^{-1}$ $bar^{-1}$), molecular weight, $M_w$ (kg $mol^{-1}$), and CEF value for the polymerisation of ethylene and co-polymerisation of ethylene and 1-hexene in slurry using $^{Me2}SB(Cp^{Me},I^*)ZrCl_2$ supported on Solid MAO with $[Al]_0/[Zr]_0 = 200$.
Polymerisation conditions: 0.05 mg of catalyst, 5 mL heptane, 8 bar and 80° C.

| Complex | $[Hexene]_{feed}$ μL | Activity $kg_{PE}$ $g_{CAT}^{-1}$ $h^{-1}$ $bar^{-1}$ | $M_w$ kg $mol^{-1}$ | $M_w/M_n$ | $T_{el,max}$ ° C. |
|---|---|---|---|---|---|
| $^{Me2}SB(Cp^{Me},I^*)ZrCl_2$ | 0 | 1.51 | 371 | 3.0 | 113.1 |
| $^{Me2}SB(Cp^{Me},I^*)ZrCl_2$ | 125 | 1.58 | 294 | 2.4 | 108.1 |
| $^{Me2}SB(Cp^{Me},I^*)ZrCl_2$ | 250 | 2.06 | 289 | 2.5 | 105.1 |

FIGS. 35 and 36 shows that when Solid MAO supported $^{Me2}SB(Cp^{Me},I^*)ZrCl_2$ was used the uptake rate increase (up to deactivation with 250 μL) and molecular weights stays similar with increasing comonomer (1-hexene) feeding. Similarly, FIG. 37 shows the CEF traces related and that increased 1-hexene feeding led to decrease in the elution temperature highlighting an increase in incorporation. Table 6 corroborates these data.

While specific embodiments of the invention have been described herein for the purpose of reference and illustration, various modifications will be apparent to a person skilled in the art without departing from the scope of the invention as defined by the appended claims.

The invention claimed is:

1. A compound of formula (I):

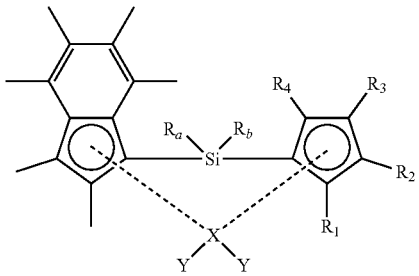

(I)

wherein
$R_1$, $R_2$, $R_3$ and $R_4$ are each independently selected from hydrogen or (1-4C)alkyl;
$R_a$ and $R_b$ are each independently (1-4C)alkyl;
X is zirconium or hafnium; and
each Y is independently selected from halo, phenyl, aryl(1-2C)alkyl, or $(CH_2)_zSi(CH_3)_3$, any of which is optionally substituted with one or more (1-3C)alkyl or halo;
wherein z is 1, 2 or 3;
or each Y is independently chloro, methyl, propyl, neopentyl, phenyl, benzyl, or —$CH_2Si(CH_3)_3$;
with the proviso that at least one of $R_1$, $R_2$, $R_3$ and $R_4$ is not hydrogen.

2. The compound of claim 1, wherein each Y is independently chloro, methyl, propyl, neopentyl, phenyl, benzyl, or —$CH_2Si(CH_3)_3$.

3. The compound of claim 1, wherein at least one Y group is chloro, methyl or benzyl.

4. The compound of claim 1, wherein both Y groups are chloro, methyl or benzyl.

5. The compound of claim 1, wherein the compound of formula (I) has a structure according to formula (Ia) or (Ib):

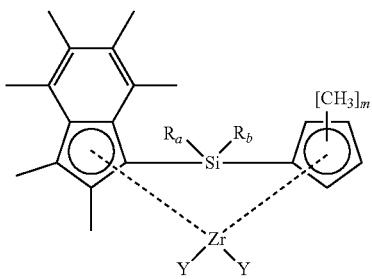

(Ia)

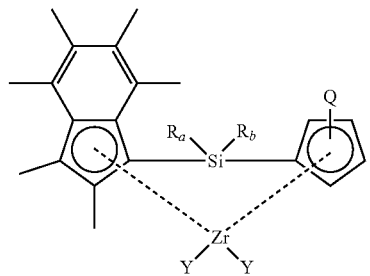

(Ib)

wherein
$R_a$ and $R_b$ are each independently (1-4C)alkyl;
each Y is independently selected from halo, phenyl, aryl(1-2C)alkyl, or $(CH_2)_zSi(CH_3)_3$, any of which is optionally substituted with one or more (1-3C)alkyl or halo;
m is 1, 2, 3, or 4; and
Q is n-butyl or t-butyl.

6. The compound of claim 1, wherein the compound has a structure according to formula (Ie) or (If):

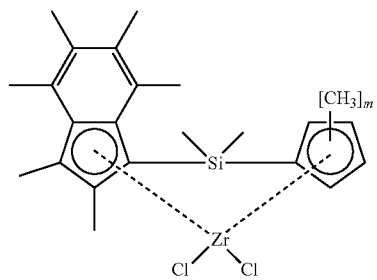

(Ie)

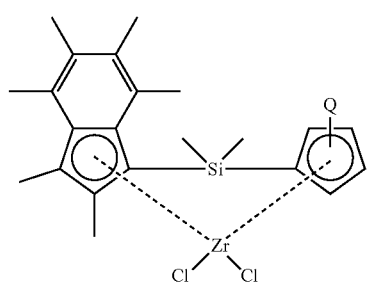

(If)

wherein
m is 1, 2 3 or 4; and
Q is n-butyl or t-butyl.

7. The compound of claim 1, wherein the compound has any one of the following structures:

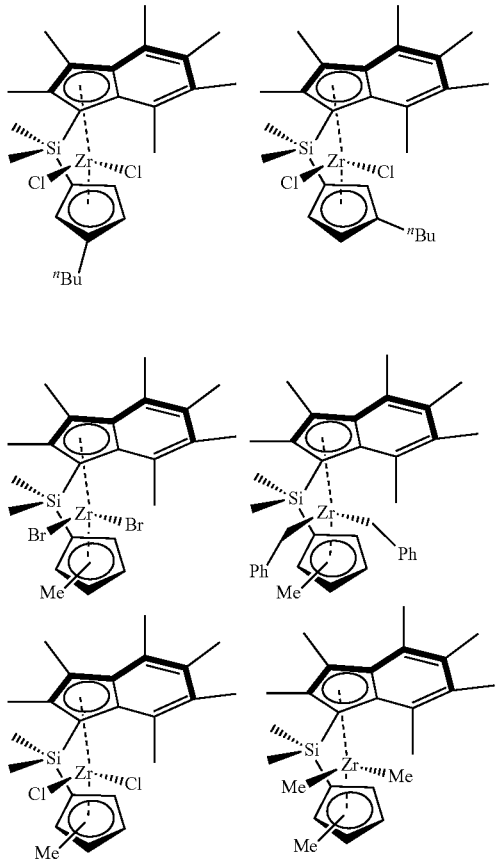

8. A composition comprising the compound of formula (I) of claim 1, and a support material.

9. The composition of claim 8, wherein the support material is solid MAO.

10. The composition of claim 9, wherein a mole ratio of support material to the compound of formula (I) is 50:1 to 500:1.

11. A polymerisation process comprising the step of polymerising one or more olefins in the presence of the composition of claim 8.

12. The process of claim 11, wherein the one or more olefins is ethylene.

13. The process of claim 12, wherein ethylene is polymerised in the presence of hydrogen.

14. The process of claim 13, wherein a mole ratio of hydrogen to ethylene ranges from 0.005:1 to 0.08:1.

15. The process of claim 11, wherein the one or more olefins is ethylene and one or more (3-8C)α-olefin.

16. The process of claim 15, wherein a quantity of the one or more (3-8C)α-olefin, relative to a quantity of ethylene, is 0.05-10 mol %.

17. The process of claim 15, where the step of polymerizing is conducted in the presence of one of more compounds selected from triethyl aluminium, methyl aluminoxane, trimethyl aluminium and triisobutyl aluminium.

18. A polymerisation process comprising a step of:
polymerising ethylene in the presence of hydrogen and a composition comprising solid MAO and a compound according to formula (II)

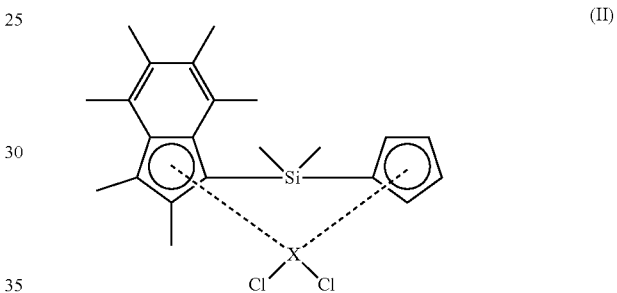

(II)

wherein X is zirconium or hafnium;
wherein a mole ratio of hydrogen to ethylene ranges from 0.0365:1 to 0.3:1.

19. The process of claim 18, wherein a mole ratio of solid MAO to the compound of formula (II) is 125:1 to 400:1.

20. The process of claim 18, where the step of polymerizing is conducted in the presence of one of more compounds selected from triethyl aluminium, methyl aluminoxane, trimethyl aluminium or triisobutyl aluminium.

* * * * *